United States Patent
Ganong et al.

(10) Patent No.: US 10,755,084 B2
(45) Date of Patent: *Aug. 25, 2020

(54) FACE AUTHENTICATION TO MITIGATE SPOOFING

(71) Applicant: APPLIED RECOGNITION INC., Burlington (CA)

(72) Inventors: Ray Ganong, Burlington (CA); Donald Craig Waugh, Oakville (CA); Jakub Dolejs, London (GB); Tomasz Wysocki, Toronto (CA); Chris Studholme, Ottawa (CA)

(73) Assignee: APPLIED RECOGNITION INC., Burlington (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/182,177

(22) Filed: Nov. 6, 2018

(65) Prior Publication Data

US 2019/0080155 A1    Mar. 14, 2019

Related U.S. Application Data

(63) Continuation of application No. 15/298,937, filed on Oct. 20, 2016, now Pat. No. 10,169,646, which is a
(Continued)

(51) Int. Cl.
*G06K 9/00* (2006.01)
*G06Q 30/02* (2012.01)
(Continued)

(52) U.S. Cl.
CPC ......... *G06K 9/00288* (2013.01); *G06F 16/50* (2019.01); *G06F 21/00* (2013.01);
(Continued)

(58) Field of Classification Search
CPC .......... G06K 9/00288; G06K 9/00261; G06K 9/00677; G06K 2009/00328;
(Continued)

(56) References Cited

U.S. PATENT DOCUMENTS

| 8,457,367 B1 * | 6/2013 | Sipe | G06K 9/00335 382/118 |
| 10,169,646 B2 * | 1/2019 | Ganong | G06K 9/00677 |

(Continued)

OTHER PUBLICATIONS

Form PTO/SB/08A filed in U.S. Appl. No. 15/298,937, dated Jan. 24, 2018.
Form PTO-892 filed in U.S. Appl. No. 15/298,937.

*Primary Examiner* — Ping Y Hsieh
(74) *Attorney, Agent, or Firm* — Norton Rose Fulbright Canada LLP

(57) ABSTRACT

Embodiments provide, in at least one aspect, methods and systems that authenticate at least one face in at least one digital image using techniques to mitigate spoofing. For example, methods and systems trigger an image capture device to capture a sequence images of the user performing the sequence of one or more position requests based on the pitch and yaw movements. The methods and systems generate a series of face signatures for the sequence of images of the user performing the sequence of one or more position requests. The methods and systems compare the generated series of face signatures to stored face signatures corresponding to the requested sequence of the one or more position requests.

22 Claims, 64 Drawing Sheets

Related U.S. Application Data continuation-in-part of application No. 14/078,071, filed on Nov. 12, 2013, now Pat. No. 9,639,740, which is a continuation-in-part of application No. 12/811,240, filed as application No. PCT/CA2008/002276 on Dec. 30, 2008, now Pat. No. 8,750,574.

(60) Provisional application No. 61/017,895, filed on Dec. 31, 2007, provisional application No. 62/264,675, filed on Dec. 8, 2015.

(51) Int. Cl.
*G06F 16/50* (2019.01)
*G06F 21/32* (2013.01)
*G06K 9/62* (2006.01)
*G06T 11/60* (2006.01)
*G06F 21/00* (2013.01)

(52) U.S. Cl.
CPC ......... *G06F 21/32* (2013.01); *G06K 9/00261* (2013.01); *G06K 9/00281* (2013.01); *G06K 9/00677* (2013.01); *G06K 9/00885* (2013.01); *G06K 9/6219* (2013.01); *G06Q 30/0241* (2013.01); *G06Q 30/0277* (2013.01); *G06T 11/60* (2013.01); *G06K 2009/00328* (2013.01)

(58) Field of Classification Search
CPC .............. G06F 17/30244; G06F 21/00; G06Q 30/0241; G06Q 30/0277; G06T 11/60
See application file for complete search history.

(56) References Cited

U.S. PATENT DOCUMENTS

| | | | |
|---|---|---|---|
| 2011/0317872 A1* | 12/2011 | Free | G06K 9/00228 382/103 |
| 2012/0260307 A1* | 10/2012 | Sambamurthy | G06F 21/554 726/1 |
| 2014/0016837 A1* | 1/2014 | Nechyba | G06K 9/00906 382/118 |
| 2016/0191822 A1* | 6/2016 | Kosugou | H04N 5/23219 382/118 |
| 2017/0249670 A1* | 8/2017 | Awad | G06Q 30/0254 |

* cited by examiner

Figure 54 - change in camera view of 3D object with Yaw movement

Figure 55 - 2D image being rotated (yaw movement)

Figure 56 - camera perspective at varying angles and distance

FACE AUTHENTICATION TO MITIGATE SPOOFING

CROSS REFERENCE TO RELATED APPLICATIONS

This application is a continuation of U.S. patent application Ser. No. 15/298,937, filed on Oct. 20, 2016 which claims priority from U.S. provisional patent application No. 62/264,675 filed on Dec. 8, 2015, and is a continuation-in-part of U.S. patent application Ser. No. 14/078,071 filed on Nov. 12, 2013 which is a continuation-in-part of U.S. patent application Ser. No. 12/811,240, filed Jun. 30, 2010 and entitled "METHOD, SYSTEM, AND COMPUTER PROGRAM FOR IDENTIFICATION AND SHARING OF DIGITAL IMAGES WITH FACE SIGNATURES", which is a National Stage entry from PCT patent application No. PCT/CA2008/002276, filed Dec. 30, 2008, and claims priority from U.S. provisional application No. 61/017,895, filed Dec. 31, 2007, of which the entire contents of each is hereby incorporated by reference in its entirety.

FIELD

The present invention relates to face and portrait extraction using face detection, recognition and authentication and application thereof to mitigate spoofing.

BACKGROUND

Computing devices or systems can be used for security purposes to authenticate users prior to providing access to physical or digital resources or assets. A user can be authenticated by a computing device or system implementing a security application using biometric data. Unauthorized users can attempt to spoof or imitate an authorized user by providing falsified data to the computing devices or system. Preventing access by unauthorized users to the physical or digital resources or assets may not be sufficient in all cases

SUMMARY

In one aspect, systems and methods for authenticating users based on face signatures and techniques to mitigate spoofing are provided.

In an aspect, embodiments described herein provide a security platform with an image capture device configured to detect a user within a field of view of a camera. The platform has a processor configured to: provide an electronic prompt to request the user to perform a sequence of one or more position requests, each position request defined by a specific change in pitch and yaw; trigger the image capture device to capture a sequence images of the user performing the sequence of one or more position requests based on the pitch and yaw movements; generate a series of face signatures for the sequence of images of the user performing the sequence of one or more position requests; compare the generated series of face signatures to stored face signatures corresponding to the requested sequence of the one or more position requests; authenticate the user as being a human user as a first authentication step; trigger the image capture device to capture at least one additional image of the user; verify the identity of the user as being an authorized user based on the at least one additional image of the user as a second authentication step; and store the at least one additional image of the user in a data storage as an audit trail in an encrypted format.

In some embodiments, the security platform has a display screen configured to display the sequence of images of the user to the user. The processor can be further configured to: provide a calibration prompt directing the user to come to a resting place in front of the camera where the user's eyes are on a horizontal plane; measure at least one key landmark on the face and an overall bounding box of the face and record values corresponding thereto; display a head position prompt on the display screen, the head position prompt directing the user to turn their head to match a position denoted by a head position image forming part of the head position prompt; measure the at least one key landmark on the face and the overall bounding box of the face and recording values corresponding thereto again.

In some embodiments, the processor is further configured to: compare the landmark values to determine whether the user has moved to the requested location and, if the landmark values do not match within a pre-programmed threshold, rejecting the session; compare the landmark values one or more previously captured landmark values to determine whether the user has undergone movements within a 2-dimensional image movement threshold; the 2-dimensional image movement threshold representing one or more values corresponding to movement patterns of 2-dimensional images; and reject the session if the user has undergone movements within the 2-dimensional image movement threshold.

In some embodiments, the processor is further configured to: discard outlier images, according to a statistical method, from the sequence of images of the user captured while collecting the key landmark data.

In another aspect, embodiments described herein provide a method to authenticate a user comprising: starting an authentication session; providing an electronic prompt to request the user to perform a sequence of one or more position requests, each position request defined by a specific change in pitch and yaw; capturing a sequence images of the user performing the sequence of one or more position requests based on the pitch and yaw movements; generating a series of face signatures for the sequence of images of the user performing the sequence of one or more position requests; comparing the generated series of face signatures to stored face signatures corresponding to the requested sequence of the one or more position requests; authenticating the user as being a human user as a first authentication step; triggering the image capture device to capture at least one additional image of the user; verifying the identity of the user as being an authorized user based on the at least one additional image of the user as a second authentication step; and storing the at least one additional image of the user in a data storage as an audit trail in an encrypted format.

In some embodiments, the method involves presenting the user with a screen displaying an image of the user's face; presenting the user with a calibration prompt, the calibration prompt directing the user to come to a resting place in front of the camera where one or more features of the image of the user's face is on a horizontal plane displayed on the screen displaying the image of the user's face; measuring a first set of face signature values from the sequence of images of the user performing the sequence of one or more position requests, the first set of face signature values corresponding to at least one key landmark on the user's face and an overall bounding box for the face, and recording those values; providing at least one re-positioning prompt directing the user to turn their head to match a new position denoted on the screen; measuring the key landmarks on the user's face and the overall bounding box for the user's face again to produce a second set of face signature values.

In some embodiments, the method involves ensuring that the user has performed the sequence of one or more position requests by: comparing the first set of face signature values and the second set of face signature values, and rejecting the session if the first and second set of face signature values do not match within a pre-defined threshold; comparing one or more of the captured values corresponding to at least one key landmark on the face with values within at least one stored face signature to determine whether the user has undergone movements within a 2-dimensional image movement threshold, the 2-dimensional image movement threshold representing one or more values corresponding to movement patterns of 2-dimensional images; rejecting the session if the user has undergone movements within a the 2-dimensional image movement threshold.

In some embodiments, the method involves, while generating the series of face signatures for the sequence of images of the user performing the sequence of one or more position requests: discarding outlier images, according to a statistical method, from the sequence of images of the user performing the sequence of one or more position requests.

In another aspect, embodiments described herein provide a method to authenticate a user comprising asking the user in front of a camera to perform a randomized sequence of one or more movements, serving to mitigate the ability of someone to hold up a video in order to mimic the request and act as an impostor.

In some embodiments, the request involves a requested movement of the head in a certain direction based on a pitch and yaw movement (up, down, left, right or combination thereof) and if the requested movement does not match the request, rejecting the session.

In some embodiments, the request involves a requesting a user to perform movements following an indicator on the screen with their eyes, and tracking the eye movement to ensure that it matches the direction of the indicator.

In another aspect, embodiments described herein provide a method to authenticate a user comprising periodically capturing digital images of a face during an authentication session, calculating a face signature, and comparing that with a face captured during an initial registration session where the user ID is linked to the face signature, wherein if the face matches within a specified threshold the user would pass this authentication test.

In some embodiments, the method involves, during the initial registration, prompting the user to pose at one or more random locations on the screen as per instructions provided, recording the face in the various poses, and generating face recognition signatures corresponding to the different poses. During authentication, prompting the user to perform movements corresponding to one or more of the poses recorded during the initial registration, capturing images of the user's face, rendering face recognition signatures, and comparing those face recognition signatures to the original face recognition signatures to determine whether the person is a true match.

In some embodiments, the method involves electronically prompting the user to register their face during an initial registration session, then asking the user to move their head to various poses during an authentication session.

In some embodiments, the method involves using morphing techniques to re-orient the face to a frontal face from the profile or tilted pose, generating a face signature from that re-oriented face and comparing that to the original registered face signature(s).

In some embodiments, the method involves, during registration process, asking the user to pose in at least two different face orientations, and for each pose, capturing the face from the camera image and generating a face signature.

In some embodiments, the method involves, for each pose optionally capture more than one frame (and thus face) and determine based on a quality threshold setting whether to discard that frame and face from the step, wherein if more than one face is captured for a specific pose, optionally use statistical methods to discard outlier faces based on average facial characteristics of all frames and faces.

In some embodiments, the method involves, for each pose, storing the face signature (or a blended face signature based on multiple faces) locally or remotely.

In some embodiments, the method involves, during an authentication session, asking the user to pose in one or more of the poses requested during the registration process.

In some embodiments, the method involves, for each pose, capturing the face from the camera image and generate a face signature.

In some embodiments, the method involves, comparing that face signature to the original signature from the registration pose using a difference formula, wherein if the difference is less than a specified threshold (variable parameter) then pass that step, wherein if the user passes all steps then they would pass the authentication session.

In some embodiments, the method involves validating the pitch/yaw of the pose during the authentication session to ensure that the user is not randomly moving their face around in a video or moving a 2-dimensional image.

In some embodiments, the method involves, during authentication steps, blocking any session where a captured face does not match the requested pose.

In some embodiments, the method involves storing the calculated face signature and the captured face image that does not match the requested pose as part of an audit trail file.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

BRIEF DESCRIPTION OF THE DRAWINGS

Embodiments will now be described, by way of example only, with reference to the attached figures, wherein.

Figure 1:
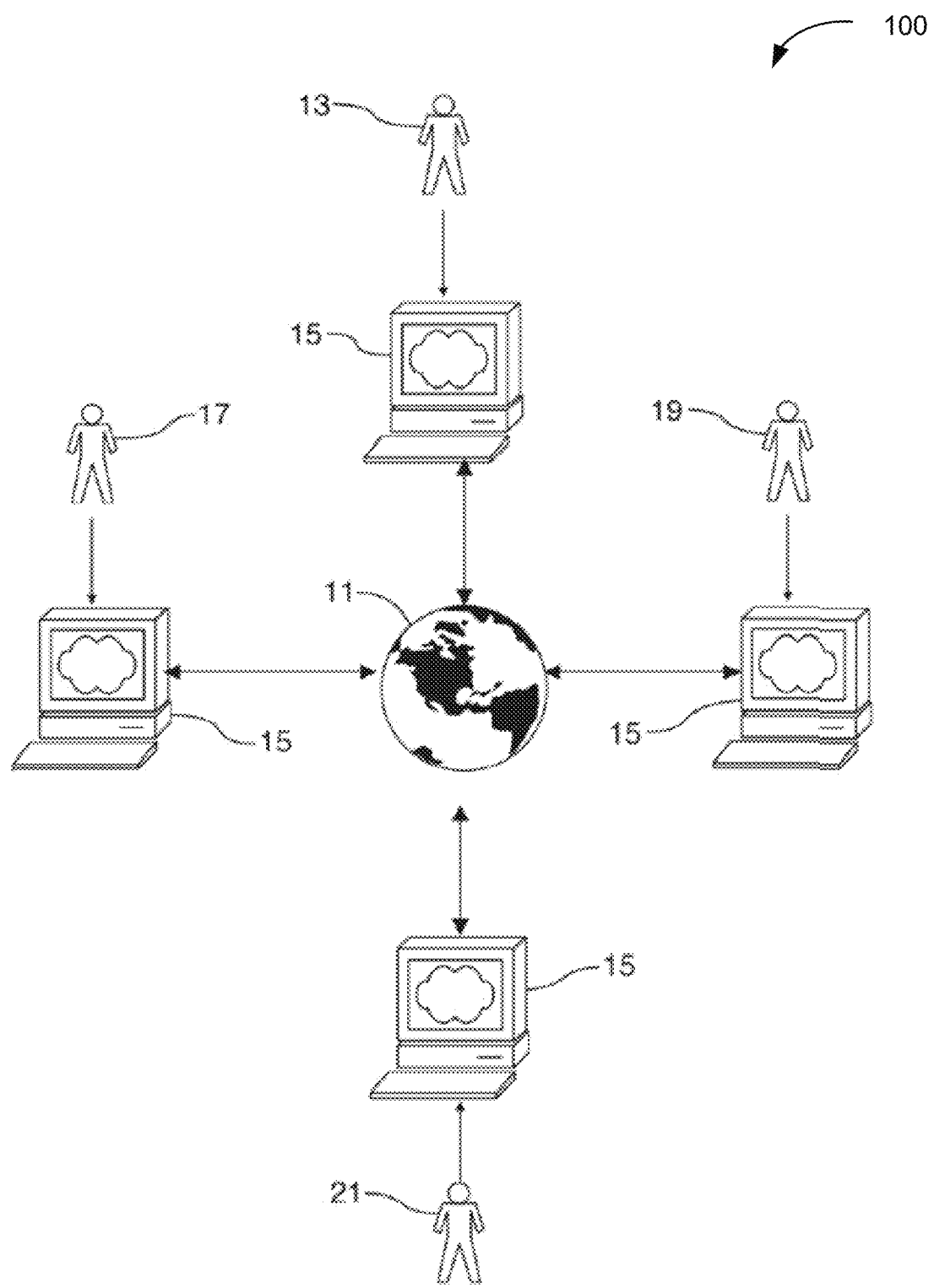
FIG. 1 illustrates a particular embodiment of the system of the present invention incorporating a social network service to perform targeted distribution of photos.

In the drawings, embodiments of the invention are illustrated by way of example. It is to be expressly understood that the description and drawings are only for the purpose of illustration and as an aid to understanding, and are not intended as a definition of the limits of the invention.

DETAILED DESCRIPTION

The present invention, in one aspect thereof, provides a networked computer architecture enabling the automatic distribution of images relating to a plurality of individuals operating computer systems on the network.

The present invention, in another aspect thereof, provides a computer program operable to enable each of the individuals to interface with the networked computer architecture herein provided for sharing information including images. The information can be used to authenticate individuals as described herein. The computer program enables the individuals to upload images including images having depictions of the faces of one or more persons. The computer program may perform a face detection technique to detect the one or more faces in the image, which may result in the generation of one or more face signatures, each face signature corresponding to one of the faces. The computer program may then access a database, the database operable to associate new face signatures with a list of known persons, each known person being associated with one or more face signatures. Each detected face signature may be provided to the individual as being associated to the corresponding known person, or where the face signature is not associated with any known person, that information can be provided by the individual. The individual may be provided a means to confirm the association between a face signature and a known person. The processed images may be used to build a repository of digital signatures for different users to provide a cloud sourced authentication system in some example embodiments.

The present invention, in yet another aspect thereof, provides a method for generating face signatures based on faces depicted in images. The present invention, in yet another aspect thereof, provides a method for reducing error rates in associating recognized face signatures with one or more face signatures linked to a database. The face signatures can be used to authenticate users as part of a security process, for example.

The present invention, in a further aspect thereof, enables the automatic selective distribution of images depicting faces. If the faces detected in the images are associated with a person that interfaces with the networked computer architecture herein provided, the computer program herein provided may automatically transmit the image to the person's computer for presentation to the person. It should be noted that the terms "photo" and "image" are used interchangeably herein. The distribution may be to repositories for different types of users and security processes to generate a repository of images and digital signatures to authenticate individuals and users.

The present invention, in one aspect thereof, provides a networked computer architecture enabling the automatic distribution of images relating to a plurality of individuals 13, 17, 19, 21 operating computer systems on the network. FIG. 1 illustrates an example implementation of the networked computer architecture of the present invention. A plurality of individuals may each connect to the Internet 11 through computer terminals operable to access the Internet 11. The Internet 11 connection enables the transmission and reception of digital data from Internet connected devices, each of which may be operable as provided below. The digital data may include biometric data such as images or other data that is used to authenticate a user 13, 17, 19, 21 as part of a security process.

Figure 15:
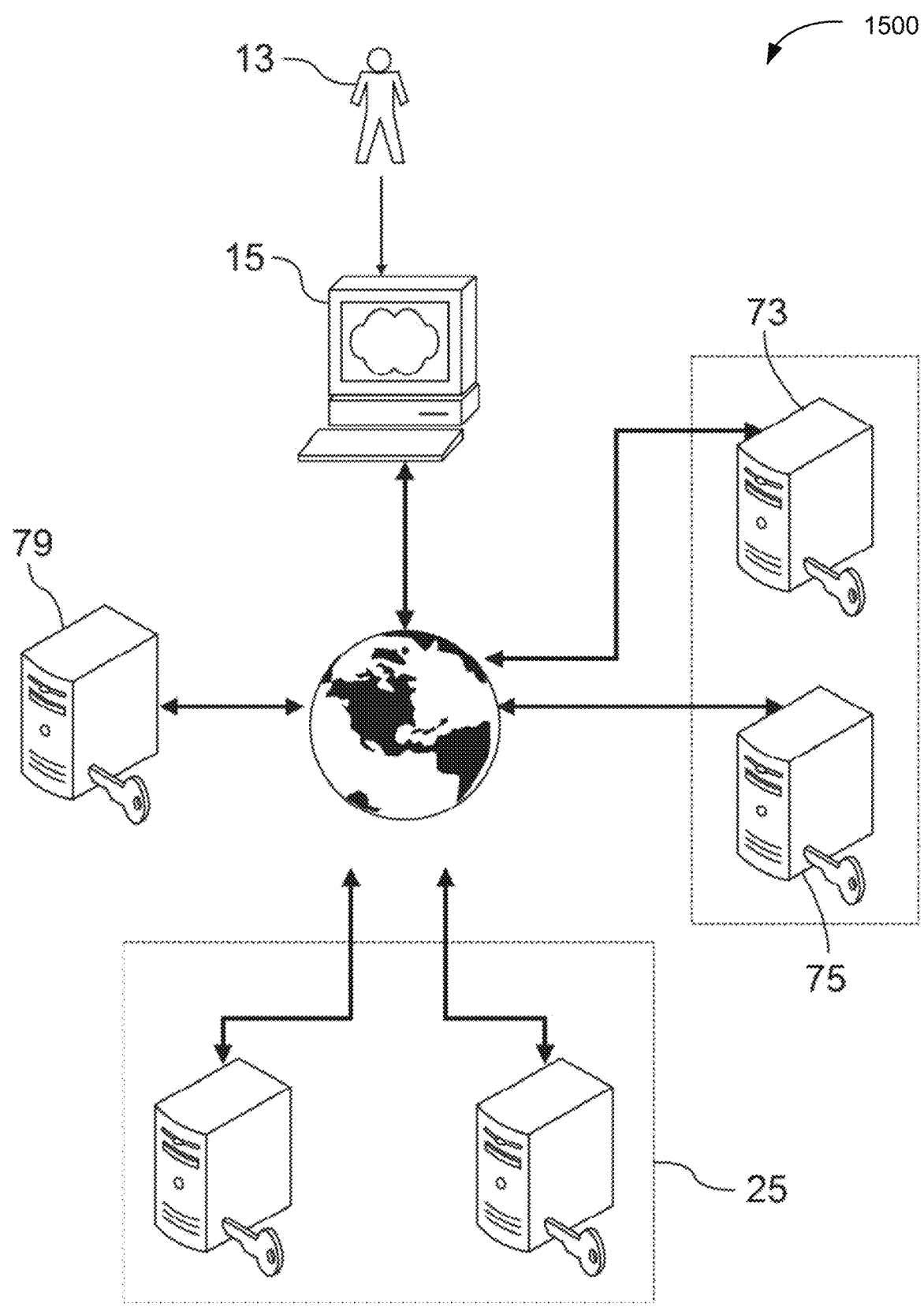
FIG. 15 illustrates an example configuration of the system of the present invention.

The present invention, in another aspect thereof, provides a computer program operable to enable each of the individuals to interface with the networked computer architecture herein provided. FIG. 15 illustrates an example configuration of the system of the present invention. The user 13 of the invention may register, download, and install the computer program to its computer system 15.

The computer program may, in one aspect thereof, allow the user 13 to invite and establish relationships with other users of the invention. The computer program may, in another aspect thereof, request ads from a set of advertising web servers that deliver ads to the computer program for display to the user 13 on various portions of a graphical user interface ("GUI"). The computer program may, in yet another aspect thereof, transmit photos and metadata related to those photos to other users or to third-party websites the meta data can be stored in the EXIF or similar file header or be embedded inside the jpg or similar image file format in a manner similar to stenographic techniques 25. These third-party websites 25 may encourage the use of their websites by publishing application programming interfaces (API's) to enable connection from client software or other web-based applications to their service.

The components of the computer program enabling implementation may include:

A processing engine that may run as a background process on the operating system. It may scan for new digital photos that the user has uploaded or copied to the specified folders on the local and/or a remote or cloud computer that are being monitored for photos, or it may automatically detect new photos when removable media, such as a memory card, is inserted into the computer. When a new photo is detected the face detection, eye detection and face recognition steps may be performed, as described more fully below. The results may be stored in a database such as the database described more fully below. It should be noted that the processing engine could be executed on a remote computer or cloud service computer, such as where the computer program of the present invention is provided as a service, which may use the software-as-a-service model.

A GUI that may provide a user with the ability to navigate photos, train the application by identifying known persons, edit and correct the automatic results of the engine, create and modify albums based on search criteria, add peer group members, and send albums to third party websites, each such action described more fully below.

A database (such as a SQL database, for example) that may be located on a user's computer or on a remote computer or cloud computer, and may contain the results of the face detection, eye detection and face recognition steps described below. The database may also contain metadata for photos and people as well as relationships between known persons and the associated face images.

Figure 21:
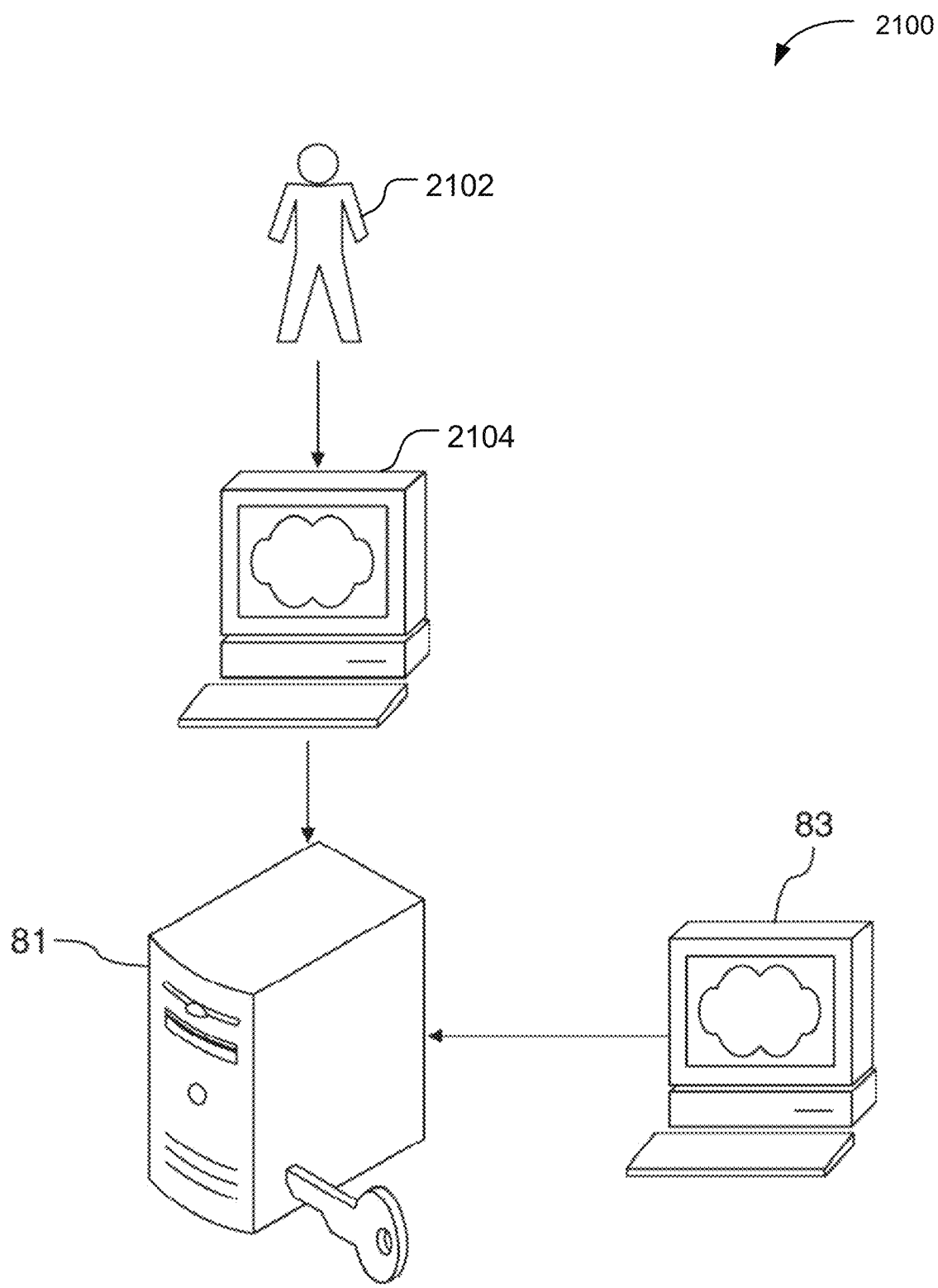
FIG. 21 illustrates one aspect of the present invention wherein a remote web browser or mobile device is enabled to access a proxy server, providing a connection to the functions of the present invention.

The GUI, the processing engine, and the database may be provided on one or more devices. FIG. 21 illustrates one aspect of the present invention wherein a remote web browser or mobile device 83 is enabled to access a proxy server 81, providing a connection to the functions of the present invention. The GUI may be provided on a mobile device 83 such as a PDA or cell phone and perform the face detection and recognition and indexing and transmit information back and forth to a remote engine running on a website, server, or a user's desktop or laptop computer. In such an implementation, the PDA or cell phone may be provided with a facility for performing face recognition, browsing of images and a facility for uploading images that are captured using a camera incorporated on the device. Uploading may be performed in accordance with the general uploading processes described more fully below.

The steps performed by the user 2102 using the computer program 2104 may include:

Specifying the folder(s) to monitor for new digital photos.

Training the application by identifying the names and metadata associated with faces found in the digital photos.

Correcting the errors made by the application; both false positives and false negatives.

Creating albums (collections of photos) by specifying search criteria including date ranges, Boolean combinations of known persons (via face selection), EXIF tags, and general tags. Optionally, the user may drag and drop individual photos or groups of photos to the album.

Once an album is created the user may then specify various output options including:

Third party websites.

Slideshow format files.

Document format files.

Inviting other application users to join in a peer group, specifying the options related to those relationships in the peer group, and accepting invitations to join a peer group for another user.

The networked computer architecture may also include one or more servers to enable techniques described herein. For example, the face detection and recognition method provided herein may be enabled by the servers. The servers, which may be provided on one or more server systems, may include server programs that enable the functions of the servers, including one or more of the following:

A registration server having a database enabling association of a list of email addresses, associated dates, and other administrative data. The registration server may present an interface such as a webpage to the user for collecting the registration data and then writing this data to the database. The user may then be given a means for installing the computer program described above, such as by being provided with an URL for downloading the client software.

An ad matching server may accept encrypted requests containing the demographic information for the user. This server may also accept ads in a plurality of formats (such as .JPG, .GIF, .SWF, etc.) from advertisers. For each ad submitted to the application the target demographic for the ad may also be recorded. The ad requests may be matched with the inventory of ads based on the target demographic data. Pointers (unique ID #'s) may be returned for matching ads to the requesting client software.

An ad delivery server may accept encrypted requests containing pointers to ads. The application may find the ad referenced by the pointer and return that ad to the requesting client software.

Face Detection

Figure 3:
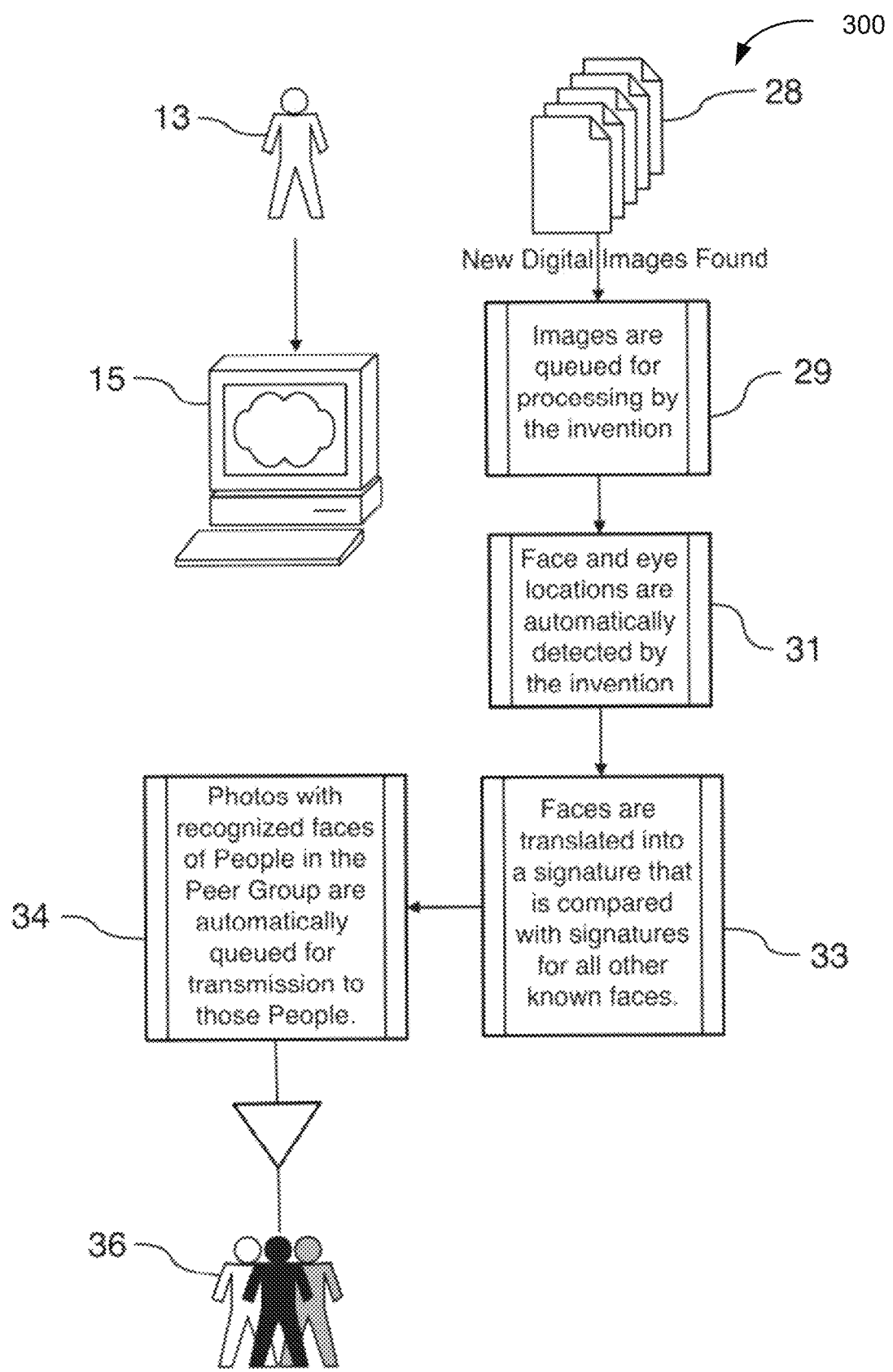
FIG. 3 illustrates the face recognition method of the present invention, in one aspect thereof, for generating face "signatures" that are compared with signatures of known persons.

The present invention, in one aspect thereof, provides a method for generating face signatures based on faces depicted in images. The face signatures can be used for authentication of authorized users. For example, the face signatures can provide a digital repository of data used or accessed by a security process to authenticate users based on biometric data that includes images. FIG. 3 illustrates an example face recognition method that may be used to as part of embodiments of face authentication as described herein. A user 13 may provide images to a computer system 15 operable to enable the execution of a computer program. The computer program may monitor file folders associated with the computer system 15 via operating system notifications that may be generated when new files are added or existing files are modified. When new images are found 28 they may be queued 29 for processing.

Faces in the photos may be located 31 by using any one of multiple techniques that may include: generating face coordinates, which may define a bounding box around the face; determining eye coordinates based on the face coordinates; and creating face signatures 33 for the face based on the face and eye coordinates and by using a face signature technique. The face signature technique may be Principal Component Analysis (PCA), which is known to those skilled in the art. The face signatures may be compared to known face signatures 34 and the photos may be automatically and selectively disseminated to other users 36. Further details of these aspects of the invention are provided below.

Figure 4:
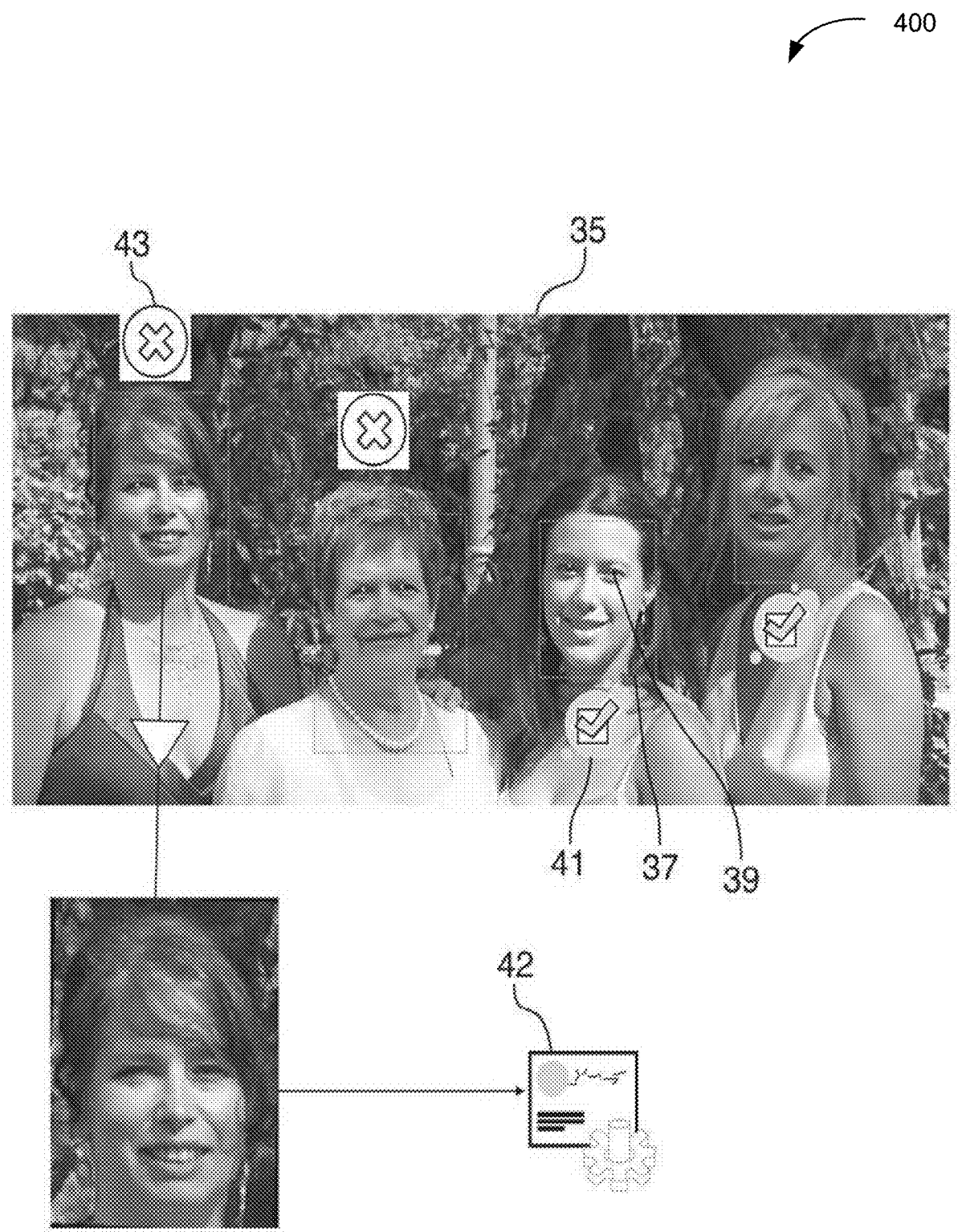
FIG. 4 illustrates linking the results of a face detection, eye detection and face recognition technique in a face database on the storage device of the local computer system.

FIG. 4 illustrates linking the results of a face detection, eye detection and face recognition technique in a face database on the storage device of the local computer system or alternatively can be in a face database on the storage device of the cloud computer system. The results may be the coordinates of the associated object. In the case of face detection, the coordinates may define the outline of the face 37 with top left, top right, bottom left and bottom right pixel locations on the original photo which is referred to as a bounding box. In the case of eye detection, the coordinates may represent the pupil location 35 of the left and right eyes. In the case of face recognition, the result may be a face signature 42.

The graphical user interface (GUI) for the invention may display the face 37 and eye 39 locations on each image 35. As described more fully below, the present invention, in one aspect thereof, provides a list of known persons. If the face signature 42 corresponding to a detected face is associated with a person listed in the known persons list, the GUI may indicate such an association to the user using a graphic notation on or around the image. Otherwise, the GUI may indicate that there is no such association to the user using another graphical notation on or around the image. In the example depicted by FIG. 4, the known faces may be identified with check marks 41 and the unknown faces with the symbol "X" 43.

Initially all faces may be unknown to the system until the user "trains" the invention to recognize faces. The training method may involve the user. The user, via the GUI of embodiments described herein, may use the mouse or other input device to identify the face as belonging to a specific person, by clicking anywhere on the visual bounding box surrounding the face and dragging the face over top of the person's name (or an icon representing the person). Alternatively, the user may drag the icon representing that person over top of the target face. In yet another alternative, the user may click anywhere on the visual bounding box and select a function for identifying a previously unknown face, which may enable the user to enter data related to that person such as name, email address and other details, which may collectively be referred to as metadata corresponding to the person. This training step may be performed once for each known person. The signature that was created for the face may then enable comparison of all of the unknown face signatures in the face database with the person identified. Both the method for comparison and the method of face detection, eye detection, and face recognition are described more fully below.

The present invention, in a further aspect thereof, facilitates an optimal training stage by ordering the unknown faces such that the user can identify groups of detected faces that are most likely associated with a single individual. For example, an algorithm could be used to cluster similar faces together based on face signatures. The similarity may be based on certain aspects of their face signatures even when the faces are not already associated with an individual in the face database. Thus a user can identify a cluster of faces as belonging to a particular known person and thereby optimally carry out the training method described above.

The present invention, in a further aspect thereof, facilitates an optimal training by more than one face signature associated with a person thus improves accuracy by supporting multiple poses of a person and addresses changes to the persons face due to aging, glasses or changes to the face such as caused by a beard or mustache.

Association of Faces with Known Persons

Figure 16:
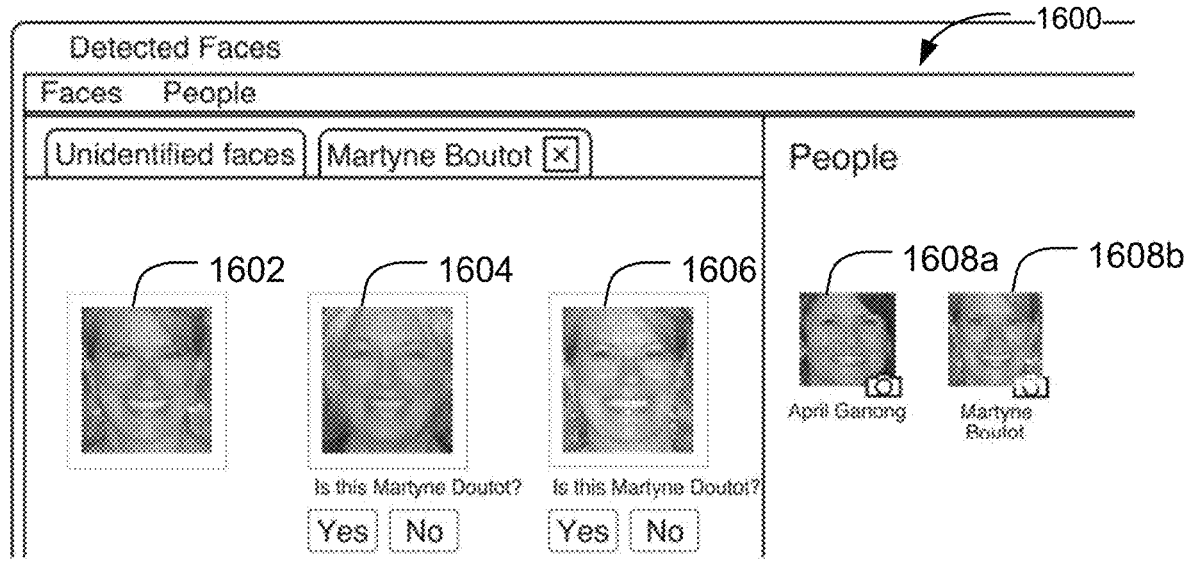
FIG. 16 illustrates an interface for enabling a user to confirm the identity of a face appearing in an image.

FIG. 16 illustrates an interface 1600 for enabling a user to confirm the identity of a face appearing in an image 1602. A face signature in an image may be within a similarity threshold to a face signature associated with a known person 1608a, 1608b (e.g. face signatures stored in a repository and linked to a user identifier). In this case, an association may be made between the detected face and the known person. One method of comparing face signatures is described more fully below.

If there is an association between the face and a known person, a further association may be created in the database between the face signature and the known person. Every previously identified face for every known person may be compared with each new face processed by the system. When viewing the faces related to a specific known person, any suspected matches generated by the invention may be displayed and the user may be asked to confirm that the matches are correct 1604, 1606.

Over time, as the number of identified faces increases, the overall accuracy of matching new faces with the correct person may increase since there will typically be many different views of a person with each new face. In accordance with the method of comparing face signatures provided herein, the number of false positives therefore typically decreases over time. This may provide multiple face signatures for use by the authentication process. Multiple face signatures for a given user can be linked by a user identifier, for example.

Figure 5:
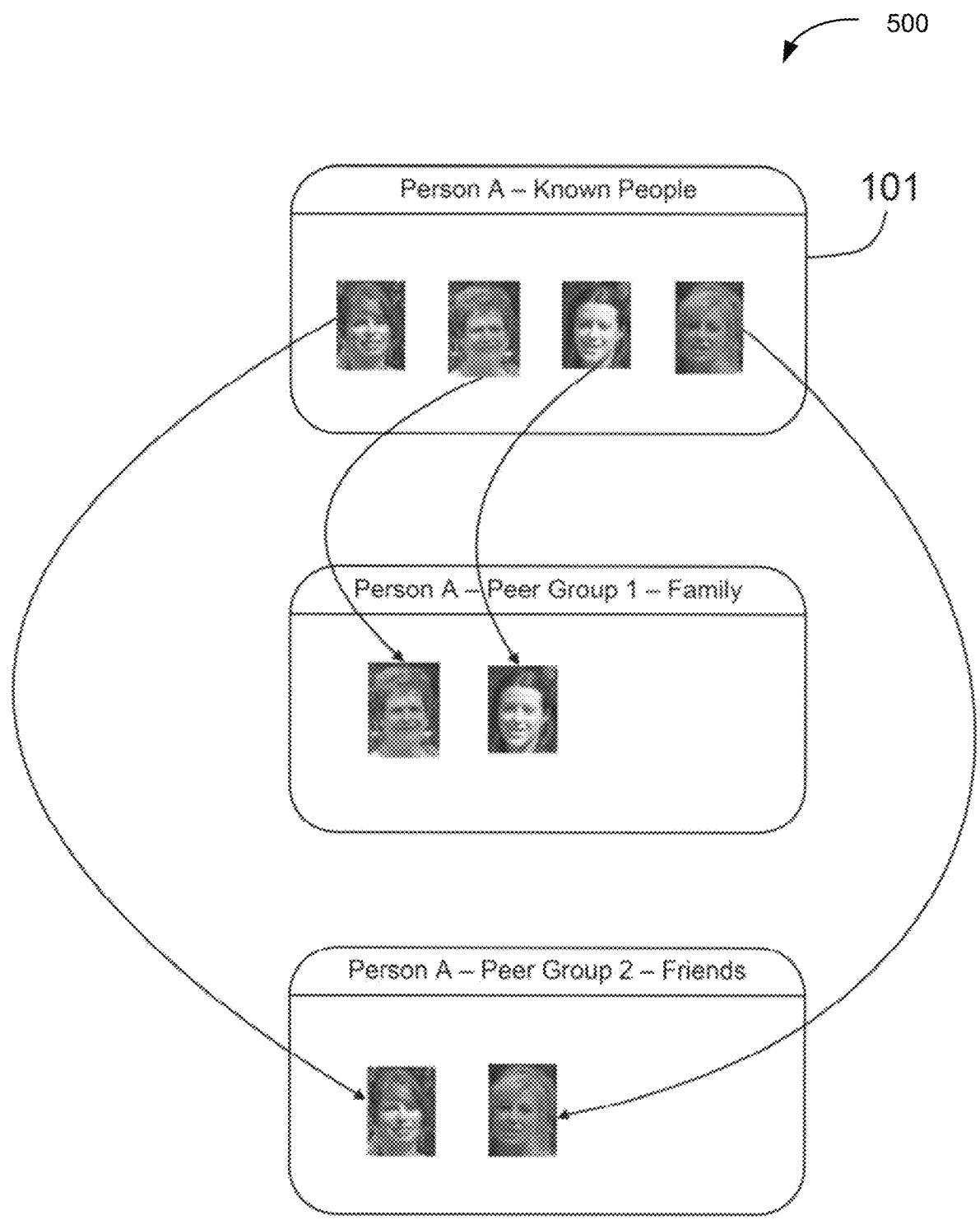
FIG. 5 illustrates how peer groups can grow and evolve over time as the list of known persons grows.

FIG. 5 illustrates how groups can grow and evolve over time as a list of known persons grows. The list of known persons 101 grows as the user works with the invention, because the user may continue to associate unknown faces with known persons.

Dissemination

Figure 2:
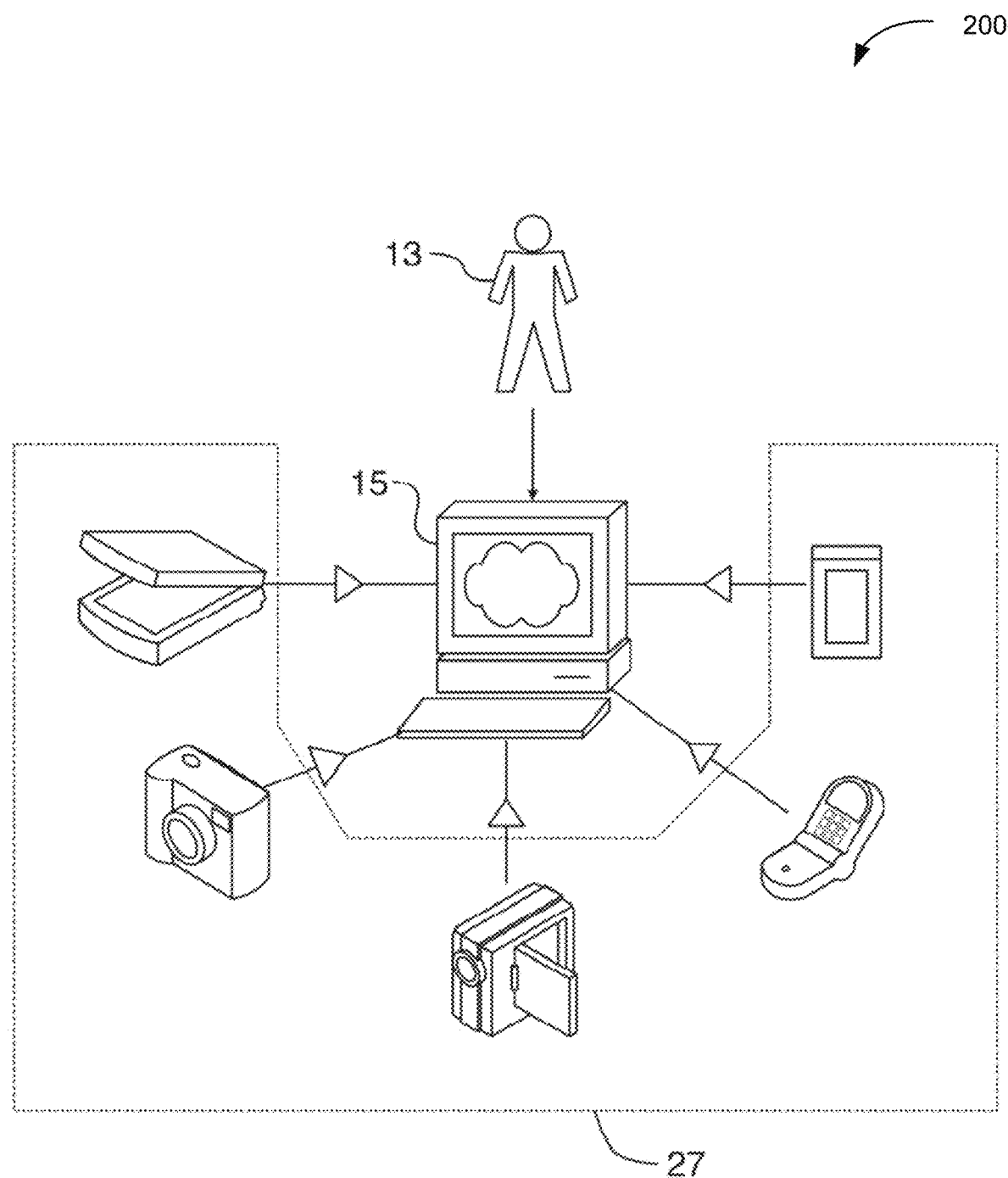
FIG. 2 further illustrates the system illustrated in FIG. 1, wherein users add new digital images from various devices over time.

The present invention, in another aspect thereof, provides a computer program operable to enable each of the individuals to interface with the networked computer architecture herein provided for sharing images with a data repository for a security process or platform, for example. FIG. 2 further illustrates a system according to some embodiments. A user 13 may capture digital images and periodically copy them from one or more image device storage systems 27 to a computer system 15. The user 13 may configure the computer program to monitor specific file folders on the computer system 15 for new images, by inputting the names of the file folders to the computer program using a GUI as described above. The computer system 15 may connect to a security platform to distribute images or face signatures for use in an authentication session for example.

Detection Optimizations

Figure 6:
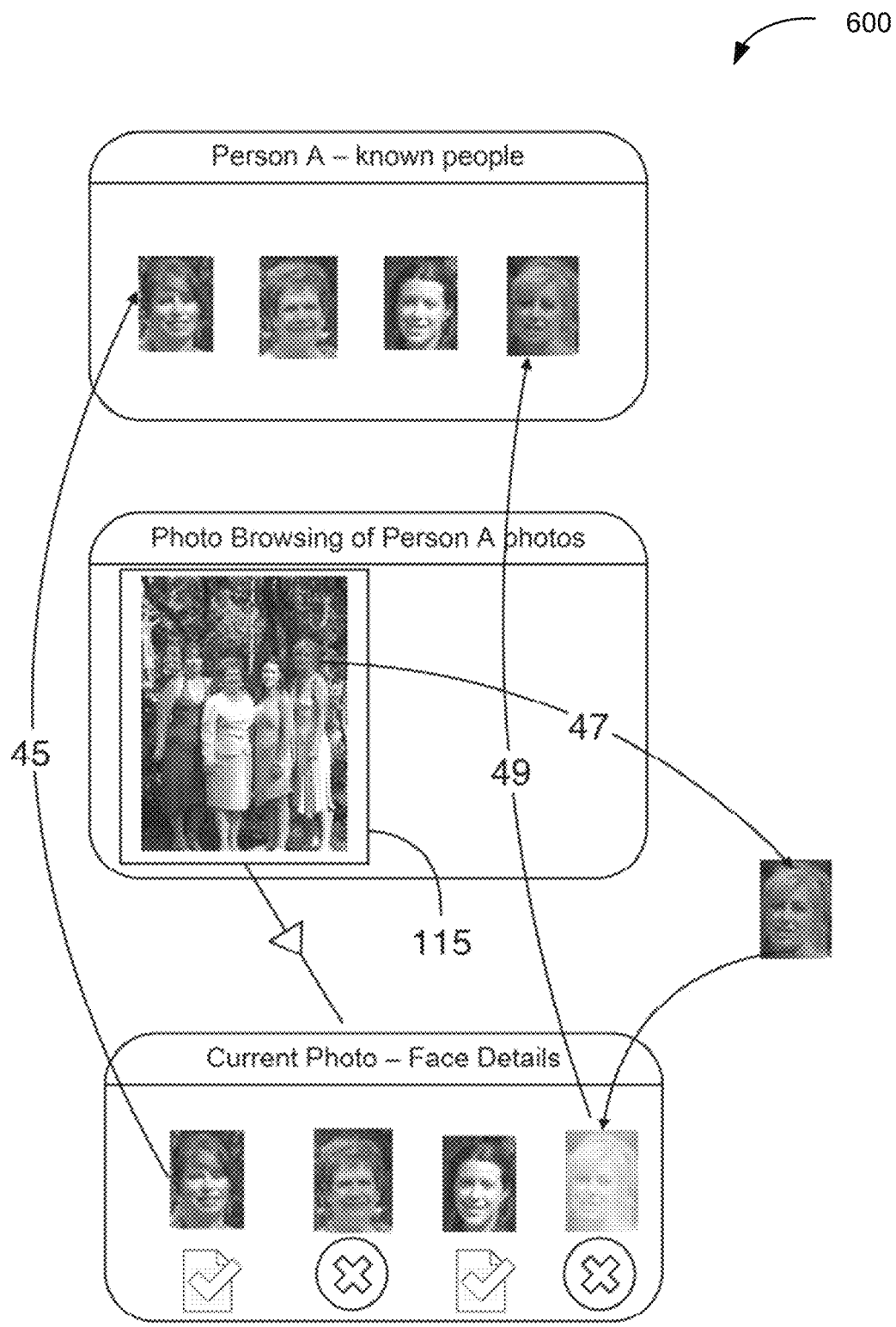
FIG. 6 illustrates potential methods of correcting errors that may result from the automatic face detection, eye detection, and face recognition steps.

Embodiments described herein provide a technique for optimizing face detections. FIG. 6 illustrates potential methods of correcting errors that may result from the automatic face detection, eye detection, and face recognition steps. The technique can guide the user through the GUI to correct these inevitable errors.

Figure 17:
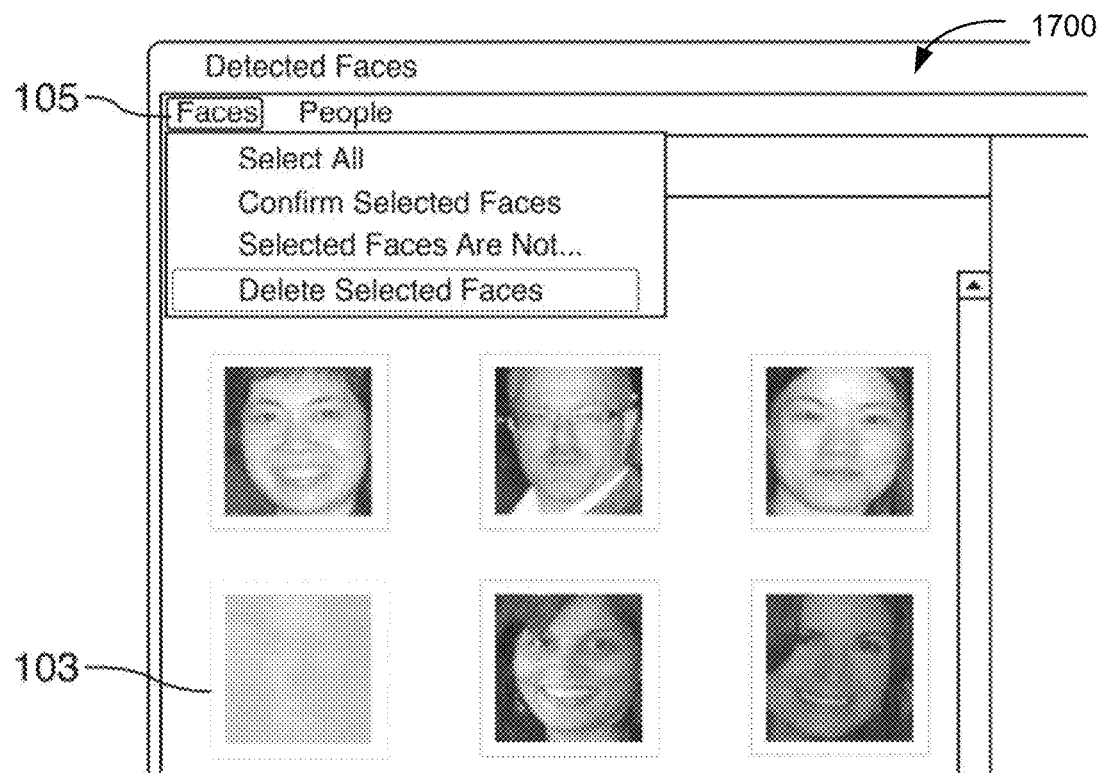
FIG. 17 illustrates a means by which a user may delete false positive face detections in an image.

FIG. 17 illustrates a GUI 1700 by which a user may delete false positive face detections in an image. During the face detection and eye detection phases, there may be false positive errors. These may occur when the face detection technique determines that a face exists even though there is actually no face on the original photo image. To correct these errors the GUI 1700 may enable the user to delete false positive errors by moving the face 103 (with the face being identified by a bounding box on the image) over a deletion area (which may be represented by a wastebasket or other representative icon) using a mouse or other input device, by pressing a keyboard's delete key while the face is highlighted, or by selecting a menu option 105 corresponding to deletion of the face.

Figure 18:
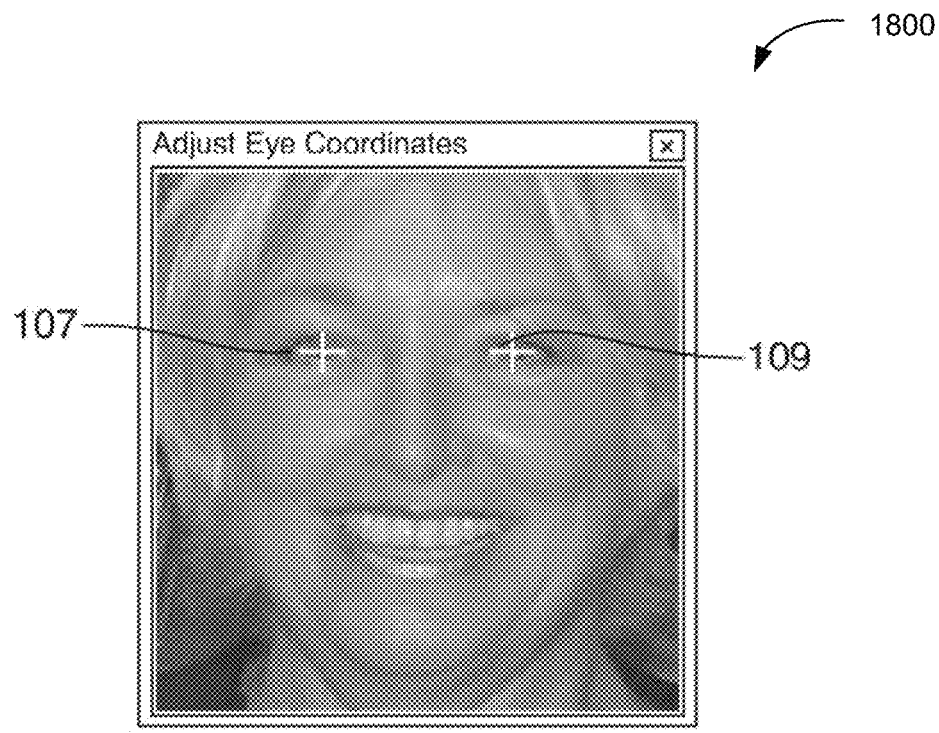
FIG. 18 illustrates a means by which a user may reposition detected eye coordinates corresponding to a face in an image for the purpose of increasing accuracy of the detection algorithm.

FIG. 18 illustrates a GUI by which a user may reposition detected eye coordinates corresponding to a face in an image for the purpose of increasing accuracy of the detection algorithm. During the face detection and eye detection phases, there may be errors in eye location coordinates 107. The method of the present invention may determine the eye pupil location and display the eye coordinates 107 visually on the image, but the generated coordinates may not be perfect because they may be an approximation in some cases (for example, a face with sunglasses). The GUI may allow the user to manually reposition the eye coordinates 107, for example by moving the icons 109 representing the eye location with a mouse or other input device. In this way, the accuracy and performance of the invention can be increased as the eye coordinates 107 are typically used to generate a face signature for the face. A change in the eye coordinates 107 may therefore generate a change in the face signature that may significantly affect associating signatures with other with known faces. In addition to the use of eye coordinate embodiments may employ an edge detection technique to align face templates with the detected faces in an image. The alignment method provides another method to confirm the face to reduce false positives. This technique could be performed by aligning the top/bottom and left/right sides of the face with the alignment template and generating a numeric measure of confidence.

Figure 22:
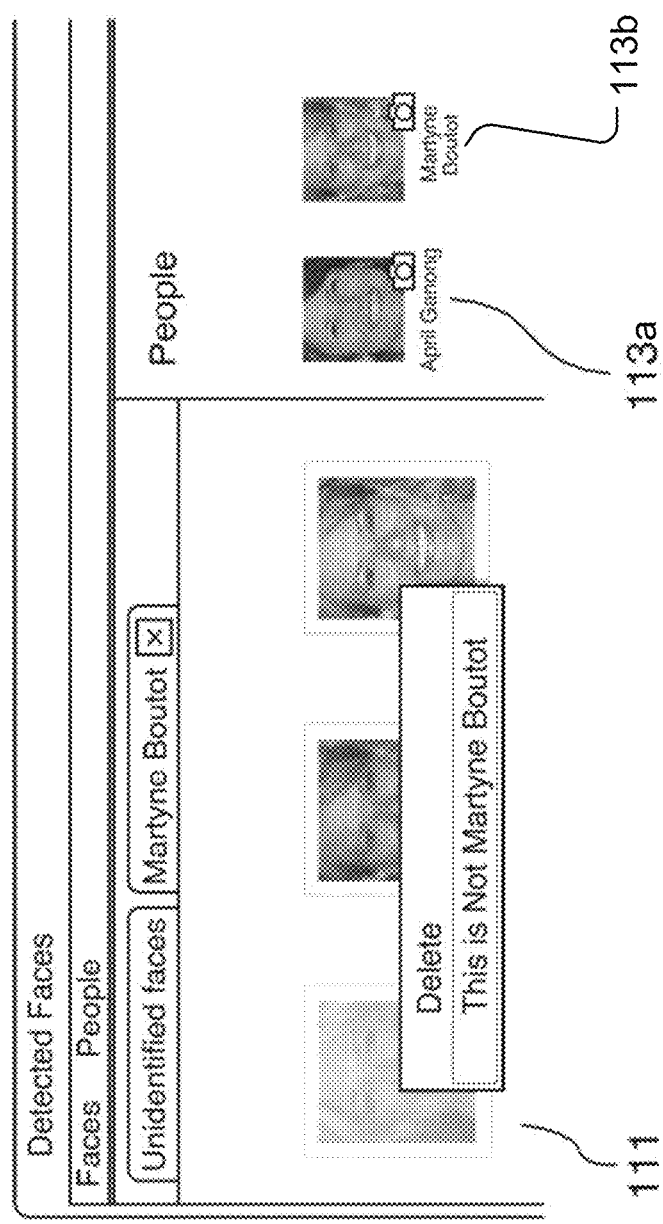
FIG. 22 illustrates deletion of a false positive face detection error.

FIG. 22 illustrates deletion of a false positive face detection error. During the face recognition phase, there may be false positive errors related to incorrect association of a face with a known person. A false positive error may result if the embodiment matches a face signature to a known person and it is not a correct relationship. The GUI 2200 may allow the user to drag the face image 111 (thumbnail) over the face image (thumbnail) of the correct known person 113a, 113b. The embodiment may then modify the link in the database to show the new relationship between the face and the known person. The old relationship may also be deleted.

Another category of errors is false negatives. There may be two situations categorized as false negative errors, which are illustrated in FIG. 6:

In a first example, the system may not detect a face in an image when there actually is a face 47, and the GUI may allow the user to draw a bounding box around the face using a mouse, or other input means, and then place both eye locations by using icons representing the eye location. The system may then use the manually entered information to generate a face signature and perform the face recognition method provided herein. Alternatively, the system may enable the user to manually associate a tag with the face without involving the face detection or recognition process. This manual tagging method may also be used to tag other objects and animals in the images—such as pets—where the human face detection method employed does not result in automatic detection of said object or animal.

Figure 19:
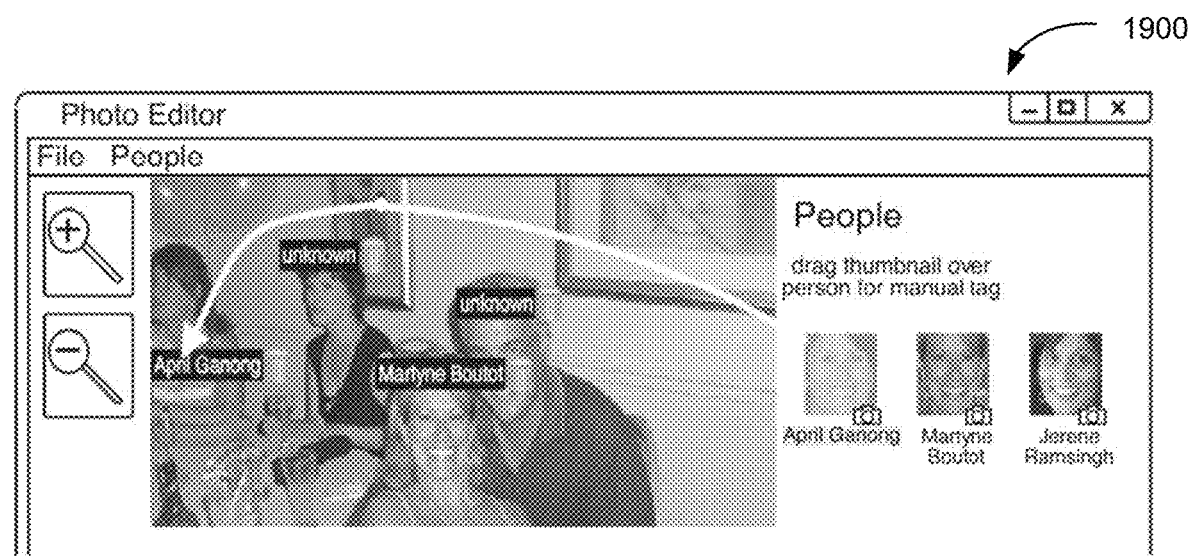
FIG. 19 illustrates the process of manually tagging a face in an image.

In a second example, there may also be a false negative error where the system detects a face but the face signature is not matched with any known face signatures even though it is a face of a known person. This may occur if the difference between the signature for the face and any other face signatures for that particular person are too dissimilar. In this case, the system may not automatically detect the relationship and the face may remain unknown. In this circumstance, the GUI may allow the user to drag 49 the face image over the face image of the known person. By doing this the system may link the face image to the known person in the database. With this assistance from the user, the system now has another face signature that will be used for future comparisons with new and unknown face signatures. This may improve the accuracy of the present invention. FIG. 19 further illustrates the process of manually tagging a face in an image.

Automatic Selective Dissemination of Images

Figure 7:
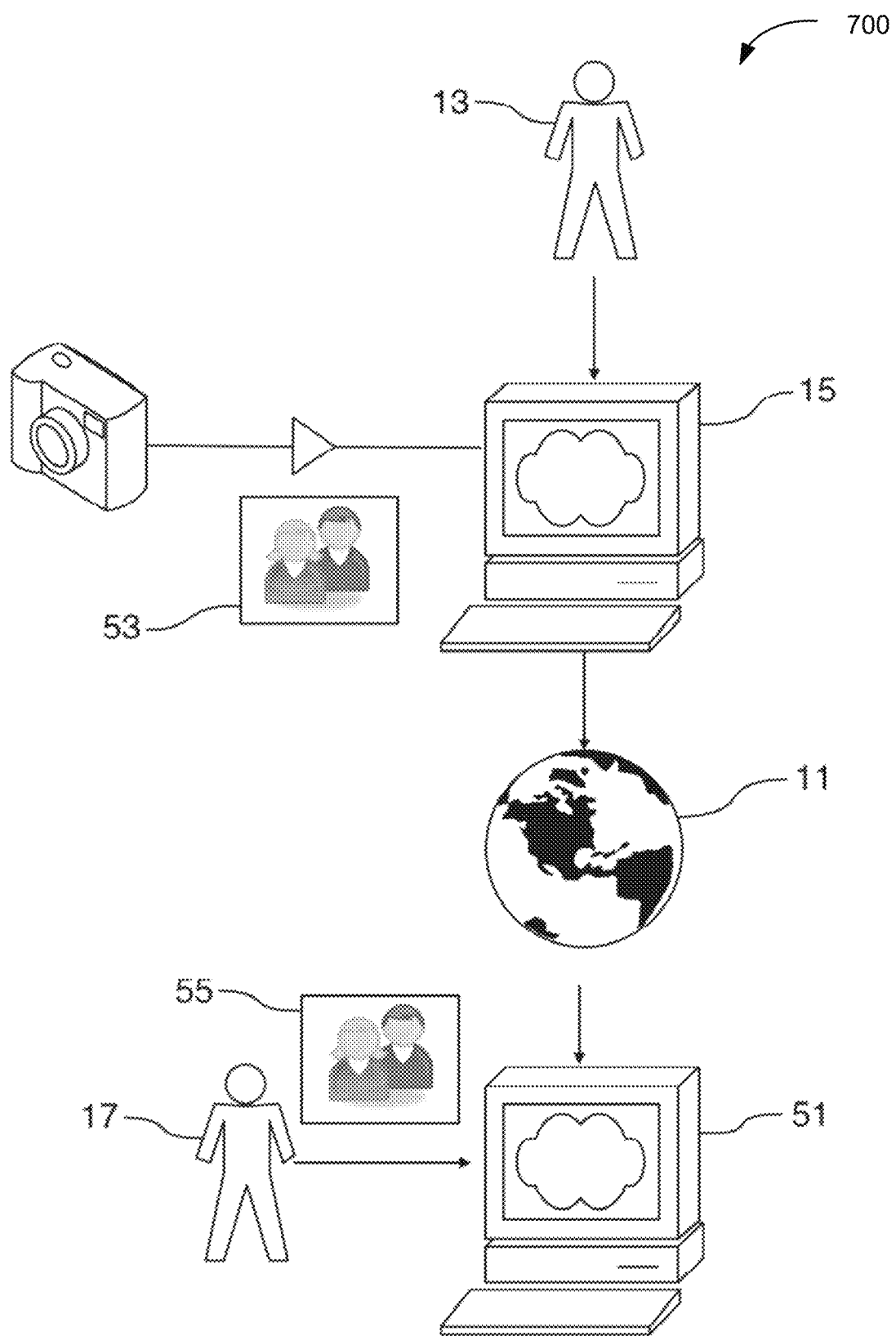
FIG. 7 illustrates a system and method for providing the automatic selective dissemination of photos between users of the invention in the same peer group.

FIG. 7 illustrates a system and method for providing the automatic selective dissemination of photos to other computing devices, including a security platform implementing authentication processes. When the face of a known person that is a member of a specified group is recognized within a photo 53, the photo 53 may be queued to be transmitted across the Internet 11 in a secure fashion to the security platform. For example, a first user (13 may upload to their computer system 15 a photo containing the face of a known person that is a second user 17, who is also a member of the specified group. In this case, when the system determines a face match, the photo 53 may be queued for transmission to the security platform (e.g. computing device 51). Prior to transmission the photo 53 may be reduced to a smaller version and metadata may be included in the digital photo file. The corresponding reduction in size may optimize the use of bandwidth. In a cloud implementation the photo may be physically transferred or the file ownership may be expanded to include the peer group member. The file may or may not be transferred or duplicated.

Another novel aspect of the present invention uses existing social network service and web-based photo storage sites to disseminate photos and images of a specified group to security platform. The invention may transmit a single photo or group of photos to a target web or cloud based service. The transmitted photos may already contain metadata about the people that are in the photos. The present invention may be equally adaptable to other social network service and web-based photo storage sites. As described above, a user may also upload photos directly from a mobile device that incorporates a camera across the Internet.

Figure 8:
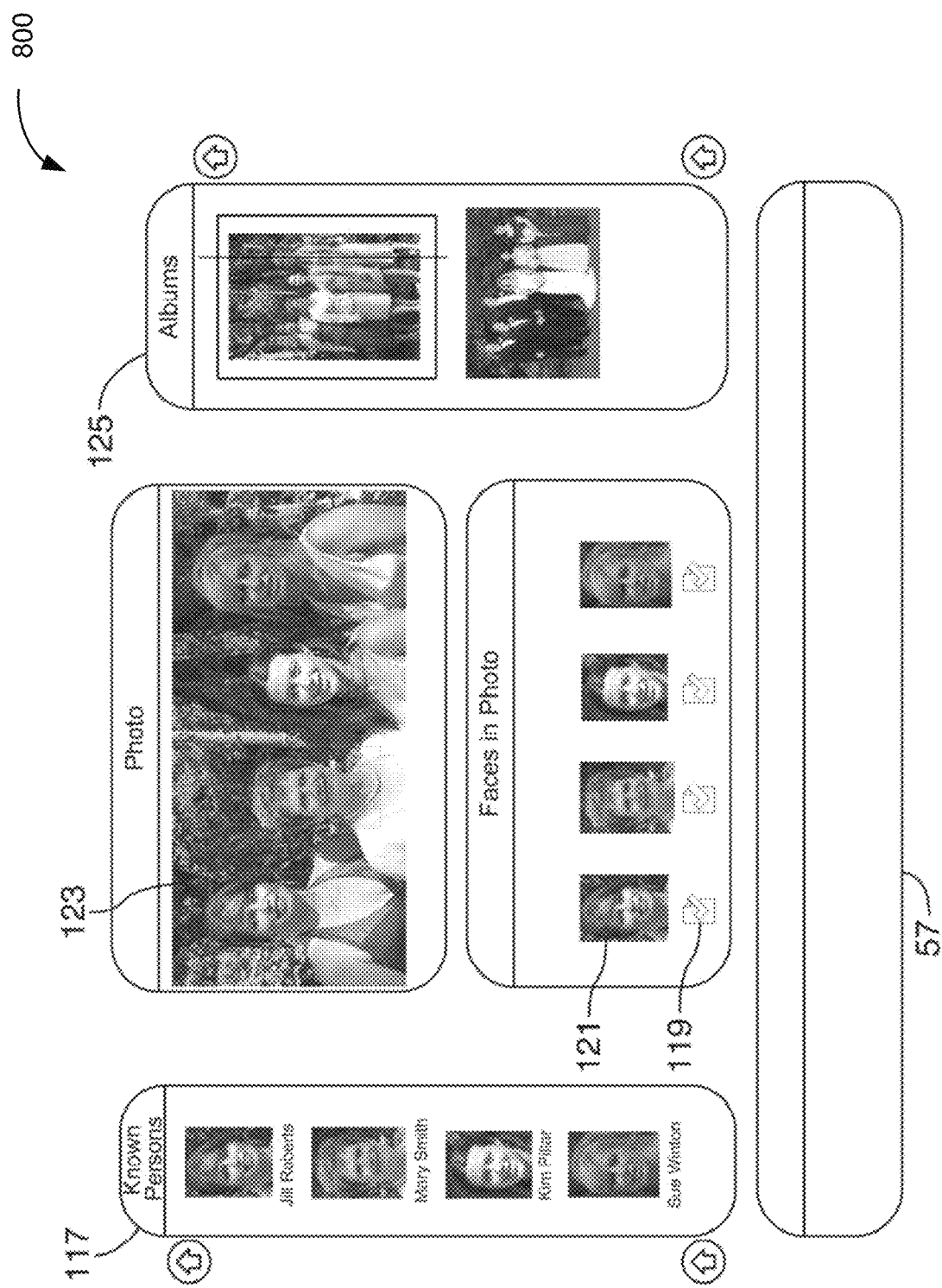
FIG. 8 illustrates an example embodiment of the graphical user interface that may enable browsing of photos and the face database managed by the computer program.

FIG. 8 illustrates an example embodiment of the GUI that may enable browsing of photos and the face database managed by the computer program. In this example a user interface is shown with optional banner advertising 57 that could be sold to advertisers. A user may select a photo 123 from an album 125, and the GUI may display thumbnails 121 corresponding to known persons 117 found in the photo 123. Checkboxes 119 may also be used to indicate the presence of the known persons 117 in the photo 123.

Figure 9:
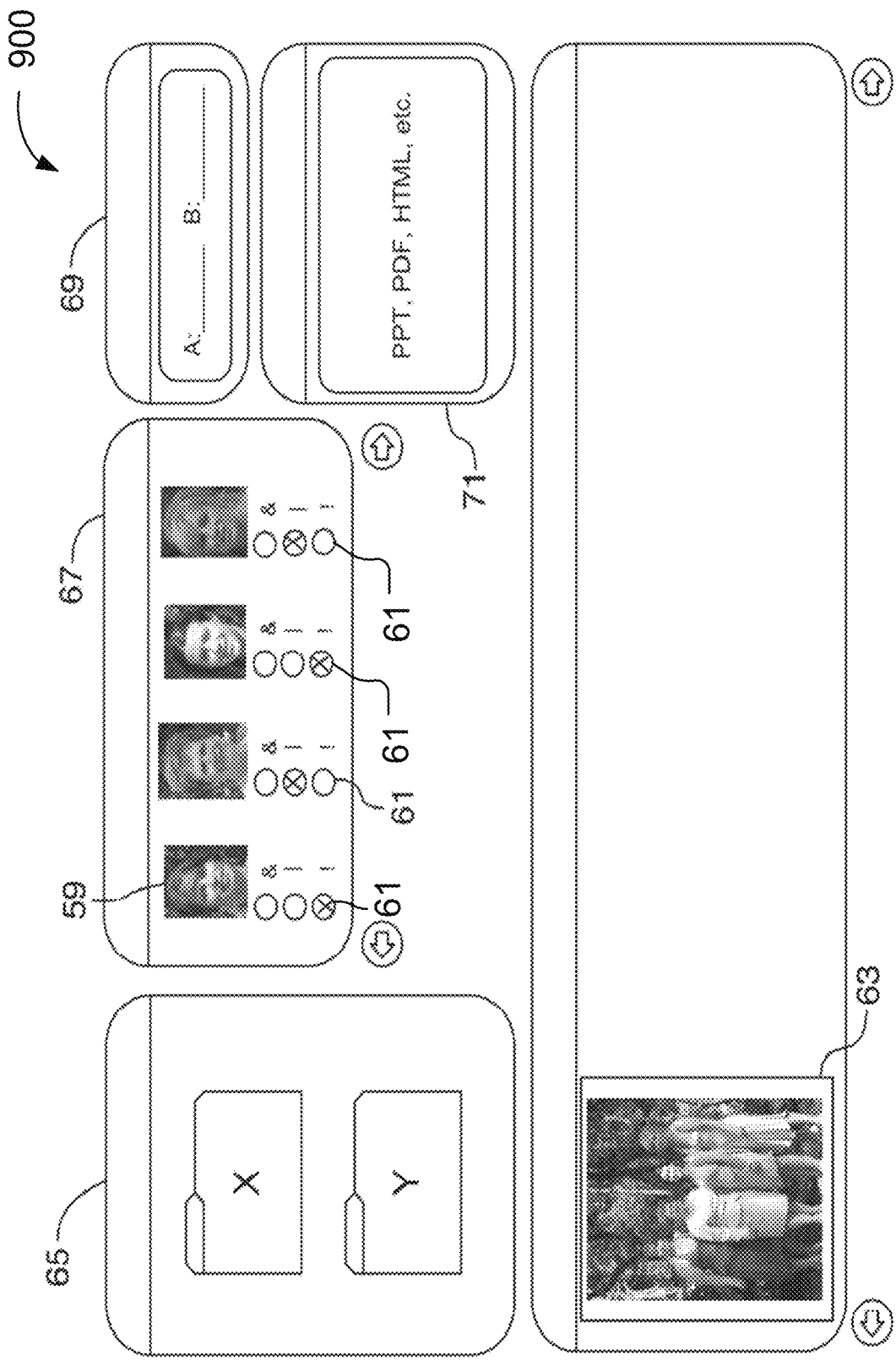
FIG. 9 shows face images for known persons plus Boolean operators to narrow the field of photos.

The example depicted in FIG. 9 shows face images for known persons plus the checkboxes 61 for applying Boolean searching such as AND, OR, and NOT selections associated with names of known persons or metadata related to images. A novel feature of the invention is the ability to select photos in a visual manner by allowing the user to click on a thumbnail view 59 of the faces of known persons 59, and applying Boolean operations 61 for each face enabled by checkboxes 61. This aspect of the GUI enables the creation of an album by combining various search criteria and filters that are applied against the total photo and face database. In a further embodiment of this invention, the user could assign an image (real, hand-generated or computer generated) to a specific person and that replacement image is overlaid over the portion of every image where that specific person is found.

Search criteria provided by the computer program may include:
- Folder selection 65, indicating the folder location or file name of photo images on the computer storage device;
- Known persons 67, providing the selection of Boolean operations (AND, OR, or NOT) associated with the faces of the known persons;
- Date range 69, providing the selection of a range of dates corresponding to the photo images to be included in the specific album;
- EXIF data, providing a selection means based on standard photo related information usually appended to the photo by the camera during the photo taking process.

An alternative method of selecting photos for an album may provide the user the ability to drag and drop individual photos or groups of photos over top of the name of the album 63, or to otherwise associate the photos with the album 63, using the GUI.

An album 63 may be a group of photos that are saved as a logical entity under the name of the album. The user may specify via the GUI that it wants to send the album to various target file types or locations 71, including a slide show, MICROSOFT™ POWERPOINT™ or other presentation computer programs, ADOBE™ PDF™ or other document file, a web-based sharing site such as FLICKR™ or FACEBOOK™, or a third party printing service.

Figure 10:
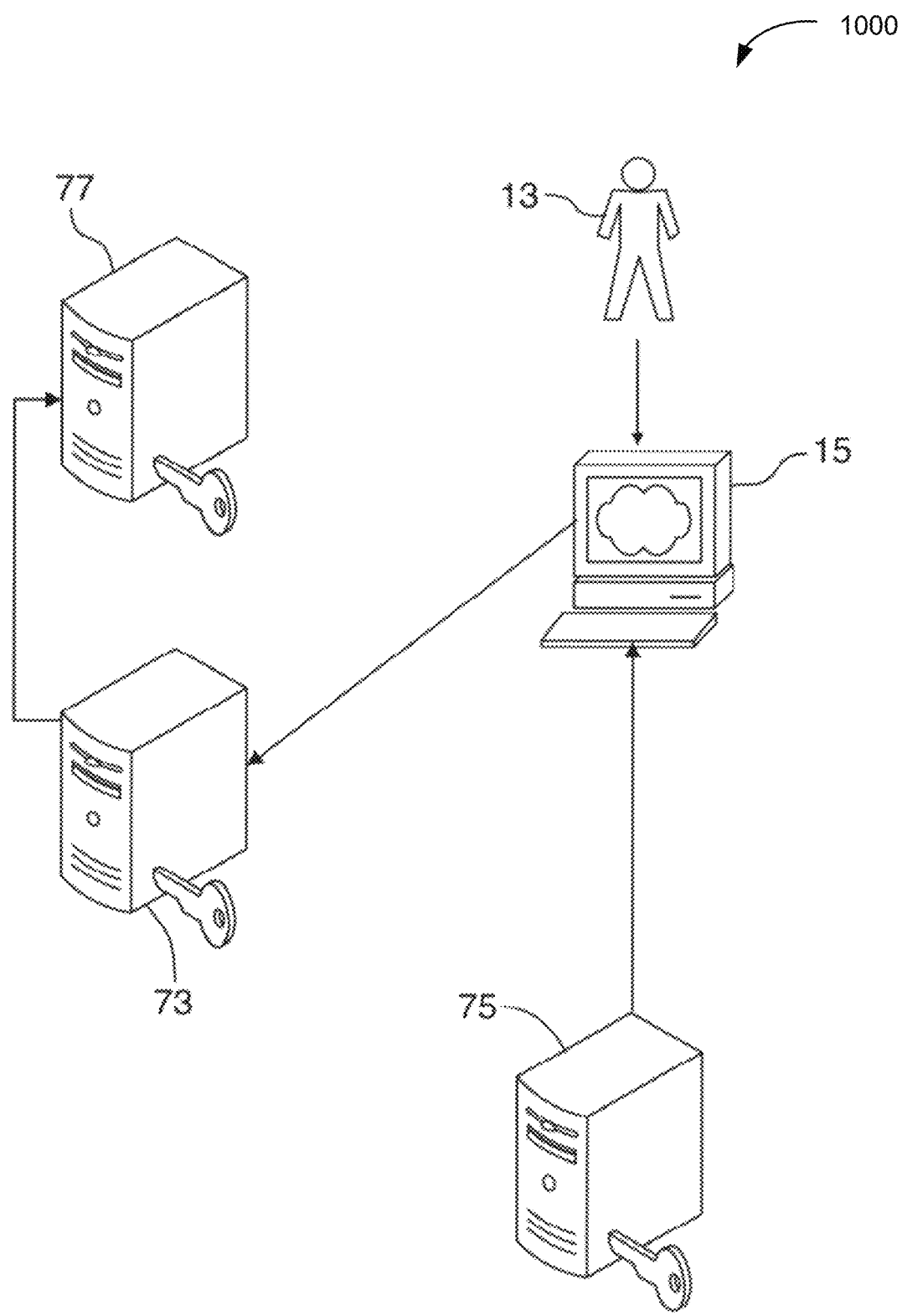
FIG. 10 illustrates an optional advertising display capability provided by the GUI.

FIG. 10 illustrates an optional advertising display capability provided by the GUI. This provides a secure method for simultaneously targeting advertising based on user demographics and maintaining user privacy. The GUI may prompt new users 13 for demographic information that may at a minimum include gender, age and location data. This information may be stored locally on the computer system 15 running the computer program. A request may periodically be sent to a web-based server 73 to return a list of ad pointers. The request may contain an encrypted transmission of the demographic data for the user. The request may also be signed using a certificate issued by a registration server 77. This latter step may verify the authenticity of the request. The web-based server 73 may conduct a process of matching ads, which are associated with target demographic information, to the requesting user 13 based on their specific demographic information. A list of pointers (i.e. references to ads that exist on different ad servers) may be returned to the requesting user's computer system 15 and passed to the computer program. The computer program may then issue another request to a different web-based server 75 to download the ads referenced by the pointers. The web-based server 73 may then discard the demographic data to protect the privacy of the individual user.

By separating the web-based servers 73, 77 that perform the ad matching process from the servers 75 that actually deliver the ads, and by not storing the personal demographic data of the user on either of the web-based servers 73, 77, the personal information about the user is significantly more secure than it otherwise would be. The ad delivery servers 75 may store information about ads served for billing purposes but there may be no personal information included in that data. This is a novel implementation for serving ads to any web browser or software program in a secure fashion using demographic data.

Further Implementations

In another exemplary non-limiting optional aspect of embodiments described herein, a computer program can receive digital face images or signatures from the central registration server for authentication of a user. For example, an organization seeking to find an individual (such as a missing child or a wanted criminal) may post the individual's face data. Those users that have opted to share their face database may download the data enabling an automatic comparison of the face data with their face database. The organization may be alerted if a match is found between the target individual and a known person for a specific user. This could enable the organization to determine a recent or current location of the individual. It could also enable the organization to determine the name of an individual, since the individual's name may be listed in one or more of the user's known persons list. The biometric information captured as part of the authentication process can be used and compared to the users in the face database or repository.

Yet a further embodiment provided by the present invention may enable an individual to find other persons with similar facial features as themselves. Such an application may be useful for a person to find their twin, for example. In this embodiment, a user may submit a photo including an image of their face, from which the present invention may generate a face signature. The face signature may then be compared to other individuals' face signatures that have been previously uploaded. Based on a predetermined similarity threshold, one or more similar faces may be reported to one or all of the individuals whose faces match. A system in accordance with this embodiment may provide a means for a user to approve contact with others. Matched individuals could choose to send a message to one another if they have specified their approval for such contact. A similar embodiment could be deployed as part of a dating service to match people based on looks.

Face Detection, Eye Detection and Face Recognition

The present invention, in yet another aspect thereof, provides a method for generating face signatures based on faces depicted in images. The face signatures may be generated by using a technique that includes the steps of face detection, eye detection, and face recognition. The face signatures may also be generated using a series of images that represent a movement of a face of user. This may mitigate against spoofing as described herein by providing an additional authentication step to verify if the user depicted in the biometric data is actually a human and not an unauthorized user merely presenting a photo or video of the authorized user to spoof the security platform. The movement can involve rotation around the roll (e.g. front to back axis), the pitch (e.g. the side to side axis), and the yaw (e.g. vertical axis). The face signature generated by the movement of the user's face can be used for face authentication to verify that the user is an actual human (e.g. not a static image or video of a human) and that the user is the correct human or the authorized user (e.g. the user is John Doe and not an imposter). After the first check is confirmed (e.g. face authentication to verify that the user is an actual human) then an audit trail may be generated as described herein to capture and store the biometric data that will form part of the audit trail. The audit trail may capture data for unauthorized users which may be helpful to determine the identity of the unauthorized user. Implementing the audit trail process after it is first determined by face authentication that the user is an actual human may reduce use of memory and processing resources, and may also enhance privacy as biometric data is only stored for actual humans (and not static images of other users).

Face Detection

The present invention, in one aspect thereof, provides a method for utilizing a texture-based face detection algorithm as a base method for face detection. Face detection may be used for face authentication as described herein. Other methods of face detection may be used for the face authentication described herein and these are examples only.

The texture-based face detection process may have a low true-positive rate for specific facial poses, for example rolled frontal faces. This may be due to the texture pattern being trained on frontal face images which differ from the varied facial poses found in normal digital photos. In reality, having a mismatch between the texture pattern used to train the face detection process and the type of poses in the target photos on which the process is applied would result in a higher percentage of errors. Two well-known challenges presently faced in face detection include decreasing false-negative errors in the case of rolled frontal faces and reducing false-positive errors while not increasing false negative errors.

Embodiments described herein enhance texture-based face detection by applying techniques involving three steps to improve the accuracy of the face detection process. In the first step an application of the known skin color ratio test on a texture-based face detector is provided to improve the accuracy of the detector. In the second step, a method for reducing false-positive face objects is provided by reducing the size of detected face object regions to a predefined size. In the third step, a face orientation compensation method is provided.

Figure 11:
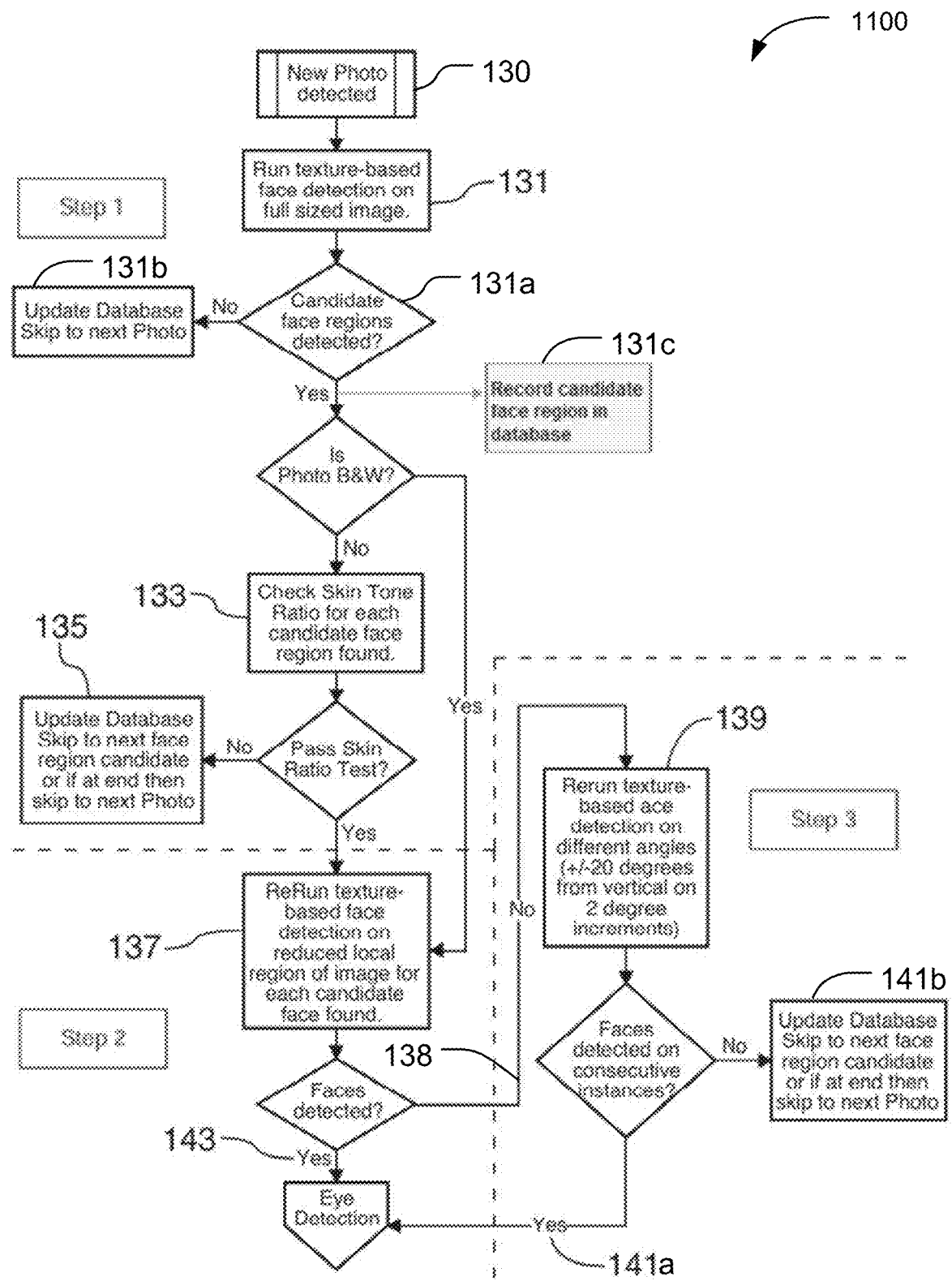
FIG. 11 illustrates the texture-based face detection method of the present invention, in one aspect thereof.

FIG. 11 illustrates the texture-based face detection method according to some embodiments.

In one particular implementation of the texture-based face detection method, in the first step, the texture-based face detector 131 may initially be set for a high target true positive rate which has a corresponding high false positive rate. The texture-based face detector may be run with the entire photo image as input. The results from this run may give a list of potential face objects in the photo. Any candidate face regions detected at 131*a* may be recorded in a database 131*c*. At 131*b*, the database is updated and the process processes the next photo image. For a color photo, a skin color detection test 133 may be performed on the potential face objects to reduce the false positive rate. This skin color test may compare the ratio of the face object area containing skin color to the total area of the object. If the ratio does not exceed a pre-determined threshold then the potential face object may be skipped 135.

In the second step, detected face object regions that result from the first step may be reduced to a predefined size 137 (such as 44 by 44 pixels). On these reduced regions, the texture-based face detector may be run again 137. The goal of this step is to reduce false-positive face objects. By running on a small size (such as 44 by 44 pixels) input region, false positive errors from incorrect texture patterns from non-faces may be reduced while true positive texture patterns may be preserved. This may result in a reduction in the false positive rate of face detection while preserving the true-positive rate. Face objects that are deemed to be faces in the second step may be accepted 143 as true faces. Those that do not pass this second step 138 may be passed to a third step.

In the third step, a face orientation compensation method is provided. In the second step described above, in which face detection is performed on smaller regions of the image 137, the true positive rate may be reduced in the case of rolled faces. The texture pattern in rolled faces may be deemed to be a non-face by the face detector due to the size reduction applied in the second step. To preserve the true positive rate in rolled face cases, face orientation compensation 139 may be performed together with face detection. In this method, the local image region is rotated with an incremental angle and each angle instance may be run through the face detector. One example implementation would rotate the image 2 degrees starting at −20 degrees from the vertical axis and repeating the rotation through +20 degrees from the vertical axis. If rotated face regions are recognized and exist in instances with consecutive incremental angles then the local image region may be determined 141a to be a true face.

These modifications to a texture-based face detection algorithm may significantly reduce the false positive error rate.

Eye Detection

Figure 12:
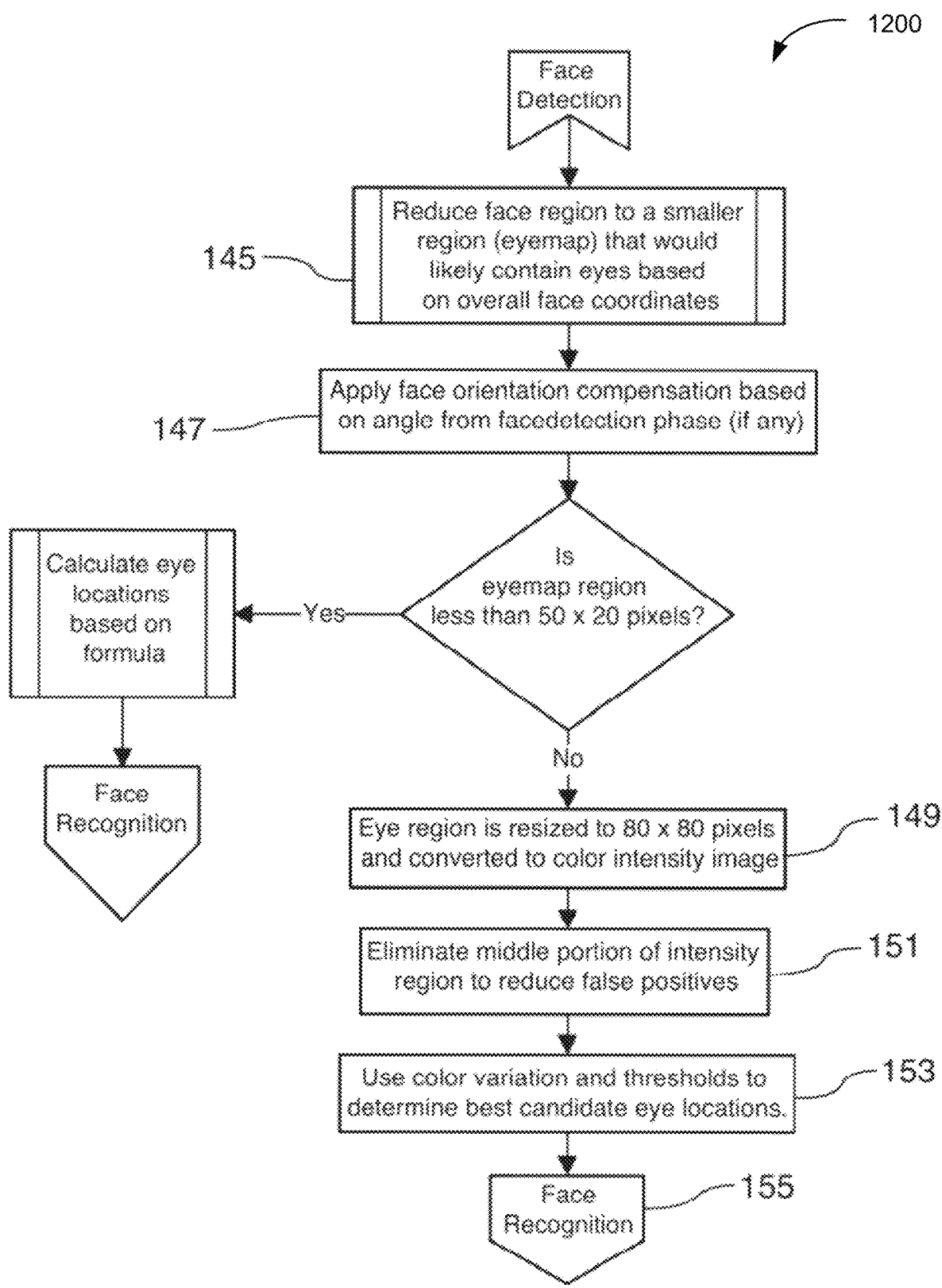
FIG. 12 illustrates a method for eye detection, in one aspect of the present invention.
Figure 14A:
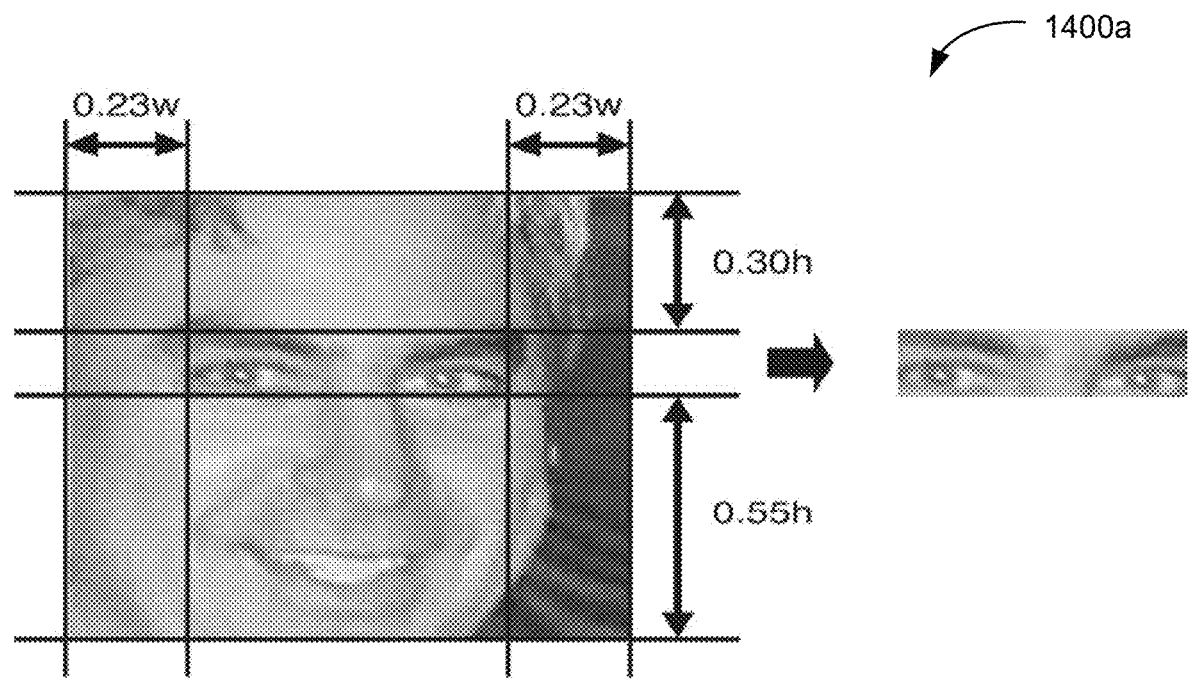
FIGS. 14A, 14B, and 14C illustrate a method of isolating eyes in a photo.

FIG. 12 illustrates a method for eye detection, in one aspect of the present invention. The eye detection method applies novel techniques to improve the accuracy for detecting the pupil locations in detected face regions. The first step may be to reduce the overall face region to a smaller region (an "eyemap") 145 that would likely contain the actual pupil/eye locations. A formula may be used to crop the eyemap region from the face region. For example, the formula used to crop the eyemap region may be to remove 0.23w on the left, 0.23w on the right, 0.55h on the bottom and 0.30h on the top; where w is the width of the face region and h is the height of the face region. FIG. 14A illustrates a particular embodiment of the method of cropping the eyemap region from the face region.

Furthermore, if the face was detected in the third step of the face detection method on a specific angle instance, then the angle of rotation may be applied 147 to the eyemap region to enable a more accurate selection of the eye locations.

Figure 14B:
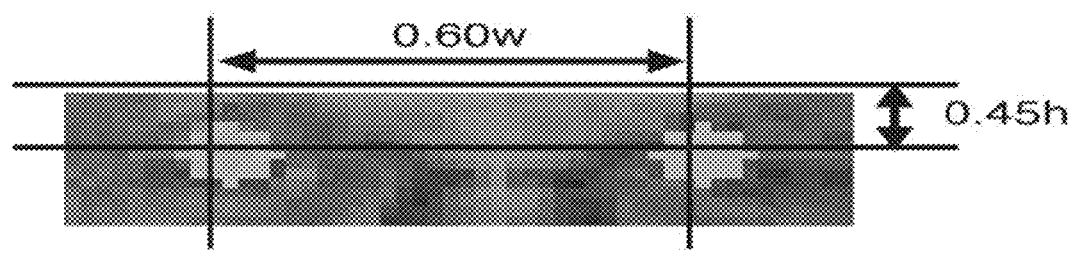

FIG. 14B illustrates that the formula used to crop the eyemap region may be altered to ensure that the eyemap region is large enough to ensure satisfactory pupil detection results.

Once the eyemap region has been cropped, the eyemap region may then be re-sized to a fixed size (such as 80×80 pixels) 149 so that a fixed template color variation method may be applied to determine the candidate eye locations. This method may be based on the darker intensity of the pupil relative to the surrounding area of the eyemap region.

Figure 14C:
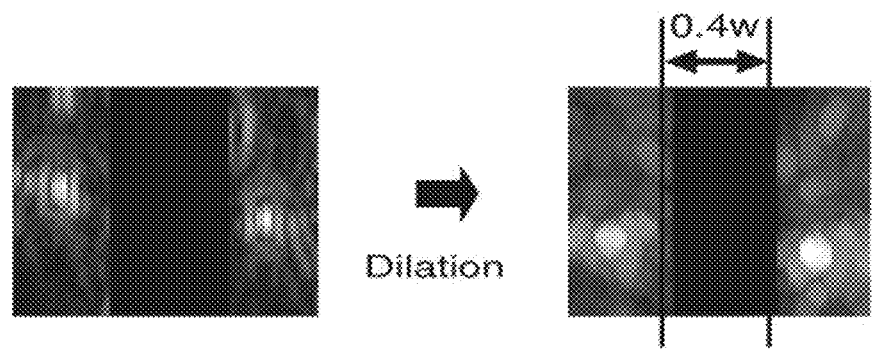

The middle of the color intensity image may be set to zero/black 151 in the intensity map to remove potential pupil candidates that typically result from light reflecting off lenses and the frames of glasses. FIG. 14C illustrates this process.

The color variation image may be obtained from the color intensity image and may then be passed through a threshold filter so that only a small percentage of the eye region is white (for example, a 2% threshold may be applied) 153. Next, a "best fit" method may be applied to choose the eye locations with the highest intensity of color variation (left and right side). The best candidate pupil location coordinates may be passed along 155 to the face recognition method of the present invention.

Face Recognition

Figure 13:
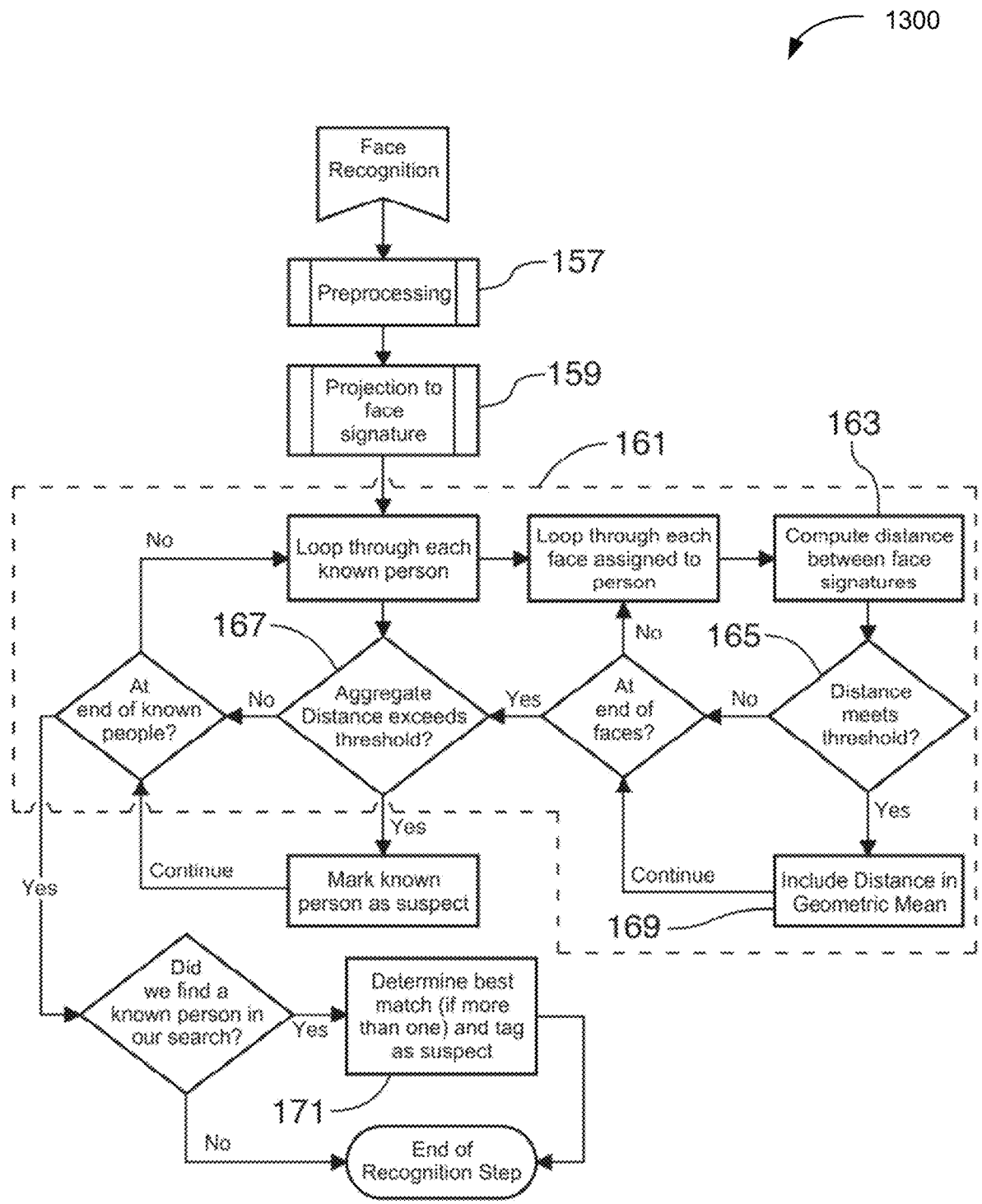
FIG. 13 illustrates the face recognition method, in one aspect of the present invention.

FIG. 13 illustrates the face recognition method, in accordance with aspects of the present invention. Face recognition may generally be performed through pre-processing 157, projection 159, distance calculation 163 and aggregation 167. Principal Component Analysis (PCA) may be employed by the face recognition method. PCA is a known method, used abundantly in all forms of analysis because it is a simple, non-parametric method of extracting relevant information from confusing data sets. Face recognition may be used for face authentication as described herein. Other methods of face recognition may be used for the face authentication described herein and these are examples only.

Embodiments may employ PCA in a novel way that overcomes its traditional issues with respect to high sensitivity to subject lighting and pose, given that personal photos may have little variation in pose since most subjects may tend to look directly at a camera. Embodiments may take advantage of the fact that sets of photos depicting particular persons may be taken over a variety of pose and lighting conditions. Embodiments provide a method of aggregating the comparison between the target unknown face and this plurality of faces associated with each known person.

Pre-processing 157 may first be applied to the image. The face region and eye coordinates provided as input to the face recognition phase may be used to normalize the face region. The normalization process may include translating, rotating and scaling the face region to a predetermined template size. The normalization process may use the eye coordinates as reference points such that the face region image is adjusted to place the eye coordinates on specific image pixels. A standard fixed masking process, potentially limiting the face region to the area inside an ellipse, may then be applied to the image to filter out non-face portions. A flattening process, involving running a two dimensional linear regression on the intensity of the pixels in the face region, may be used to ensure pixel intensity is spatially uniform across the image. Finally, a histogram image equalization (an image processing method known to those skilled in the art whereby the contrast of an image is adjusted using the image's histogram) may be performed in the greyscale domain.

Projection 159 may then be applied to the image. The resulting pixels of the normalized face region may be passed through a PCA-based formula to create a PCA vector that is used as the face signature by the invention. The PCA vector may comprise a projection image resulting from principal components extracted from a large set of generic images.

The face signature created from this method may be an array (from the PCA vector) of real numbers of a given dimensionality. Although the exact dimensionality of the vector space may be determined adaptively with its maximum value set to the value capturing, for example, 95% of the input image energy, the default value used may be a dimensionality in the range of 50 to 100.

Finally, looping 161 may be applied to match the unknown face with a known person. Each face signature (represented as an array of numbers) may be mathematically compared to any other face signature using linear or non-linear classification logic to determine a distance value 163. For example, two signatures may be compared by computing a normalized inner product distance.

To compare a face to all of the faces associated with a known person, all of the individual one-to-one comparisons may be made, and then either all of the results may be used in the next step or a set of best matches as determined by comparison to some threshold 165 may be used. The threshold chosen may be chosen such that on average half of the distances obtained when comparing a face to a non-matching person are kept.

Some form of aggregation may be used to combine the set of distance values obtained in the previous step to determine the distance between the face and a known person. This aggregation may be the computation of the geometric mean of the distance values 169. The geometric mean may be an averaging technique similar to an arithmetic mean, but it may be computed by multiplying the N numbers to be averaged and then taking the Nth root of the product as the desired average. The closest match between the face and each known person may be found by computing this aggregate distance 167 between the face and each known person in the database and choosing the minimum distance.

Finally, the closest match distance may be compared 171 against a static or dynamically determined threshold to reduce the rate of false positive matches. If a dynamically chosen threshold is used, this threshold may be determined by first assuming the aggregate distance values obtained when comparing a face to a non-matching person having N associated faces are normally distributed (for each possible value of N), and then using the inverse cumulative normal distribution function to compute a threshold which ensures that, on average, a fixed maximum number of or fixed ratio of the unknown faces are falsely matched to a known person. This threshold may vary from person to person as the number of faces, N, associated with each person changes. The advantage of this dynamic threshold calculation includes that the fixed maximum number (or ratio) may be kept as small as possible to limit false positive matches while maintaining an acceptable level of true positive matches for the user.

Figure 13A:
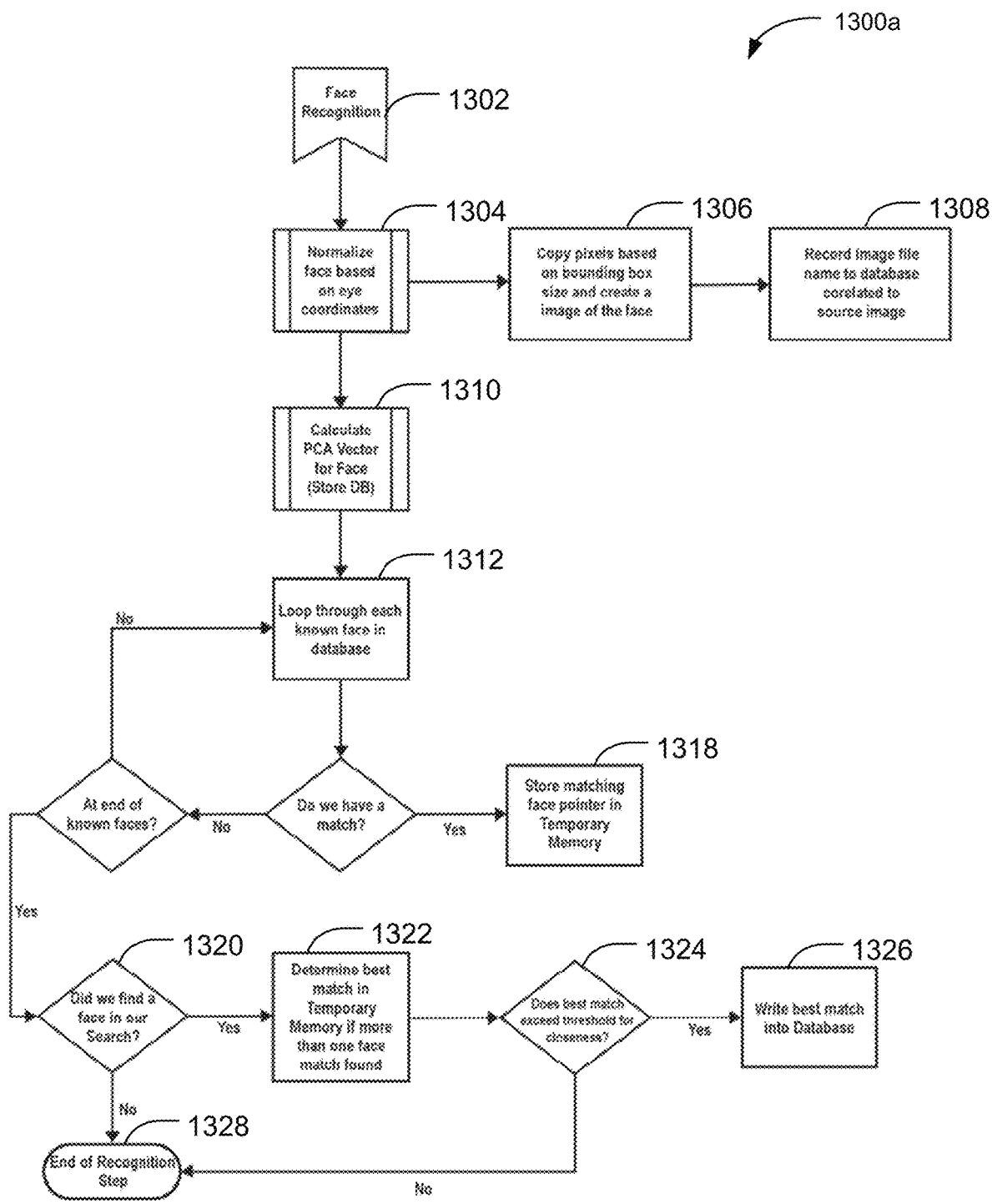
FIG. 13a illustrates the face recognition method, in one aspect of the present invention.

FIG. 13*a* also illustrates the face recognition method, in accordance with aspects of the present invention. The face recognition method shown may normalize a face based on eye coordinates 1304. Each face may be defined by a bounding box determined by the face recognition method. The pixels based within the bounding box may be extracted to create an image of the face 1306. The face image may be recorded to a database and associated with the respective source image from where the face image was extracted 1308. The PCA vector for the normalized face may then be calculated and stored in a database 1310. The PCA vector may be compared against the known faces in the database 1312. If a match is found, a face pointer may be stored in memory 1318, such as temporary memory. If after looping through all of the known faces in the databases a match is not found, then the face recognition method determines whether a face was found in the search 1320. If no face was found, then the face recognition ends 1328. If a face was found, then the face recognition method may determine the best match in memory if more than one face match is found 1322. The face recognition method determines whether the best match exceeds a threshold for closeness, as described above 1324. If the threshold for closeness is exceeded, then the best match is written to the database 1326. If the threshold for closeness is not exceeded, then the face recognition ends 1328.

The present invention, in a further aspect thereof, facilitates an optimal training by more than one face signature associated with a person thus improves accuracy. The invention may allow the user to select the representative subset of known faces for a given individual and thus over-ride the subset chosen by the invention. That subset would then be used by the recognition engine to determine suggested matches and ignore other known faces for that person. Examples where this would be beneficial would be where there are multiple poses of a person. It also addresses changes to the persons face due to aging, glasses or changes to the face such as caused by a beard or mustache. By selecting more recent photos as the representative subset, the probability of successful automatic selection for future photos would increase. As the number of face signatures that are linked to known people in the local face database increases, the accuracy of the invention's ability to detect known people automatically in future photos that are processed may also increase. This is a novel feature of this system.

The invention may learn a face by determining the closest match for a previously identified face from the group of known persons. An advantage of the present invention is that as the number of face signatures linked to known persons in the local face database grows, the accuracy of the invention may increase in detecting known persons automatically in future photos that are processed.

Video Scanning

Figure 20:
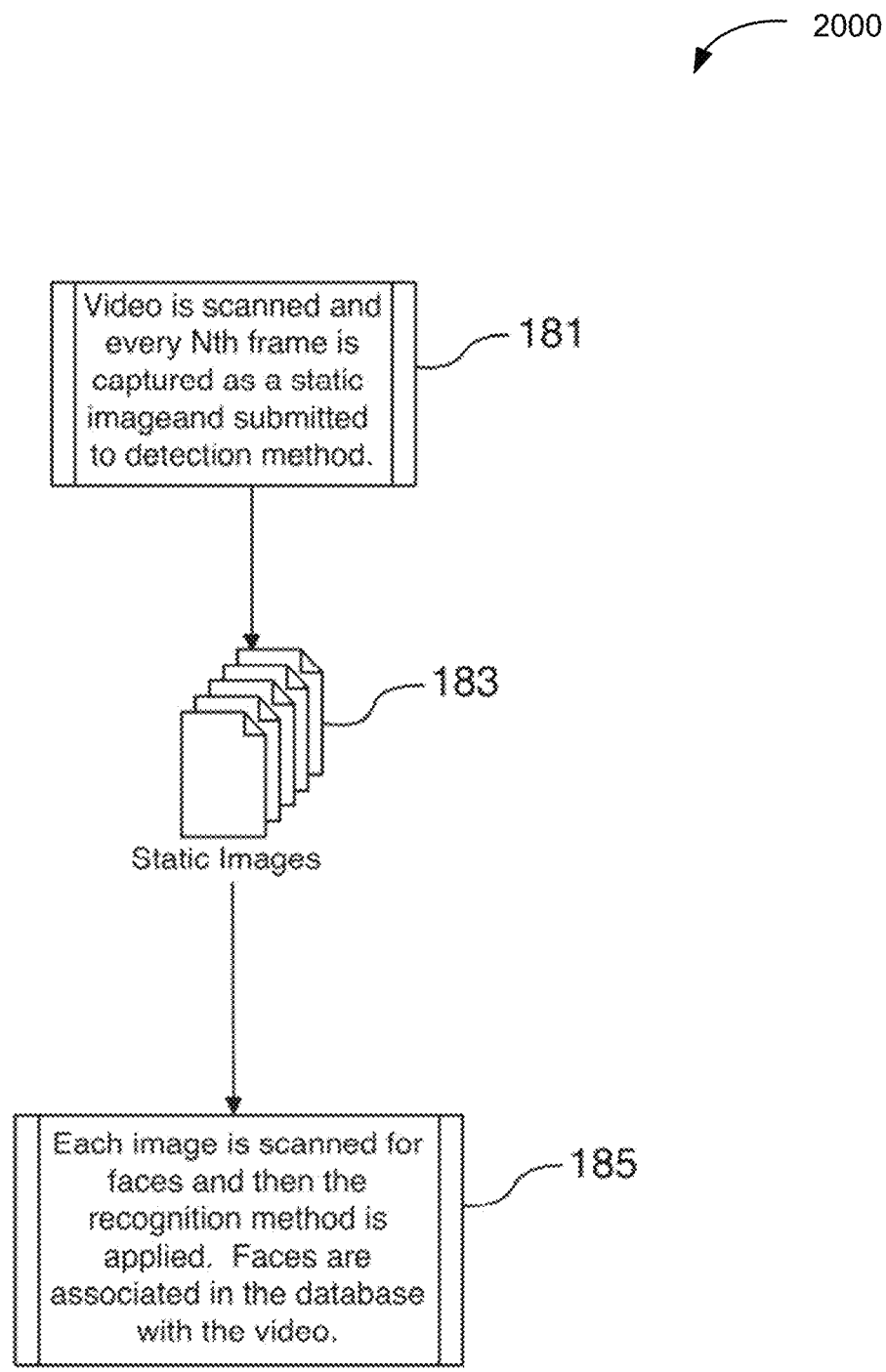
FIG. 20 illustrates a video scanning method whereby frames of video are extracted and face detection is performed on these frames.

FIG. 20 illustrates a video scanning method whereby frames of video are extracted and face detection is performed on these frames. A number N may be set (where N is adjustable) such that video may be scanned every N frames (181) of the video as individual photo images (183) where the previously mentioned techniques (185) would be applied to detect and recognize faces and known persons. The video could then be disseminated in accordance with the techniques provided herein. The video may generate a series of images that capture or represent a movement of the face of the user. The movement can involve rotation around the roll, yaw and pitch for face authentication.

An optional, non-limiting embodiment provided by the present invention enables an individual to find other persons with similar facial features as themselves. Such an application may be useful for a person to find their twin, for example. In this embodiment, a user may submit a photo including an image of their face, from which the present invention may generate a face signature. The face signature may then be compared to other individuals' face signatures that have been previously uploaded. Based on a predetermined similarity threshold, one or more similar faces may be reported to one or all of the individuals whose faces match. A system in accordance with this embodiment may provide a means for a user to approve contact with others. Matched individuals could choose to send a message to one another if they have specified their approval for such contact. A similar embodiment could be deployed as part of a dating service to match people based on looks.

Face and Portrait Extraction and Creation

Figure 23:
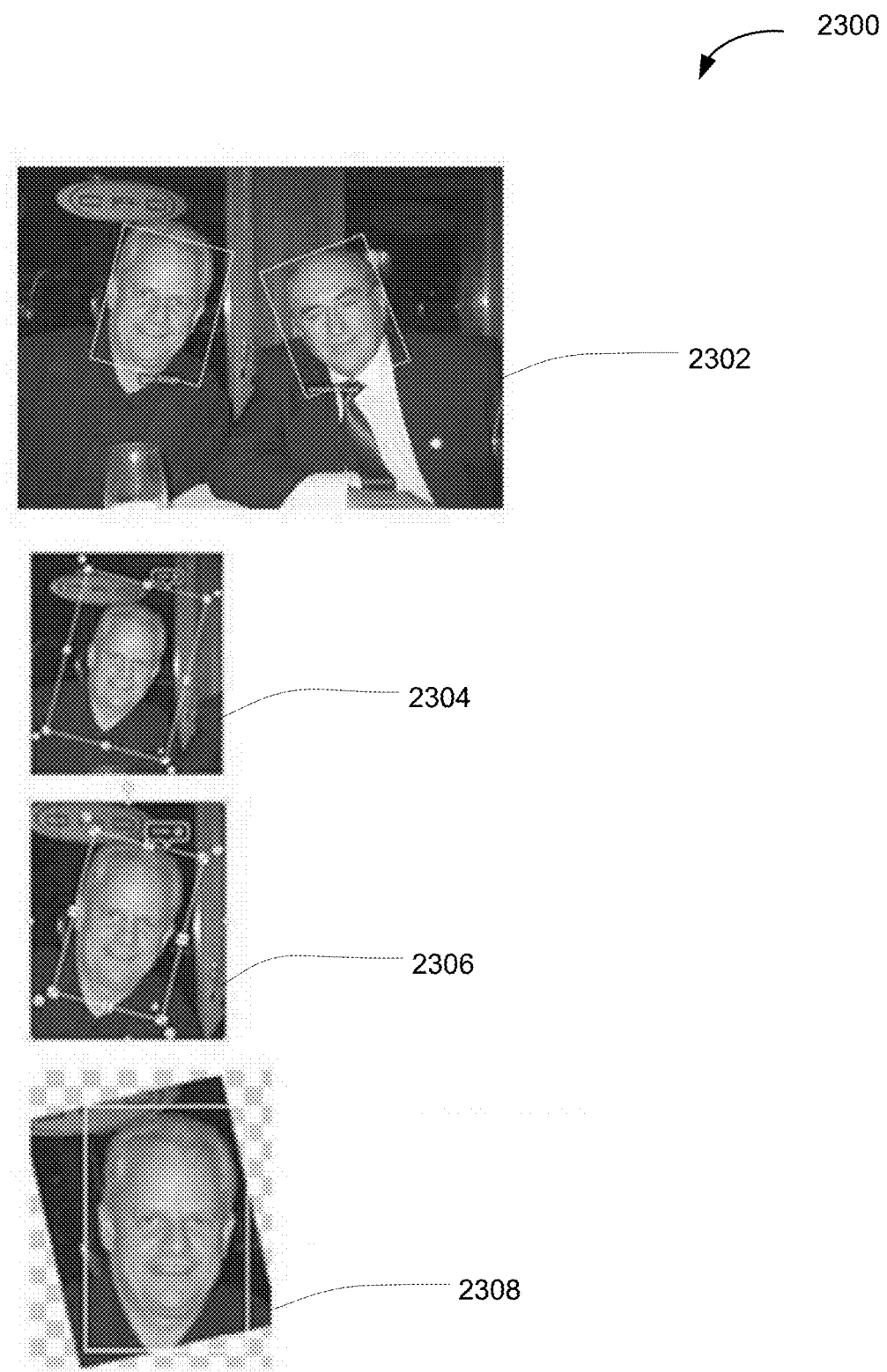
FIG. 23 illustrates one aspect of the present invention wherein faces are located in an image which captures the xy coordinates of the location of the faces providing a method to capture a face and adjust the image of the face both in terms of size and rotation to create a portrait—either full size or thumbnail.

FIG. 23 illustrates the creation of thumbnails or portraits in one aspect of the present invention. Where faces are located in an image 2302 one aspect of the present invention captures the XY coordinates of the location of the faces shown in image 2302 providing a method to capture a face and adjust the image of the face both in terms of size and rotation to create a portrait, which may either be full size or a thumbnail. As illustrated in FIG. 23 the coordinates may define the outline of the face with top left, top right, bottom left and bottom right pixel locations on the original photo which is referred to as a bounding box. The XY coordinates are recorded in the database as illustrated in FIG. 11.

As illustrated in FIG. 23, the faces are located as shown in image 2302 and a corresponding bounding box for each located face determined by the XY coordinates is established and recorded in the database as illustrated in FIG. 11. As shown in images 2304 and 2306 of FIG. 23, the XY coordinates to make the bounding box may be adjustable to make subsequent creation of the bounding box, the area around the face, larger or smaller. Using eye location and identification as depicted in FIG. 18 by reference numbers 107 and 109, the face may be rotated to make the face vertical as shown in image 2308 of FIG. 23.

The record of the portrait/thumbnail image 2308 may be recorded in the database as illustrated in FIG. 13 for future use.

The face segment extracted from an image, along with an optional scanned image of an identification document such as a driver's license, may be used as part of a process to digitally sign a document or an electronic transaction. In some embodiments, the process can insert the information into a separate signature page, demonstrating the person's agreement with the content of the document or transaction. The signature page would include a hash (for example, MD5 applied to the original document or transaction) and watermarks protecting the face image and the identification document image.

In accordance with at least one exemplary implementation of the present invention, at least one computer terminal, server, or other computing device may detect at least one face in at least one digital image. The computer may determine and store area co-ordinates of a location of the at least one detected face in the at least one digital image. The computer may apply at least one transformation to the at least one detected face to create at least one portrait of the at least one detected face. The computer may rotate the at least one portrait at least until the at least one portrait is shown in a vertical orientation and a pair of eyes of the at least one face shown in the at least one portrait are positioned on a horizontal plane. The computer may then store the rotated at least one portrait. Each detected face may correspond to a person. A copy may be made of or extracted from the portion of the digital image comprising the detected face prior to the application of the at least one transformation.

An identification of a person may be associated with each stored face portrait in a database stored at or linked to one or more computers.

Where a digital image shows more than one person, the one or more computers may associate relationships between identified persons based at least partly on respective identified persons being included in the digital image.

Figure 24:
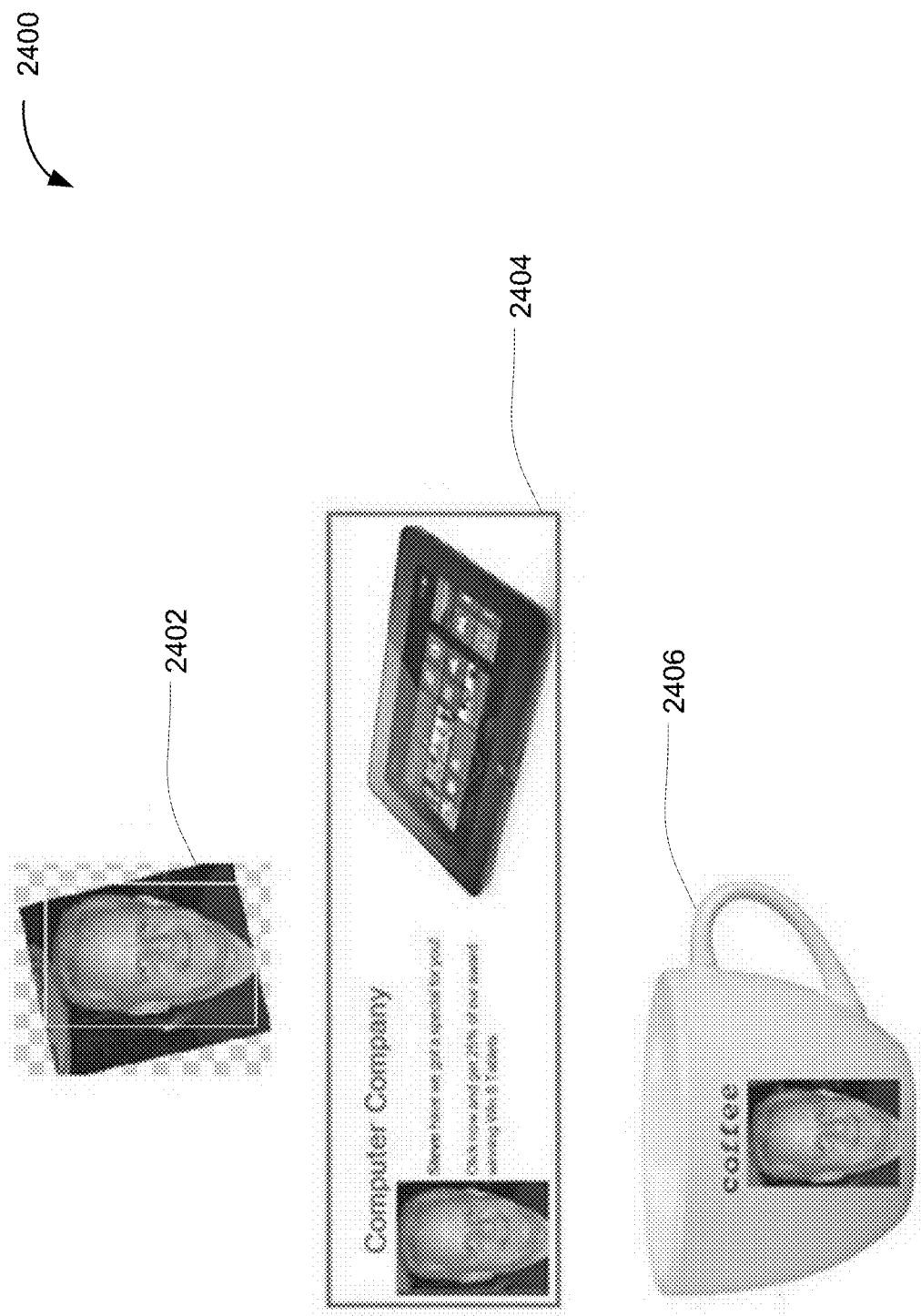
FIG. 24 illustrates copying the image of the face from a photo adjusted in terms of size and rotation and embedding the same in to an advertising message or in to a photo of a product.

FIG. 24 illustrates merging portraits or thumbnails adjusted in terms of size and rotation and embedding the same into an advertising message or product, or any other type of marketing material or image. The thumbnail or portrait 2402, also illustrated in FIG. 23 as image 2308 may be adjusted in size to match the size requirements of an advertisement 2404. For example, the computer may apply at least one additional transformation to the at least one stored portrait for matching a portrait size requirement of the marketing image. Images obtained for this purpose may be used to further populate a repository for access by a security platform.

Figure 32:
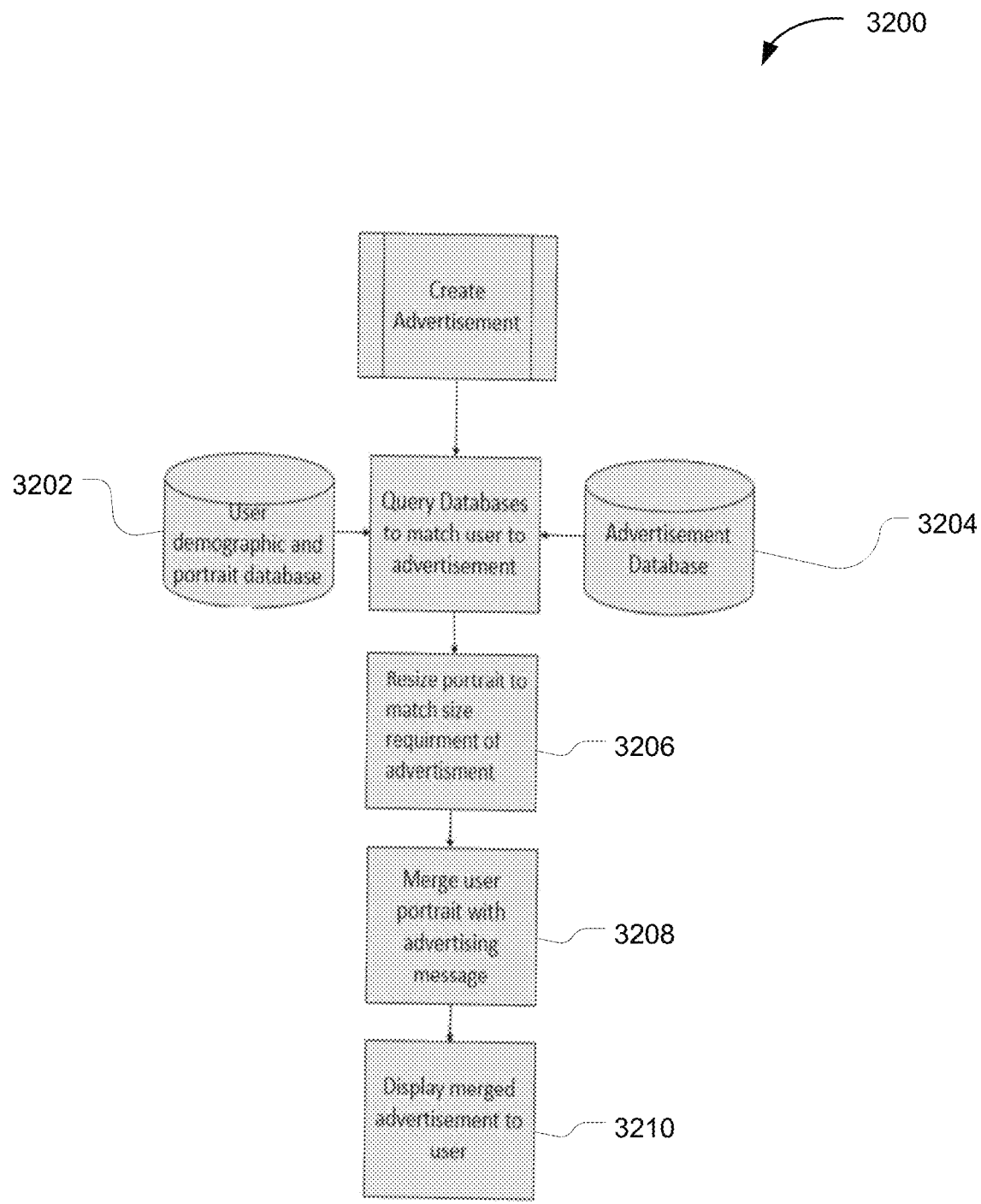
FIG. 32 illustrates the workflow to create a customized advertisement.

FIG. 32 illustrates the workflow for the creation of the advertisement. As illustrated in FIG. 32 when an advertisement is to be personalized one aspect of the present invention matches an advertisement retrieved from an advertisement server database 3204 to a user which is retrieved from the user demographic and portrait database 3202. The portrait retrieved from the user demographic and portrait database 3202 may be resized at 3206 to match size requirements of the advertisement retrieved from the advertisement server database 3204. The user portrait can be merged with or overlaid on top of the advertisement to display a personalized advertising message 3208. In addition to the portrait, the user's name or other information pertinent to the advertisement message may also be merged with or overlaid on top of the advertisement to display a personalized advertising message 3210 as demonstrated by the advertisement 2404. Images obtained for this purpose may be used to further populate a repository for access by a security platform.

Figure 33:
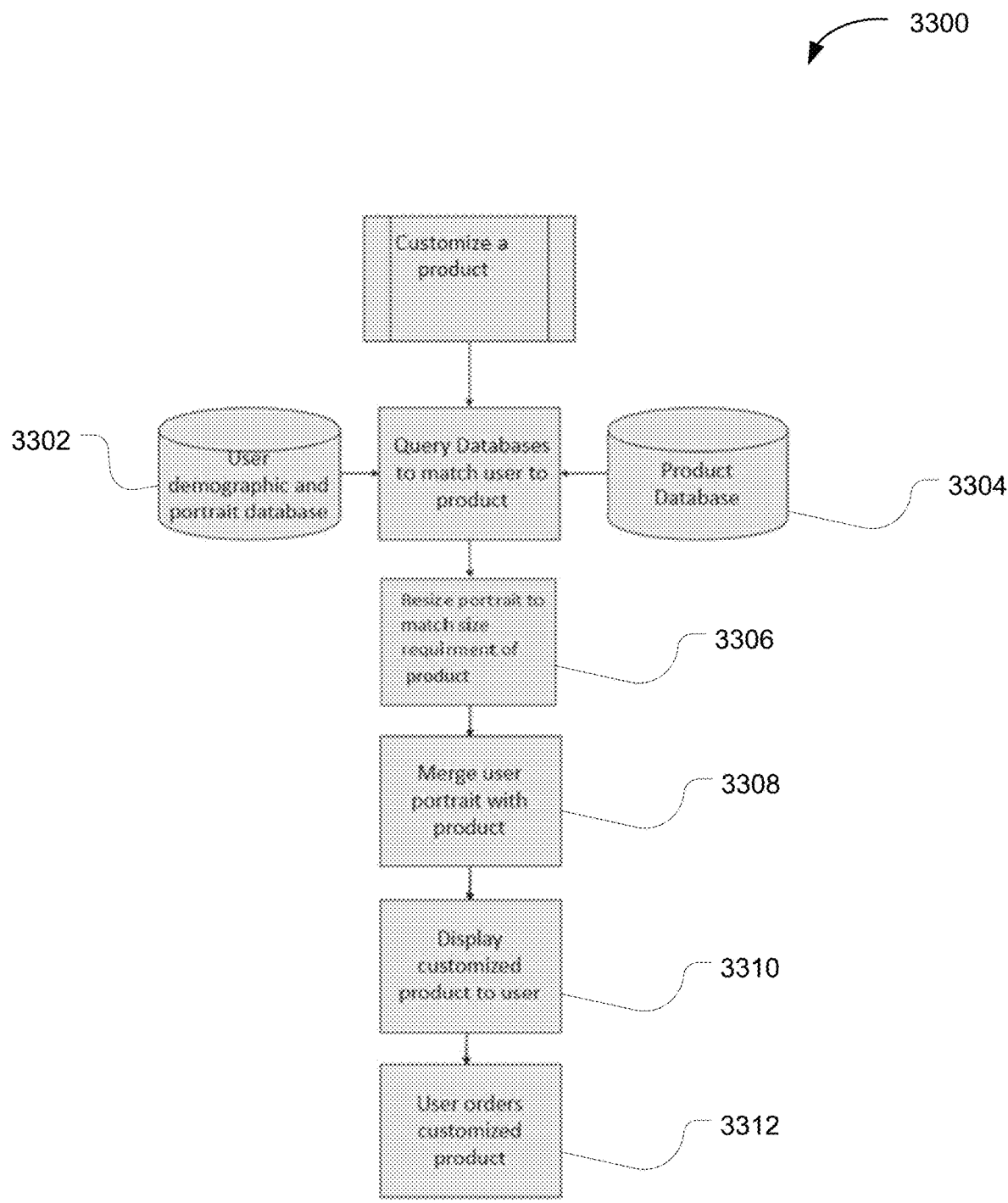
FIG. 33 illustrates the workflow to create a customized product.

FIG. 33 illustrates the workflow for the personalization of a product. As illustrated in FIG. 33 when a product is to be personalized one aspect of the present invention matches a product retrieved from product database 3304 to a user which is retrieved from the user demographic and portrait database 3302. The portrait retrieved from the user demographic and portrait database 3302 is resized at 3306 to match the size requirements of the product retrieved from the product server database 3304. The user portrait can be merged with product to display the personalized product 2406 shown in FIG. 24. In addition to the portrait, the user's name or other information pertinent to the product may also be merged with the product 3308 to display a personalized message 3310 as demonstrated by the resulting personalized product 2406. Images obtained for this purpose may be used to further populate a repository for access by a security platform.

Face Substitution

Figure 25:
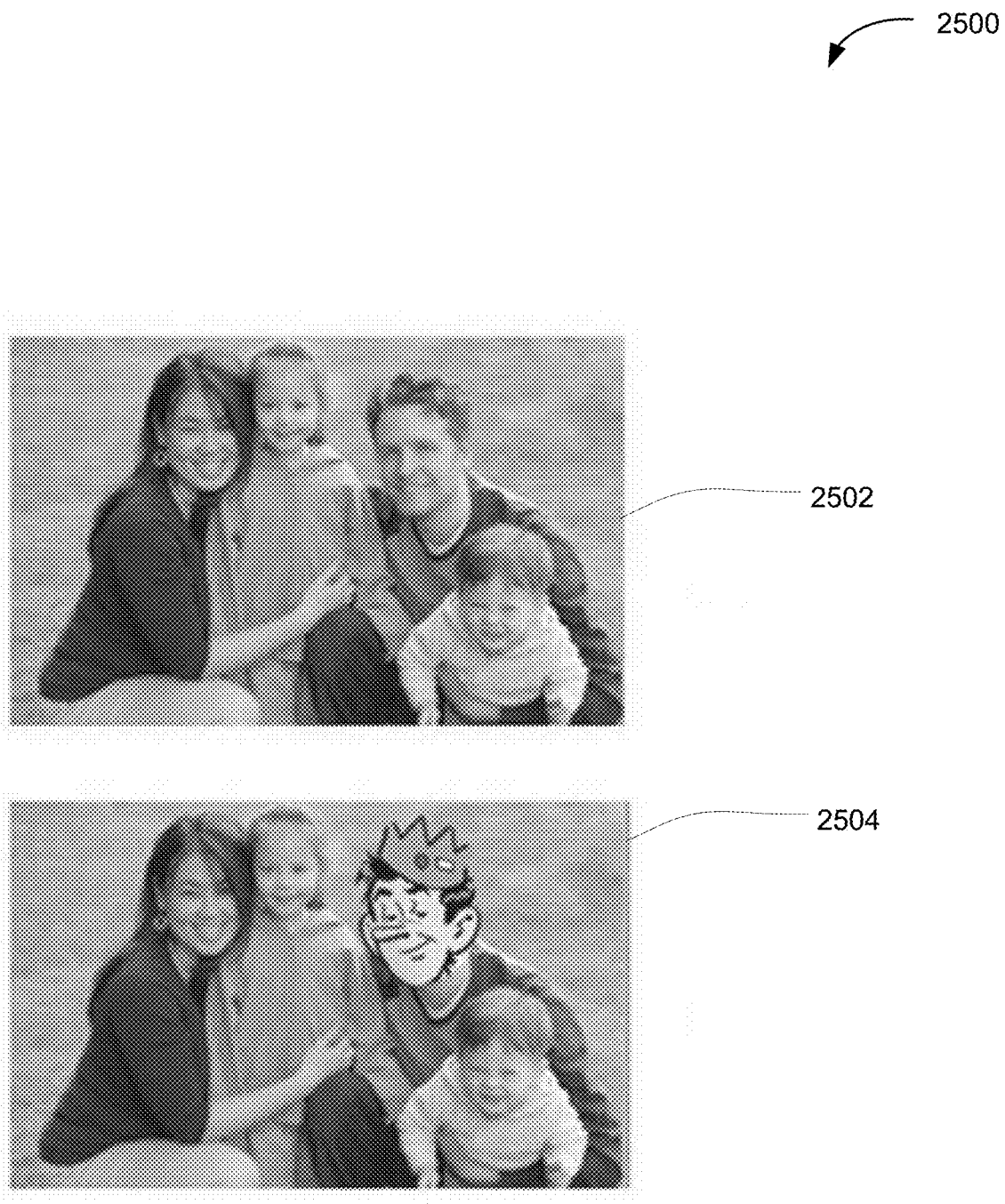
FIG. 25 illustrates using an image to overlay on a photo over the face of a subject to hide negative memories.

FIG. 25 illustrates using a selected image to overlay on a digital image photo to cover the face of a subject, also known as face substitution. An application may be to hide negative memories.

Figure 34:
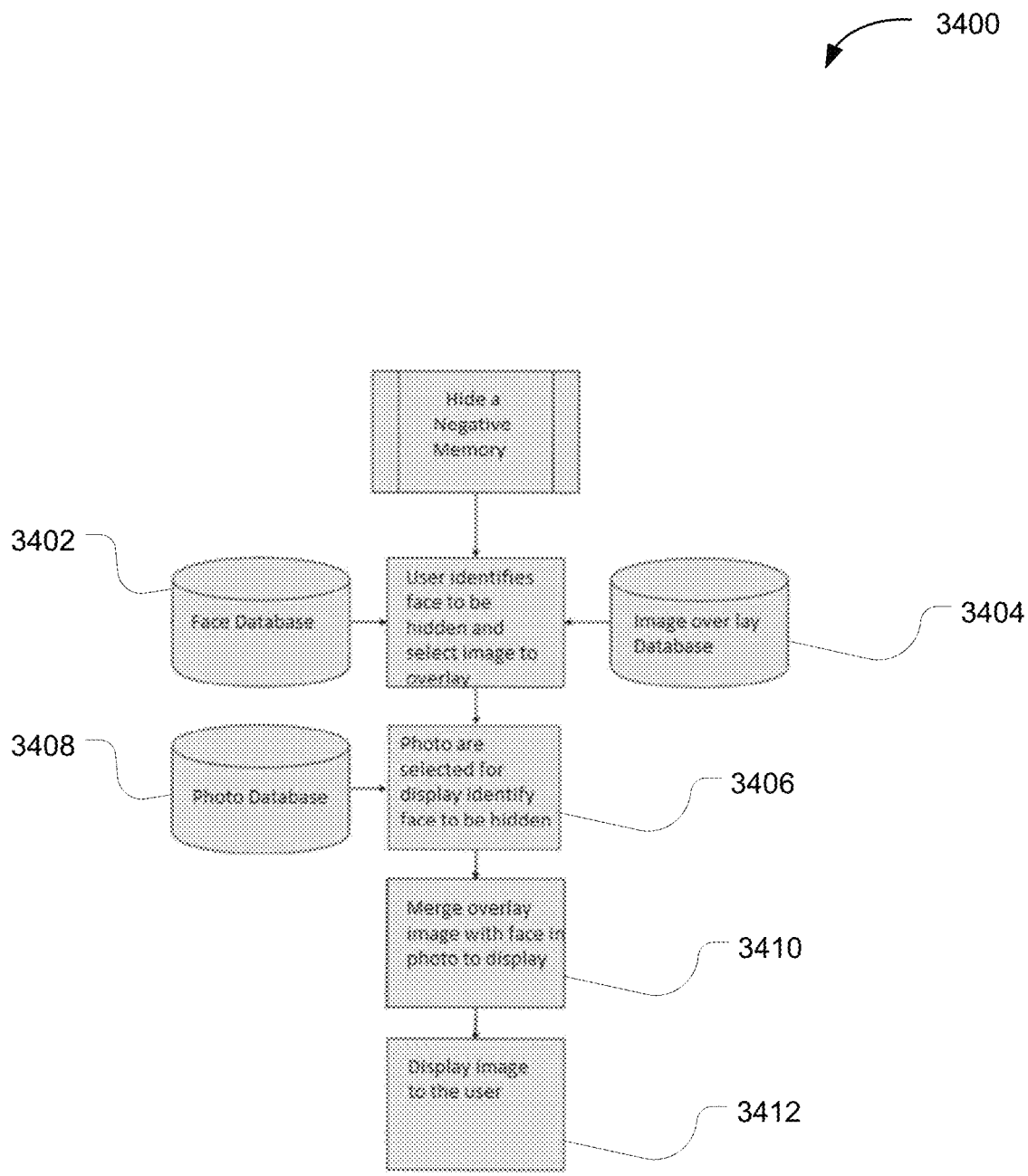
FIG. 34 illustrates the workflow to hide a negative memory.

FIG. 34 illustrates a workflow for face substitution. When a user wants to hide negative memories one aspect of the present invention may match faces in the face database 3402 to be hidden in the photos from the photo database 3408 with an image that is selected or provided by a user which is stored in the negative memory image database 3404. The databases 3402, 3404, and 3408 may be found on one computer server in a single database, in separate databases on the same computer, or on databases stored on or across multiple computers. The image retrieved from the negative memory image database 3404 is resized 3406 to match the size requirements of the faces to be hidden in the photos 2502 retrieved from the photo database 3408. The image is merged 3410 with photo 2502 such that when the photo is displayed 3412 the image hides the face of the negative memory as demonstrated by the resulting hidden face photo 2502. In a non-limiting aspect of the present invention, one or more computers may receive a selection of at least one face to be suppressed, optionally as any form of user input. The one or more computers may then mask the area co-ordinates corresponding to the location of the at least one face to be suppressed in the at least one digital image.

Optionally, the masking may comprise overlaying a selected image over the area co-ordinate corresponding to the location of the at least one face to be suppressed. Optionally, the one or more computers may adjust the selected image to correspond to size of the area co-ordinates to be masked. Optionally, the one or more computers may adjust edges of the overlaid image to blend with image characteristics of the at least one digital image. For example, the edges of the overlaid image may be blurred or the opacity of the edges may be modified. Optionally, the image characteristics to be blended may include one or more of color, intensity, brightness, and texture. Optionally, the selection of the at least one face to be suppressed may include a command to suppress a particular individual from being displayed in any digital image, the method comprising identifying any digital image comprising a face corresponding to the particular individual (identified person) to be suppressed and flagging the identified digital images to mask the area co-ordinates corresponding to the location of the at least one face to be suppressed. This may be accomplished by directly modifying the respective digital image(s) or updating associated metadata or other information or data to cause a display of the respective digital image(s) in a non-destructive manner such that the original source digital image is not permanently modified in the database. Accordingly, a mask may be applied to the digital image permanently, or the masking may involve modifying metadata of the digital image to cause the digital image to be masked when displayed.

Figure 26:
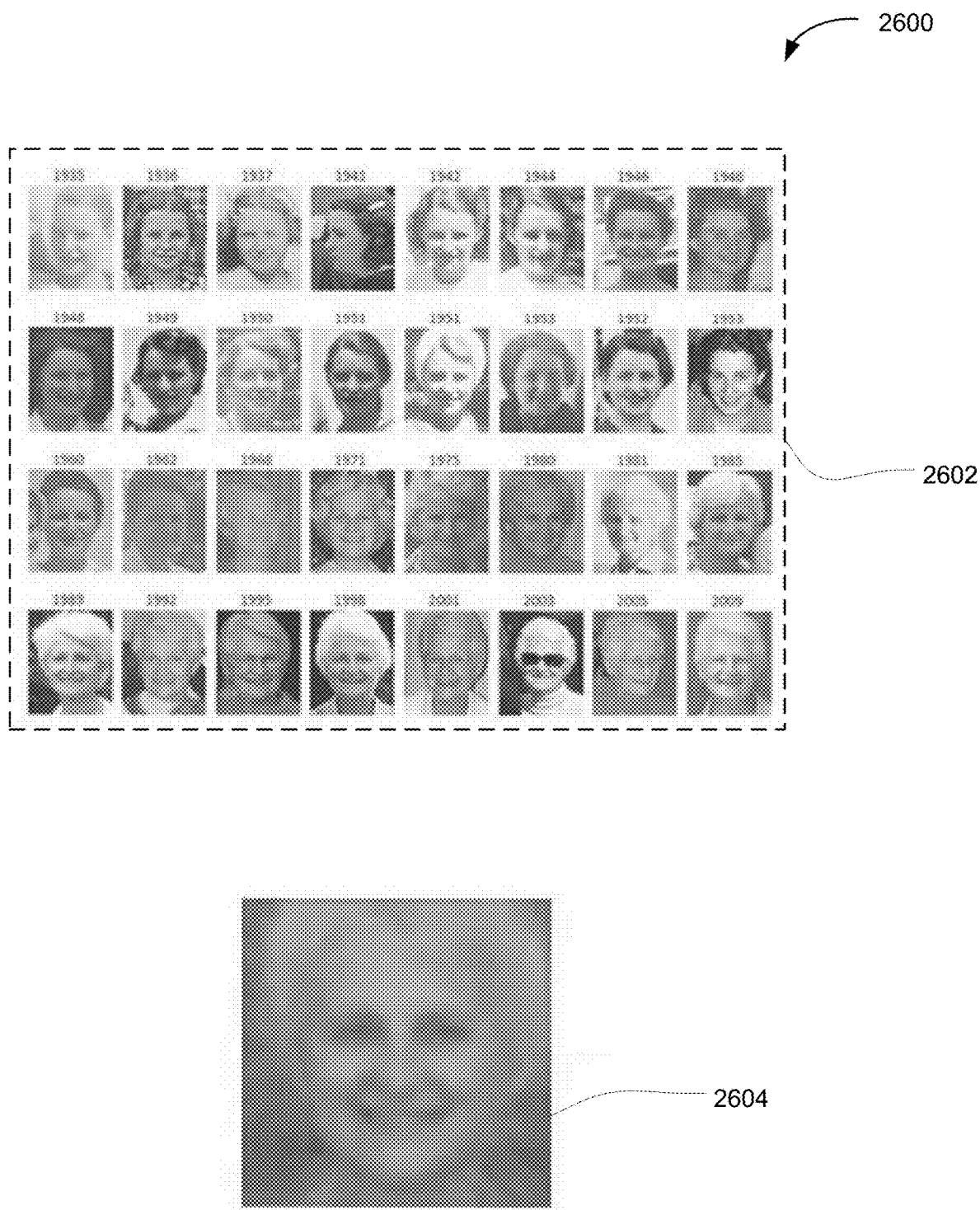
FIG. 26 illustrates the display of faces captured from photos in historical order.

FIG. 26 illustrates the display of faces captured from photos in historical order 2602, by date associated with the respective photos, optionally in metadata stored with the photo or elsewhere. The respective date may be the date the photo was created, copied from a camera, transferred to a computer system of the present invention, or any other date associated with the photo. With such ordering, the selected faces can be merged to create a single composite image as illustrated by 2604. Such faces can also be automatically fed into a morphing application such that the aging of a person can be animated.

Optionally, date data may be associated with the digital image. Stored portraits corresponding to a common person may be displayed in accordance with the respective associated date data. Optionally, an animated representation may be generated of an evolution of the stored portraits corresponding to the common person over time.

Figure 27:
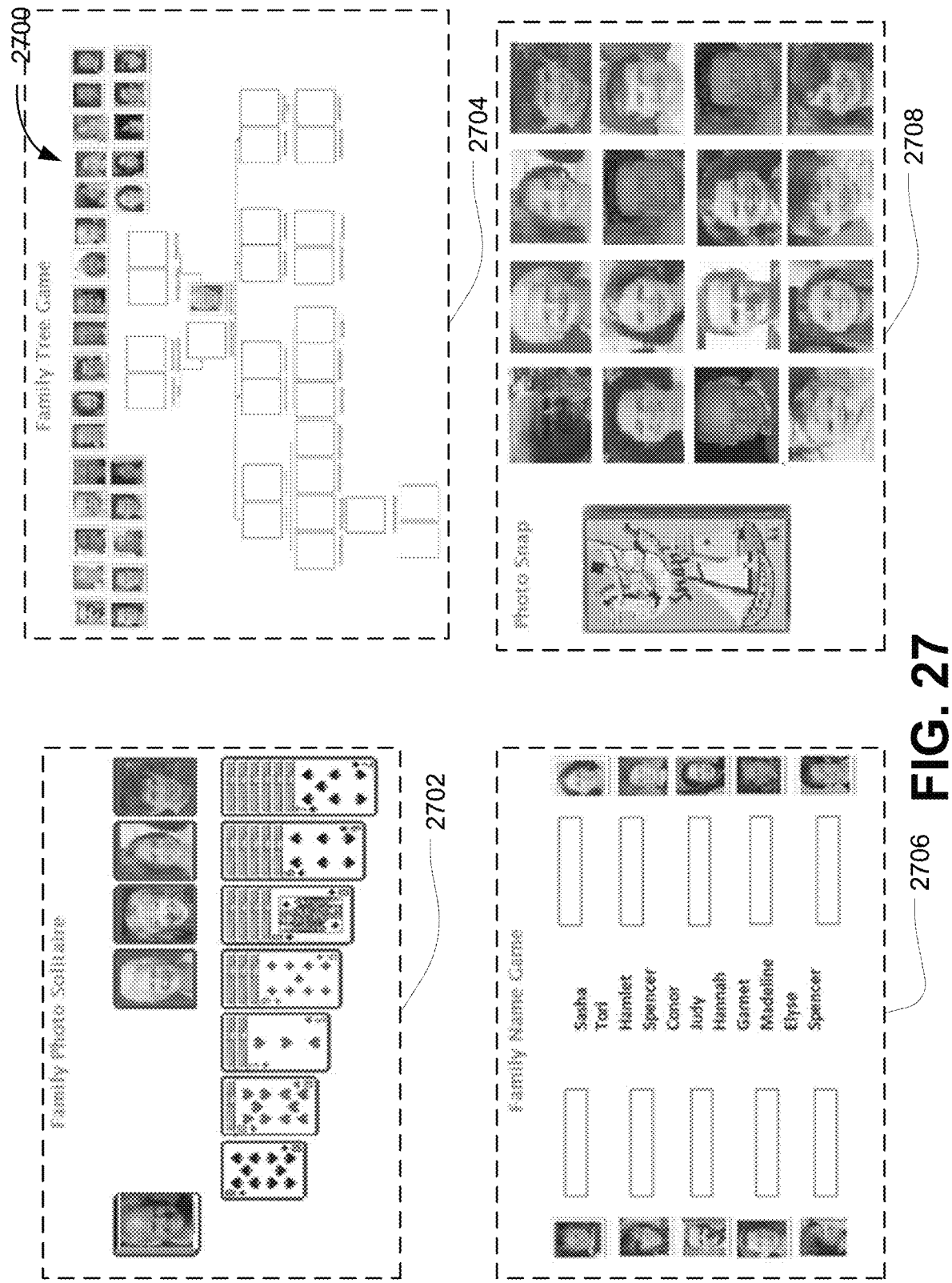
FIG. 27 illustrates the display of faces/portraits captured from photos and embedding the same in to games and exercises.

FIG. 27 illustrates the display of faces/portraits captured from photos and embedding the faces or portraits into games, exercises, or other interactive applications 2702, 2704, 2706, 2708.

Figure 35:
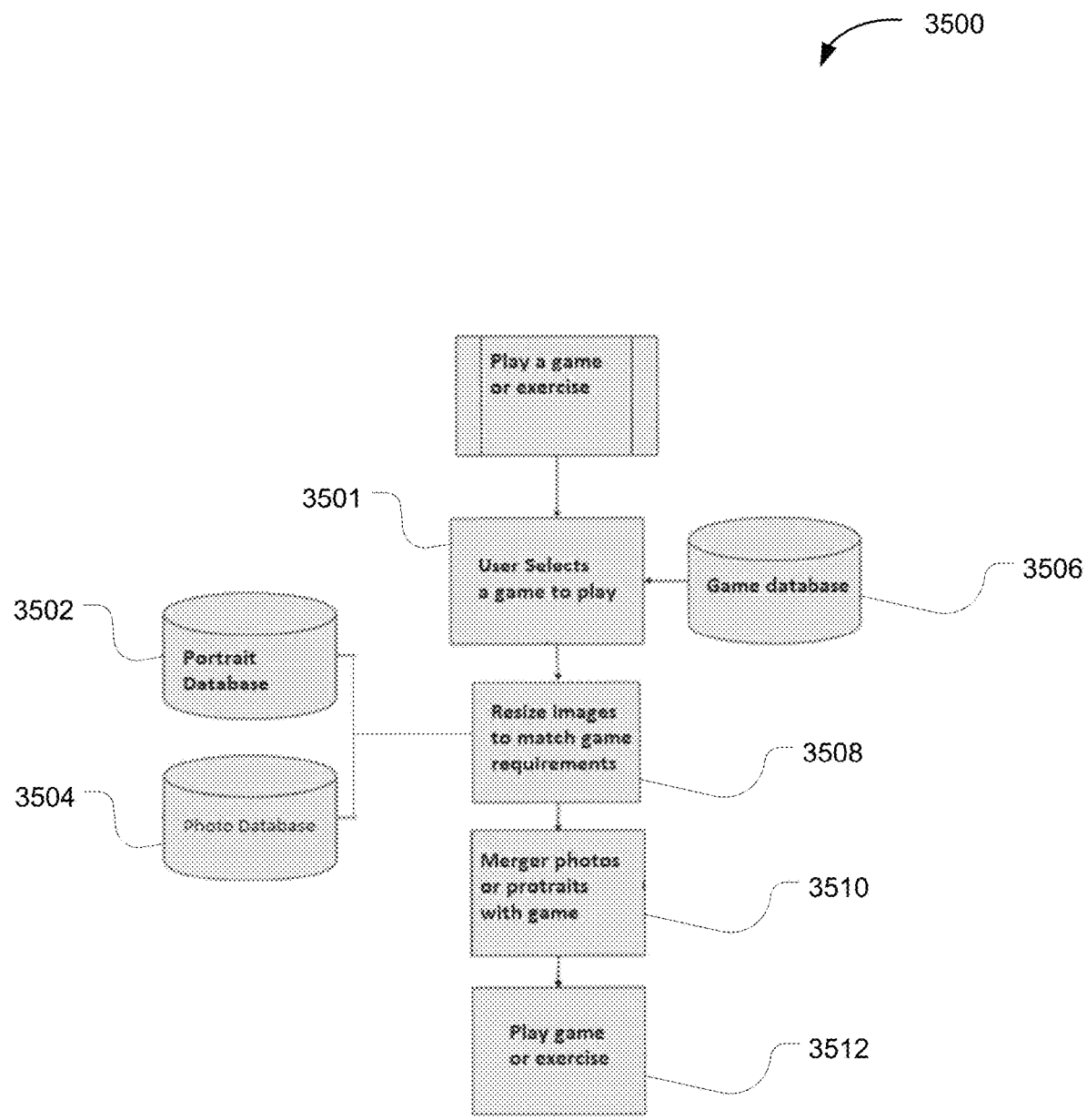
FIG. 35 illustrates the workflow to create customized games and exercises.

FIG. 35 illustrates a workflow for creating customized or personalized games and exercises using user portraits and photos, in accordance with aspects of the present invention. A user may select a game or exercise to be played 3501 from the game database 3506. The invention selects portraits from the portrait database 3502 or photo database 3504 for display. The portraits or photos are resized at 3508 to match the size requirements of the game to be played. The resized portraits or photos are merged 3510 with the game's user interface for the user to play 3512. Databases 3502, 3504, and 3506 may be found on one computer server in a single database, in separate databases on the same computer, or on databases stored on or across multiple computers.

Optionally, the one or more computers may populate an interactive computer game with the stored portraits and relationships. The interactive computer game comprises a photo reminiscence therapy game. Images obtained for this purpose may be used to further populate a repository for access by a security platform.

Indexing Systems Automated using Face Recognition

Figure 28:
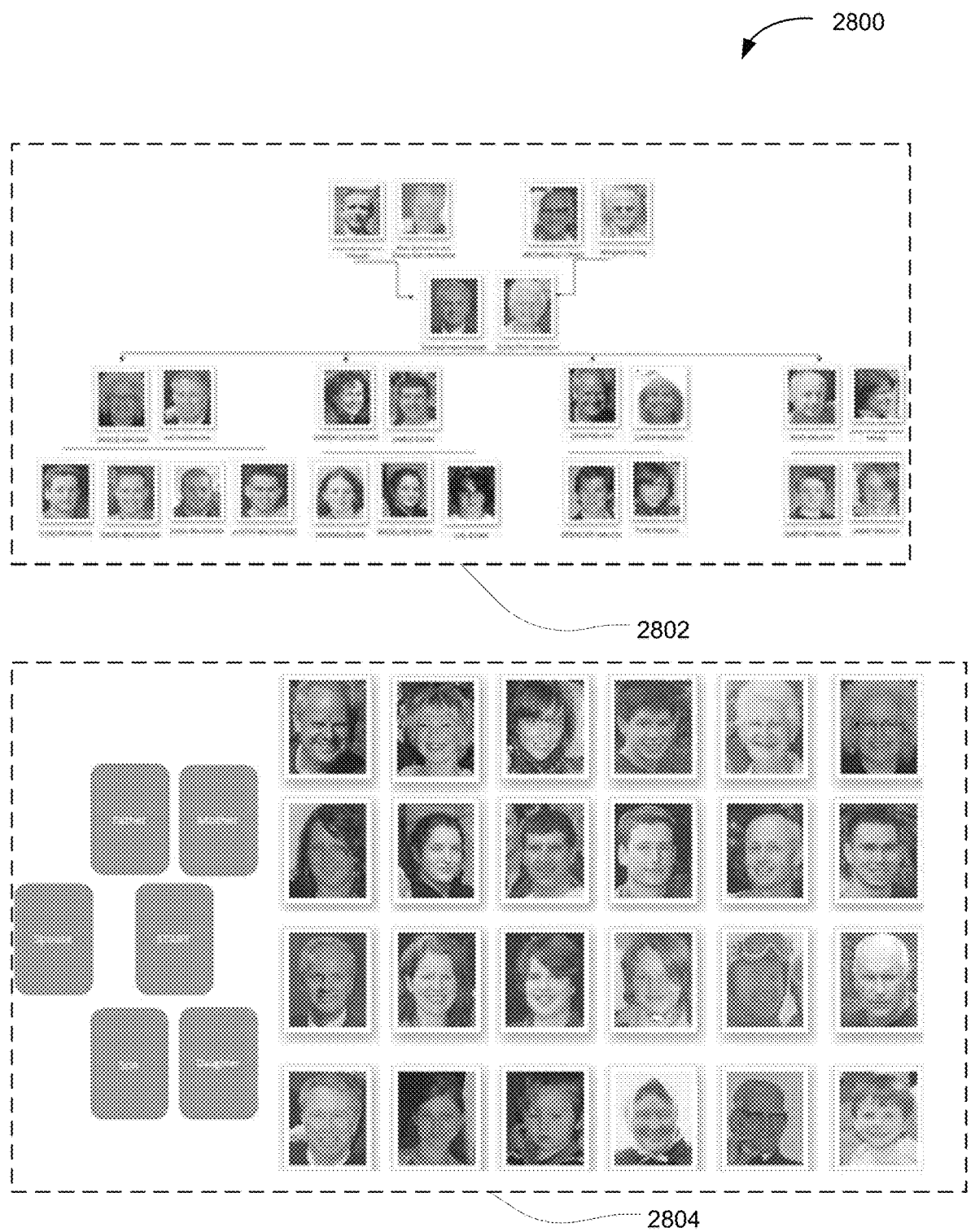
FIG. 28 illustrates the creation and use of a family tree to be an index for photos.
Figure 36:
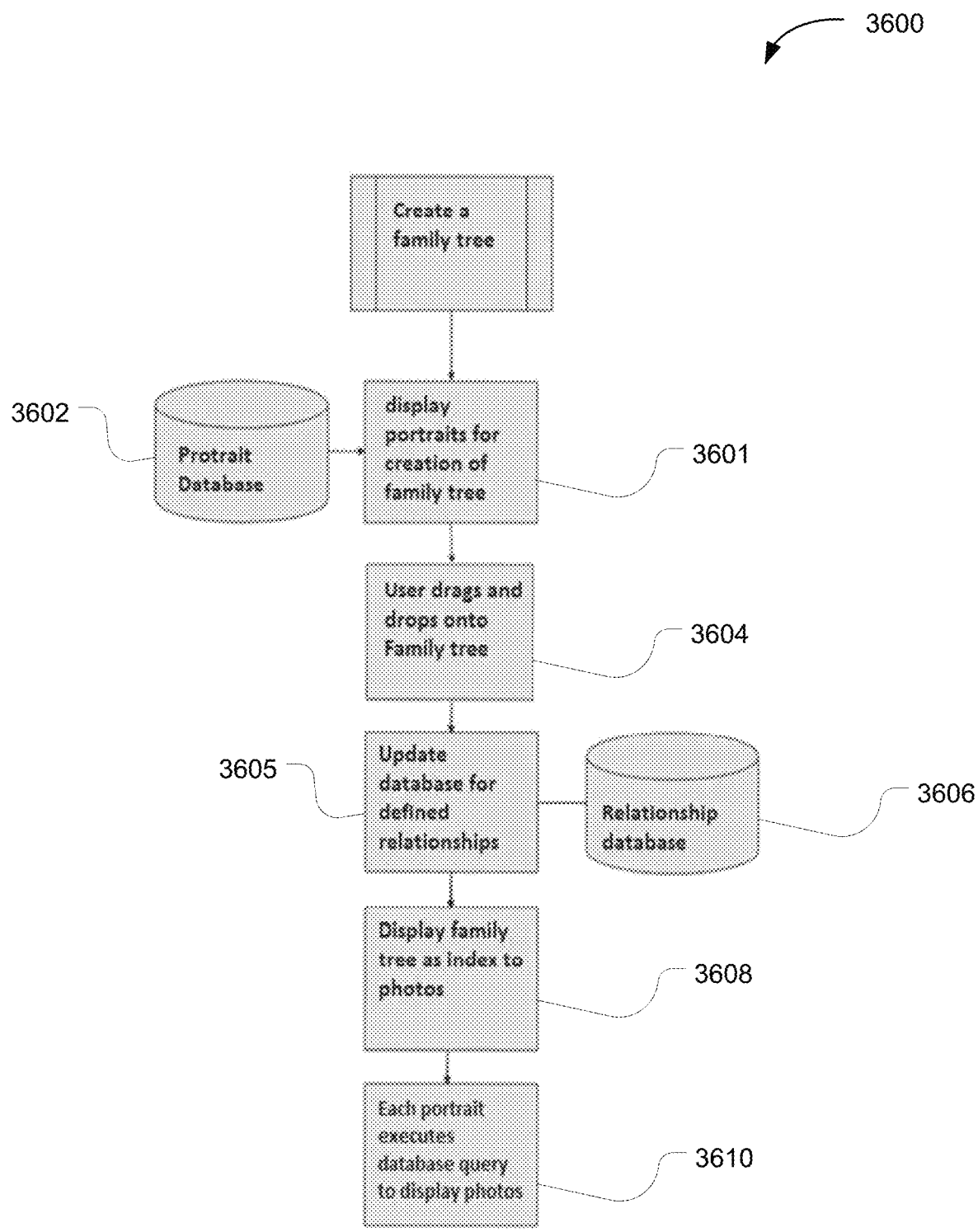
FIG. 36 illustrates the workflow to create a family tree.

FIG. 28 illustrates the creation and use of a family tree to index photos and FIG. 36 illustrates a corresponding workflow. Portraits may be displayed 3601 from the portrait database 3602 of identified people. The user may drag and drop each portrait on to the family tree at 3604 using the relationship template 2804 as illustrated in FIG. 28. In a non-limiting example, each user of the system of the present invention may have six basic relationships of mother, father, sibling, spouse, daughter and son, as shown in template 2804. As the user drags portraits on to the family tree the family tree grows to show the new nodes. Optionally new blank nodes are added for the common relationships to the selected node. As more persons are added the family tree expands as users are added and relationships are defined 3605. When the user has dragged all portraits the family tree is completed by eliminating extraneous relationship or persons such as friends and colleagues. Users will likely have friend and colleague relationships that are pertinent to their personal social map but are identified in a modified network map using a similar drag and drop method.

The family tree 2802 which is created may be used as an index to the user's photos at 3608. When a user selects or clicks on a photo a database query will be executed at 3610 to display the photos in which the selected person appears.

Instead of a family tree 2802, other types of organizational structures representing relationships between persons may be presented in a chart format for populating by dragging portraits thereto, or otherwise selecting portraits. For example, a corporate organization chart may be created by providing a blank, or incomplete corporate organization chart. The user may then be presented with portraits from the database for placement on the chart.

In accordance with a non-limiting aspect of the present invention, at least one computer may include or interface with at least one database that stores a plurality of portrait images. Each portrait image may be associated with an identified person shown in the respective portrait. The identification of the person may be stored in the database, another database, or in metadata associated with the respective portrait image. The at least one computer may display the respective portrait of at least one identified person associated with a user. The at least one computer may display a visual representation of at least one personal relationship to the user. The at least one computer may assign at least one of the displayed portraits to at least one of the displayed personal relationships, in accordance with a received user input. The at least one computer may store the personal relationship assignments in the database. The visual representation may include a representation of a tree organizational structure with a plurality of tree nodes, such as for a family tree, where each tree node corresponds to one of the at least one personal relationships. The at least one computer may spawn a tree node for the visual representation corresponding to at least one additional personal relationship in accordance with a user input adding at least one of the displayed portraits to the visual representation. For example, the family tree structure may grow as additional portraits are added to the tree. The user may then specify a relationship for the newly added portrait, or a default relationship may be assigned, or the at least one computer may attempt to determine an appropriate relationship for the new relationship based at least partly on data found on a social network system to which the user is a member. The database of portraits, or another database accessible to the at least one computer, may include a plurality of digital images, and the at least one computer may index at least a subset of the plurality of digital images in accordance with the visual representation. Accordingly, the family tree structure may be used to link to other digital images featuring members of the family tree. In particular clicking on one member of the family tree may link to one or more digital images showing at least that member of the family tree.

Figure 29:
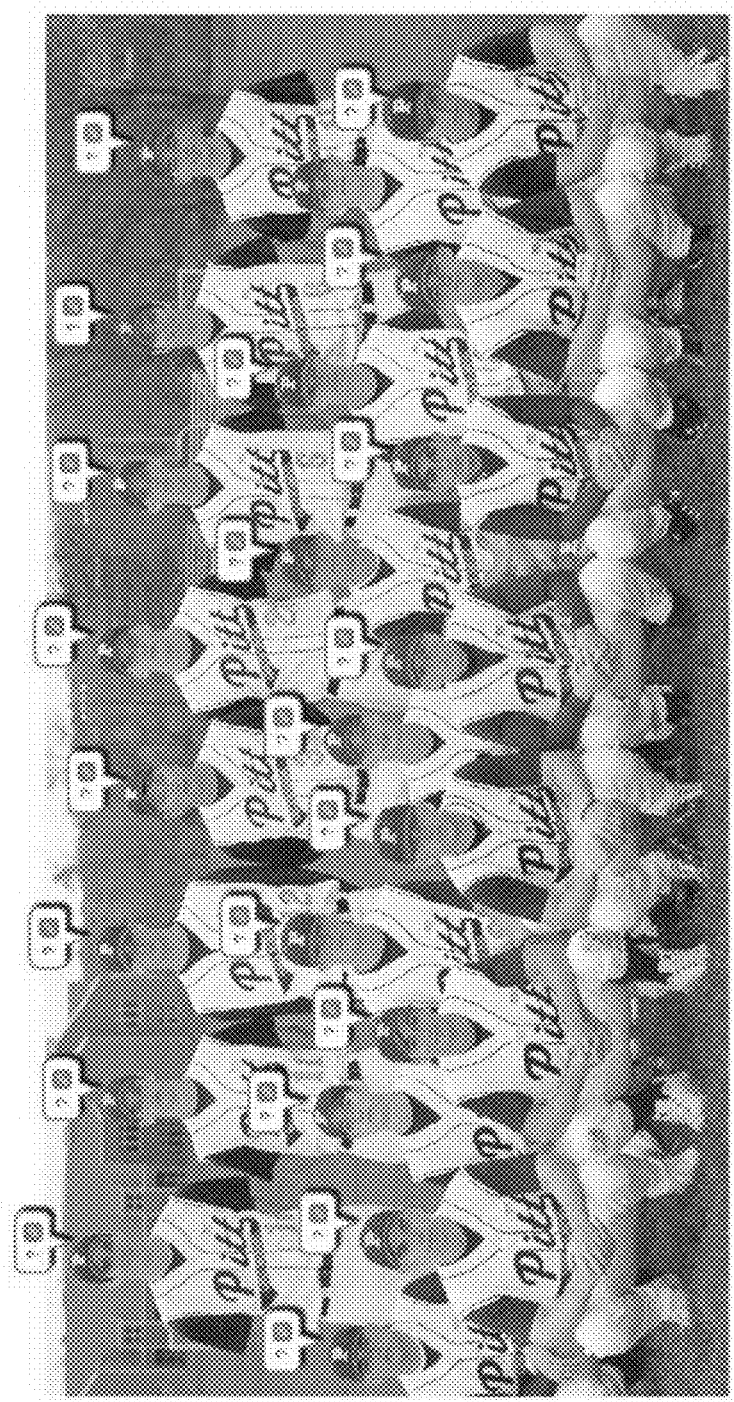
FIG. 29 illustrates the use of group photos to be an index for photos.
Figure 37:
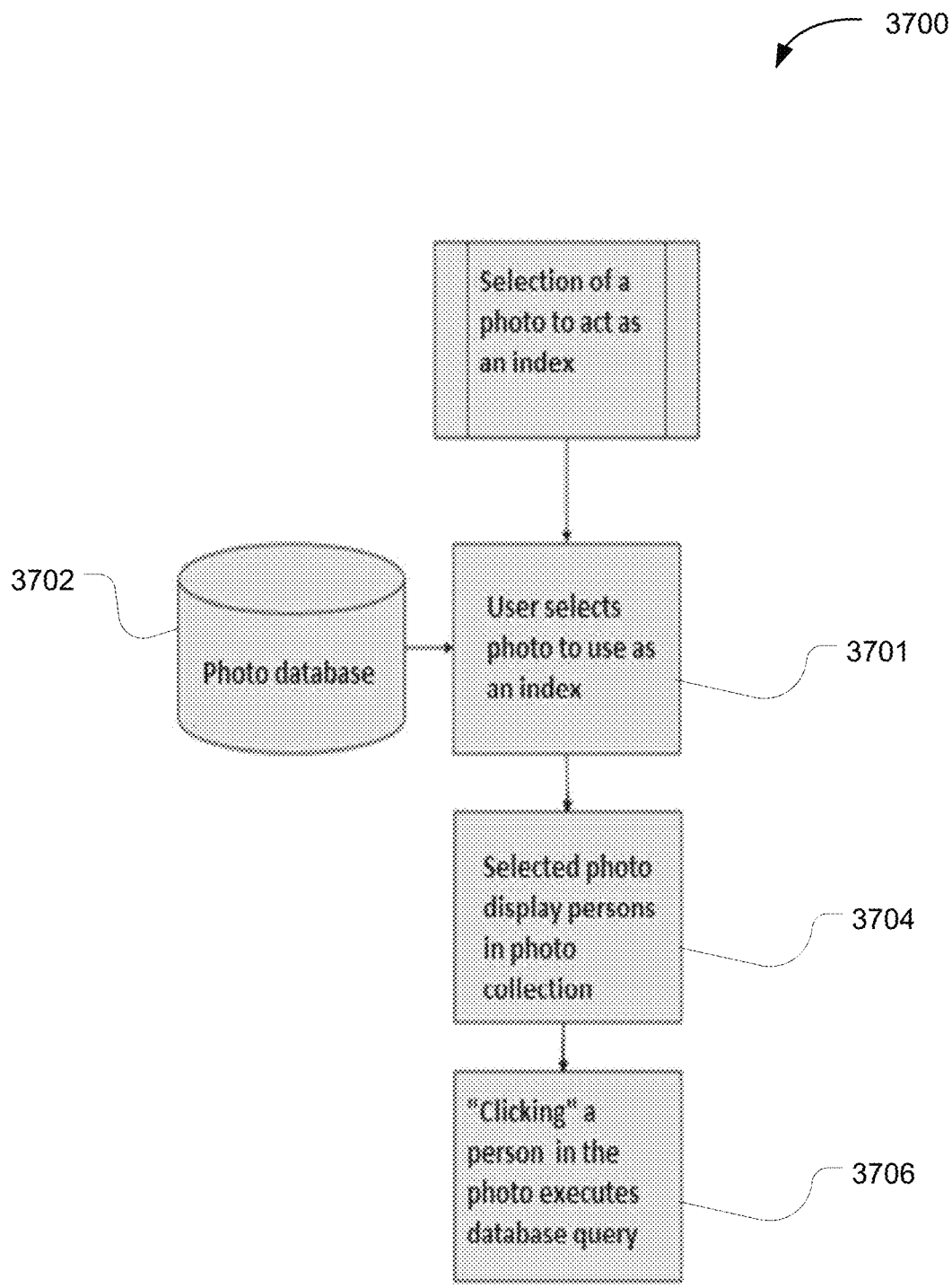
FIG. 37 illustrates the workflow to use a photo as an index.

FIG. 29 illustrates the use of group photos to be an index for photos in the photo database, and FIG. 37 illustrates a corresponding workflow. A user may select a photo or photos 3701 from the photo database 3702. The photo selected is recorded as a photo for indexing photos and becomes an index in one aspect of the invention. When a user selects or clicks on a face in the photo 3704 the one or more computers may search database 3706 or another database for more digital images including the identified person corresponding to the face in the photo the user has selected.

In accordance with a non-limiting aspect of the present invention, at least one computer may include or interface with a database of portraits and digital images, each portrait associated with an identified person shown in the respective portrait. The at least one computer may display at least one of the digital images and cross-reference the displayed at least one digital image with the database of portraits to create a list of at least one identified person shown in the at least one digital image. The at least one computer may index at least a subset of the digital images in accordance with the list of at least one identified person. In accordance with a user input selecting at least one of the identified persons from the displayed at least one digital image, the at least one computer may display at least one of the respectively indexed digital images. Optionally, the indexing may include displaying visual representations of the indexed digital images organized by identified person. Images obtained for this purpose may be used to further populate a repository for access by a security platform.

Solicited and Automated Search for Missing Persons

Figure 30:
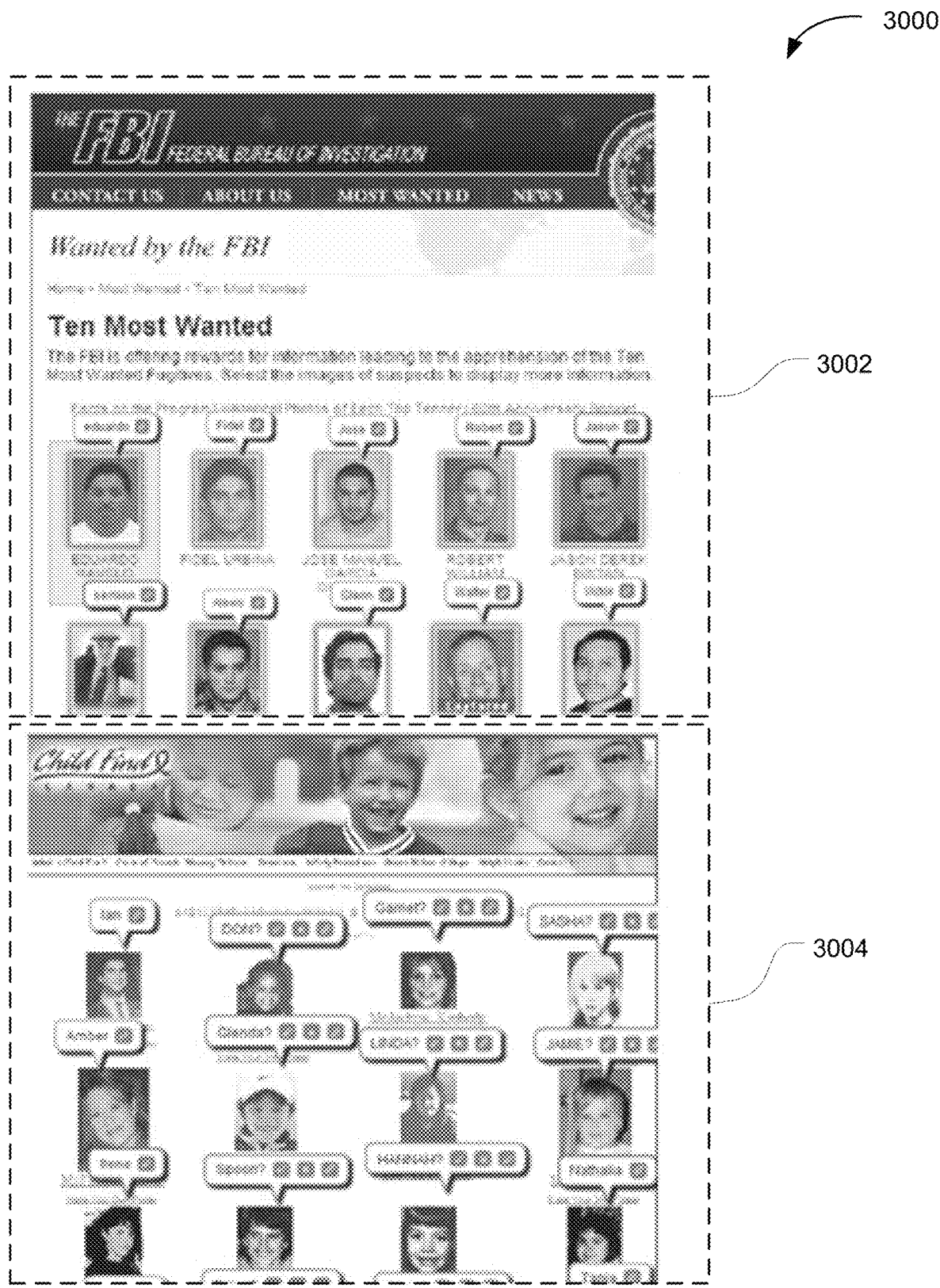
FIG. 30 illustrates the displays the delivery of face signatures of missing children and wanted criminals.
Figure 38:
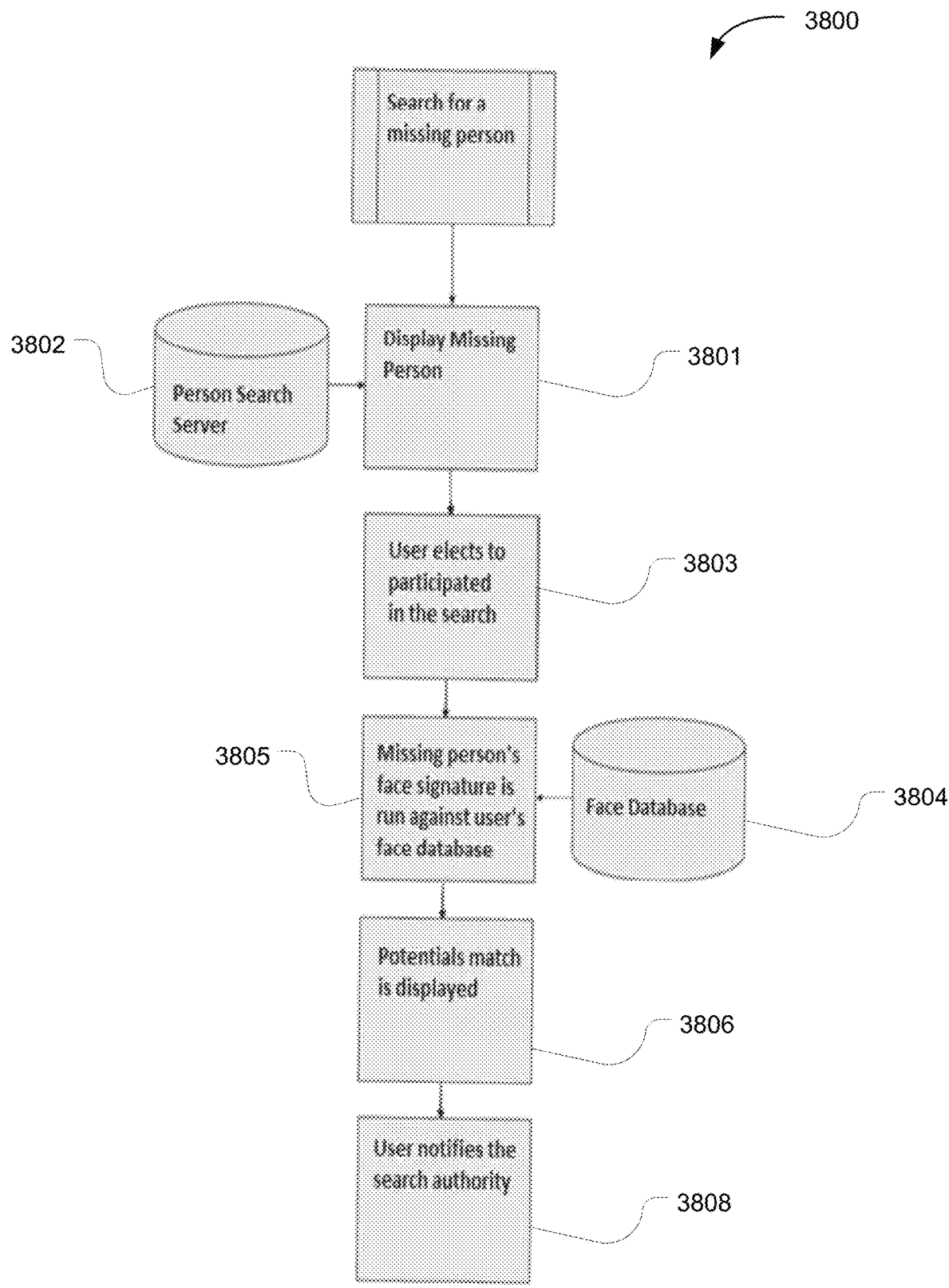
FIG. 38 illustrates the workflow to find a missing person.

In yet another aspect of the present invention, the present invention may enable a computer program to receive digital face images or signatures from a third party server, such as a central person search server. FIG. 30 illustrates displaying the delivery of face signatures of missing children 3002 and wanted criminals 3004 that a user could elect to use for searching the user's photo database(s) for potential matches. A corresponding workflow is shown in FIG. 38. For example, an organization seeking to find an individual (such as a missing child or a wanted criminal) may post 3801 the individual's face data shown in images 3002 and 3004. The face data may originate from a person search server 3802. Those users that have opted 3803 to share their face database 3804 may download the data enabling an automatic comparison 3805 of the face data with their face database 3804. The results of the comparison may be displayed to the user at 3806 for validation. The user may notify the organization at 3808 if a match is found between the target individual and a known person for a specific user. This could enable the organization to determine a recent or current location of the individual. It could also enable the organization to determine the name of an individual, since the individual's name may be listed in one or more of the user's known persons list. Images obtained for this purpose may be used to further populate a repository for access by a security platform.

Figure 31:
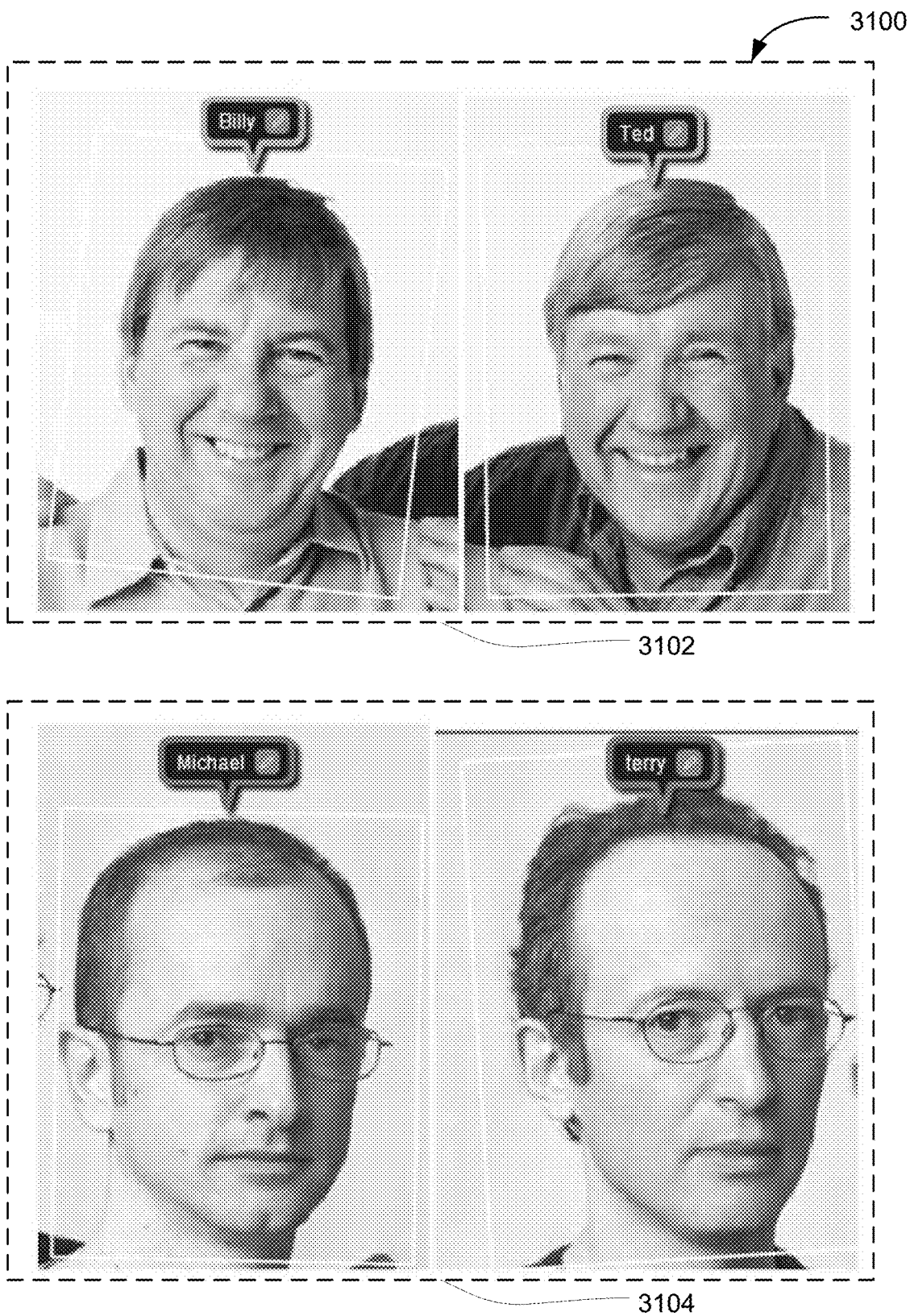
FIG. 31 illustrates the matching of face signatures to find people who look alike.
Figure 39:
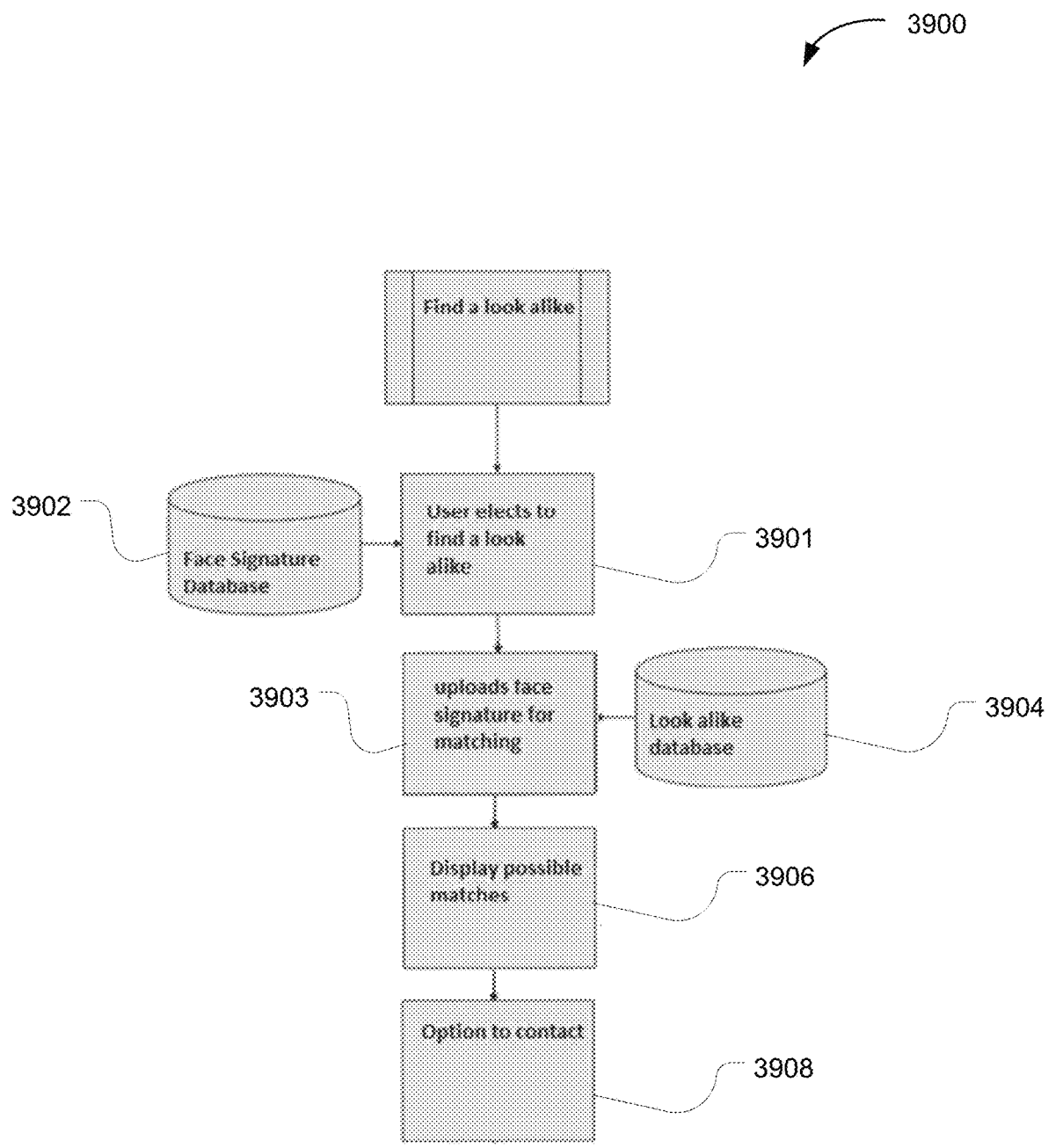
FIG. 39 illustrates the workflow to find a look alike.

Yet a further embodiment of the present invention, described in reference to FIG. 31 and corresponding workflow FIG. 39, may enable an individual to find other persons with similar facial features as themselves 3102, 3104. Such an application may be useful for a person to find their twin, for example. In this embodiment, a user may elect 3901 to submit a photo including an image of their face, from which the present invention may generate a face signature stored in face signature database 3902. The face signature may then be compared to other face signatures that have been previously uploaded to database 3902 or to look alike database 3904. Based on a predetermined similarity threshold, one or more similar faces may be reported to one or all of the individuals whose faces match at 3906. A system in accordance with this embodiment may provide a means for a user to approve contact with others at 3908. Matched individuals could choose to send a message to one another if they have specified their approval for such contact. Another variation on this invention would be to look for people with similar facial features taken separately from the entire face—such as mouth, nose, and eyes.

In accordance with a non-limiting aspect of the present invention, at least one computer may include or interface with a database of portraits, each portrait associated with an identified person shown in the respective portrait. The at least one computer may receive at least one unidentified portrait and compare a face signature of the at least one unidentified portrait against face signatures of portraits of identified persons known to the user. In accordance with a positive result of the comparing, the at least one computer may prompt the user for confirmation of the positive result. In accordance with the confirmation, the at least one computer may associate the at least one unidentified portrait with the at least one identified person confirmed by the user and store the at least one unidentified portrait in the database.

Optionally, the unidentified portrait shows a missing person. Optionally, the receiving may include several steps. First, the digital image may be received. The at least one computer may then detect at least one face in the received digital image. The at least one computer may determine and store area co-ordinates of a location of the at least one detected face in the received digital image. The at least one computer may apply at least one transformation to the at least one detected face to create the at least one unidentified portrait of the at least one detected face. The at least one computer may rotate the at least one unidentified portrait at least until the at least one unidentified portrait is shown in a vertical orientation and a pair of eyes of the at least one face shown in the at least one unidentified portrait are positioned on a horizontal plane. Images obtained for this purpose may be used to further populate a repository for access by a security platform.

Visualizing Relationships from Photo Metadata

When a set of digital photos contains name tags that identify the people represented in those photos then there is potential to "mine" that information and generate potentially interesting, entertaining, and useful techniques for displaying relationships between people that have been tagged in those photos. How the name tags are made available to the computer system is not limiting to the concept of using that data to display interesting graphs and charts. One approach to generating the name tags quickly is to use face detection and recognition technology. This technology speeds up the tagging process by automating most of the manual steps. The name tag data could simply exist in the photo metadata, such as in the Adobe XMP format, or it could exist in a SQL or other database.

Figure 46:
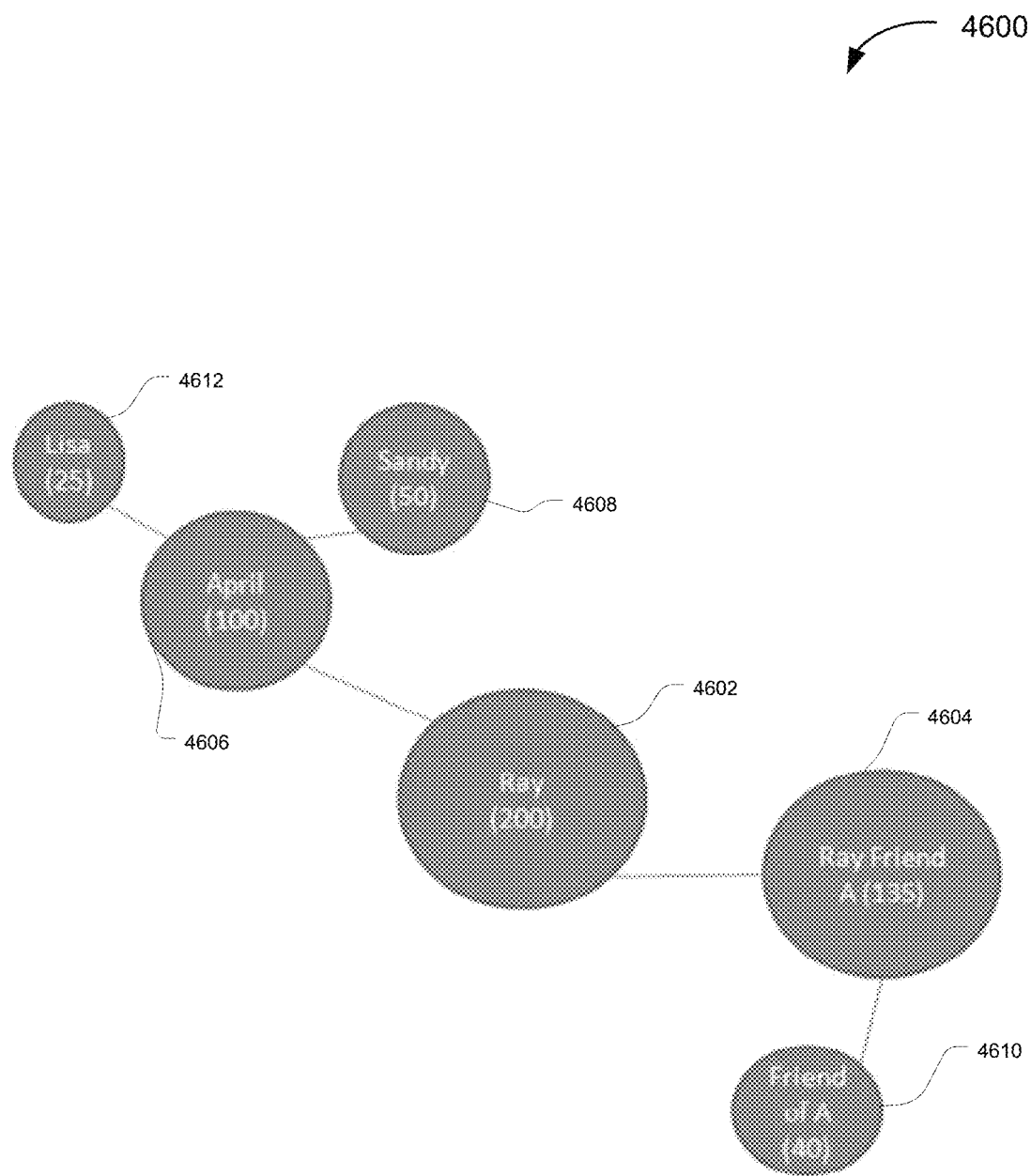
FIG. 46 illustrates a relationship diagram showing frequency of identified persons appearance together, in accordance with an aspect of the present invention.

FIG. 46 depicts a graph generated in accordance with an aspect of the present invention. The relationships between people appearing in photos are shown by interconnected lines between nodes representing people. Starting with a central, or selected person (in this example: Ray 4602), the invention shows a node that represents the number of photos in which Ray 4602 appears. The node may be sized relatively according to the number of photos. Any nodes attached directly to the central "Ray" 4602 node may identify people that appear in photos with Ray 4602. So for example, April 4606 appears in 100 photos with Ray, and "Friend A" 4604 appears in 135 photos with Ray 4602. Then the next layer of the diagram shows people that don't appear with Ray, but appear with the people connected directly with the Ray 4602 node. So, Sandy 4608 and Lisa 4612 appear together with April 4606 in photos. This method is used to graph all relationships moving outward from a central person. Each node may show a frequency of appearance together of the person named at the node and the person named at the immediately preceding node.

This graph in FIG. 46 could be used as an index to the photos. By clicking on any node in the graph, the corresponding photos represented by that node could be displayed in slideshow or thumbnail list format. The at least one computer could query the one or more photo databases in advance of receiving a click on any of the nodes in order to be prepared to more quickly present the corresponding photos, or the at least one computer could perform any such query or queries after having received the click user input.

In accordance with a non-limiting aspect of the present invention, at least one computer may include or interface with a database of digital images and respective metadata identifying a name of at least one identified person shown in the respective digital image. The at least one computer may select one of the identified persons from the database and determine a count of a total number of digital images where the identified person appears. For each identified person shown in at least one of the digital images with the selected identified person, the at least one computer may determine a count of a total number of digital images where the respective identified person appears with the selected identified person and display a visual representation, such as a graph or chart as shown in FIG. 46. The visual representation could include a first node representing the selected identified person (e.g. "Ray" in FIG. 46) and the respective count of the total number of digital images where the identified person appears. For each identified person shown in at least one of the digital images with the selected identified person, a second node may be presented representing the respective identified person shown in at least one of the digital images with the selected identified person. Each respective node may further include a visual representation of the respective count of the total number of digital images where the respective identified person appears with the selected identified person. Each second node may be linked to the first node, optionally in the form of a visible line or by other means of displaying a visible link.

Optionally, for each identified person displayed with a respective second node (a "second person"), for each identified person shown in at least one of the digital images with the respective second person, the at least one computer may determine a count of a total number of digital images where the respective identified person appears with the respective second person. In this case, the visual representation may include, for each identified person shown in at least one of the digital images with the respective second person, a third node representing the respective identified person shown in at least one of the digital images with the respective second person, each respective node further comprising a visual representation of the respective count of the total number of digital images where the respective identified person appears with the respective second person; and a link between the respective second node and each respective third node.

Figure 47:
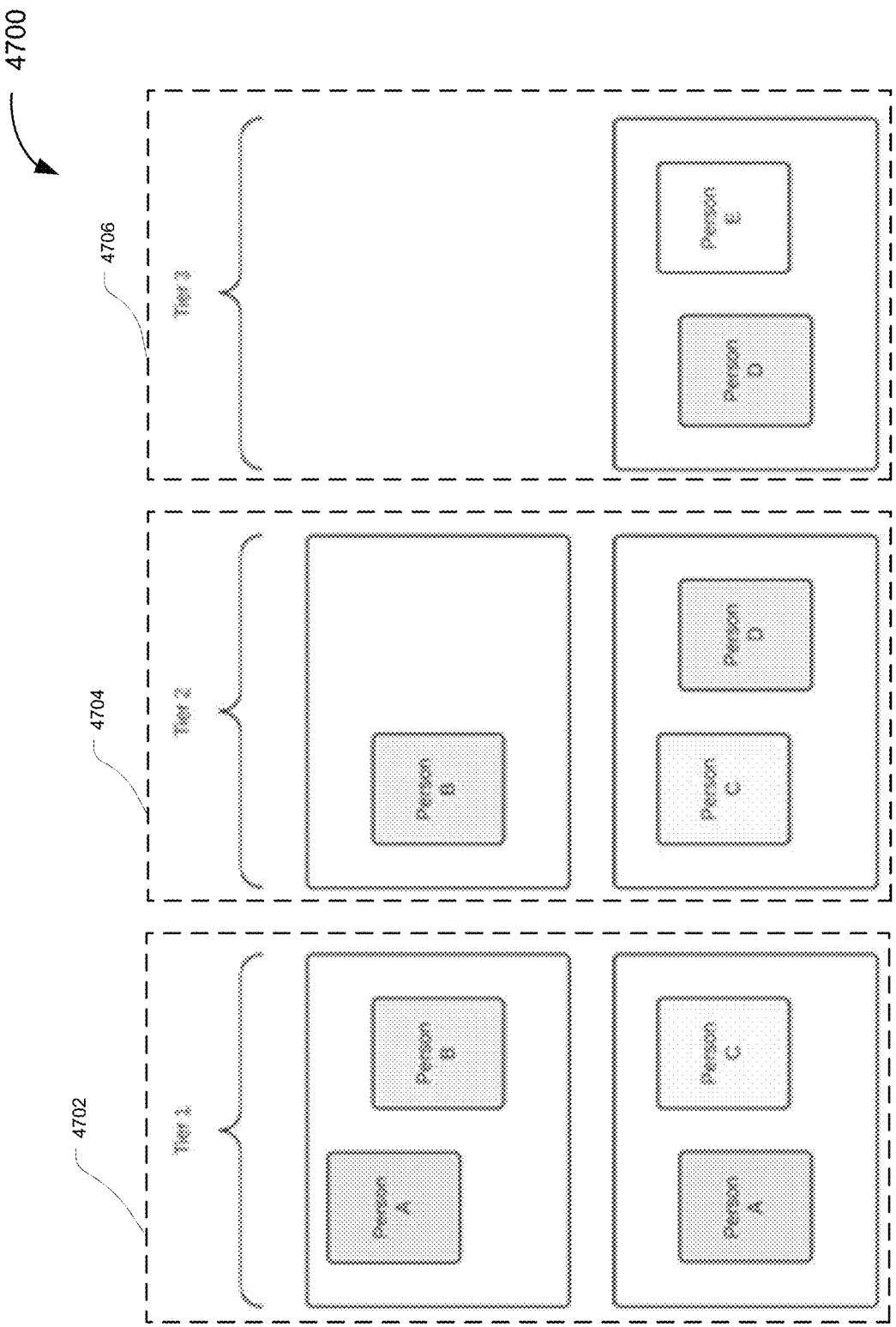
FIG. 47 illustrates displaying photos in a tiered list format in accordance with an aspect of the present invention.

Another non-limiting exemplary implementation could show the relationships purely in list format based on the tiers away from the central person. FIG. 47 shows how those photos may look arranged by tiers 4702, 4704, 4706.

Figure 48:
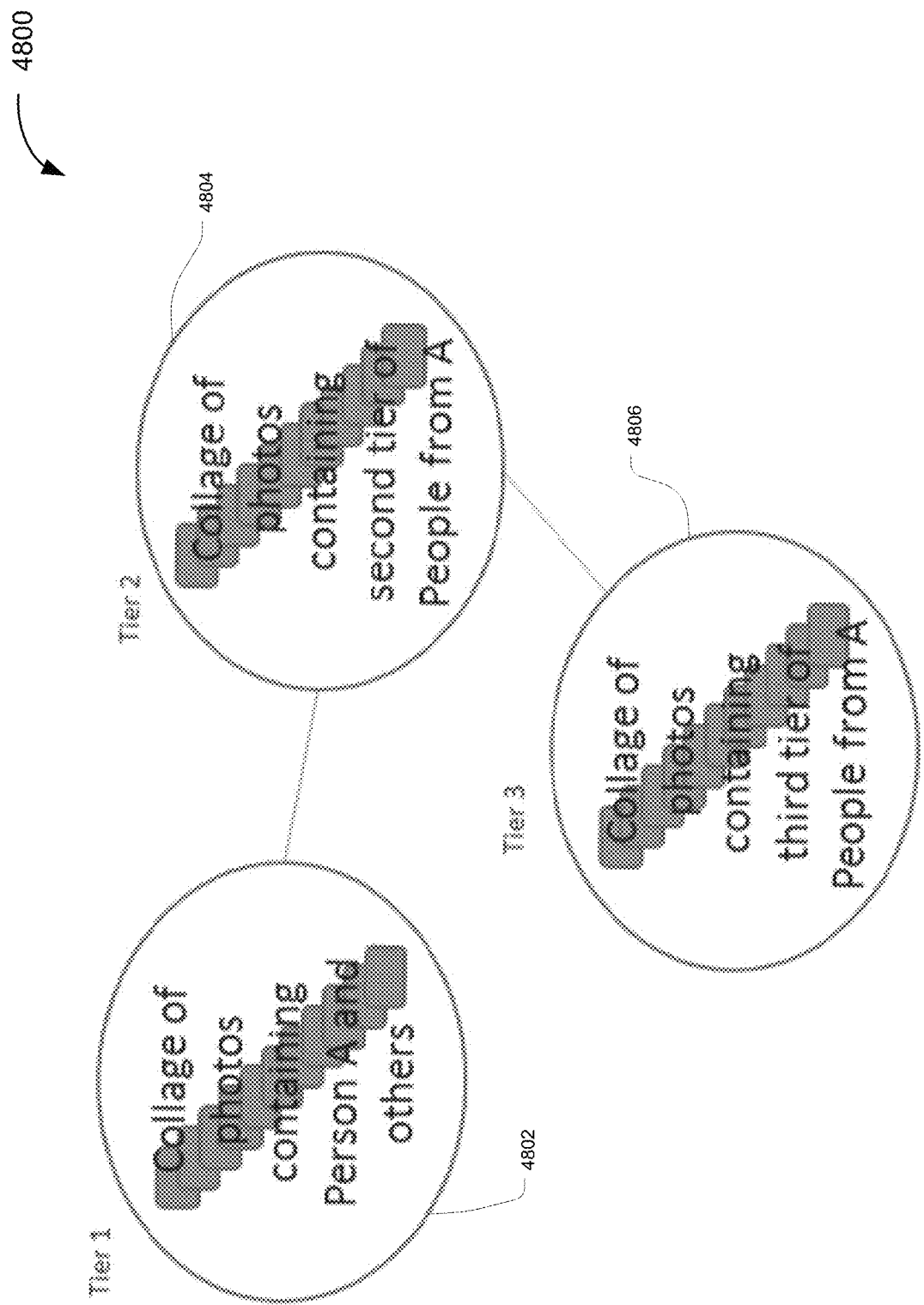
FIG. 48 illustrates a collage of photos representing the tiers shown in FIG. 48.

Another non-limiting exemplary implementation for representing the tiers may be to show a collage of photos contained in that tier. FIG. 48 shows a possible display that demonstrates this method.

Figure 49:
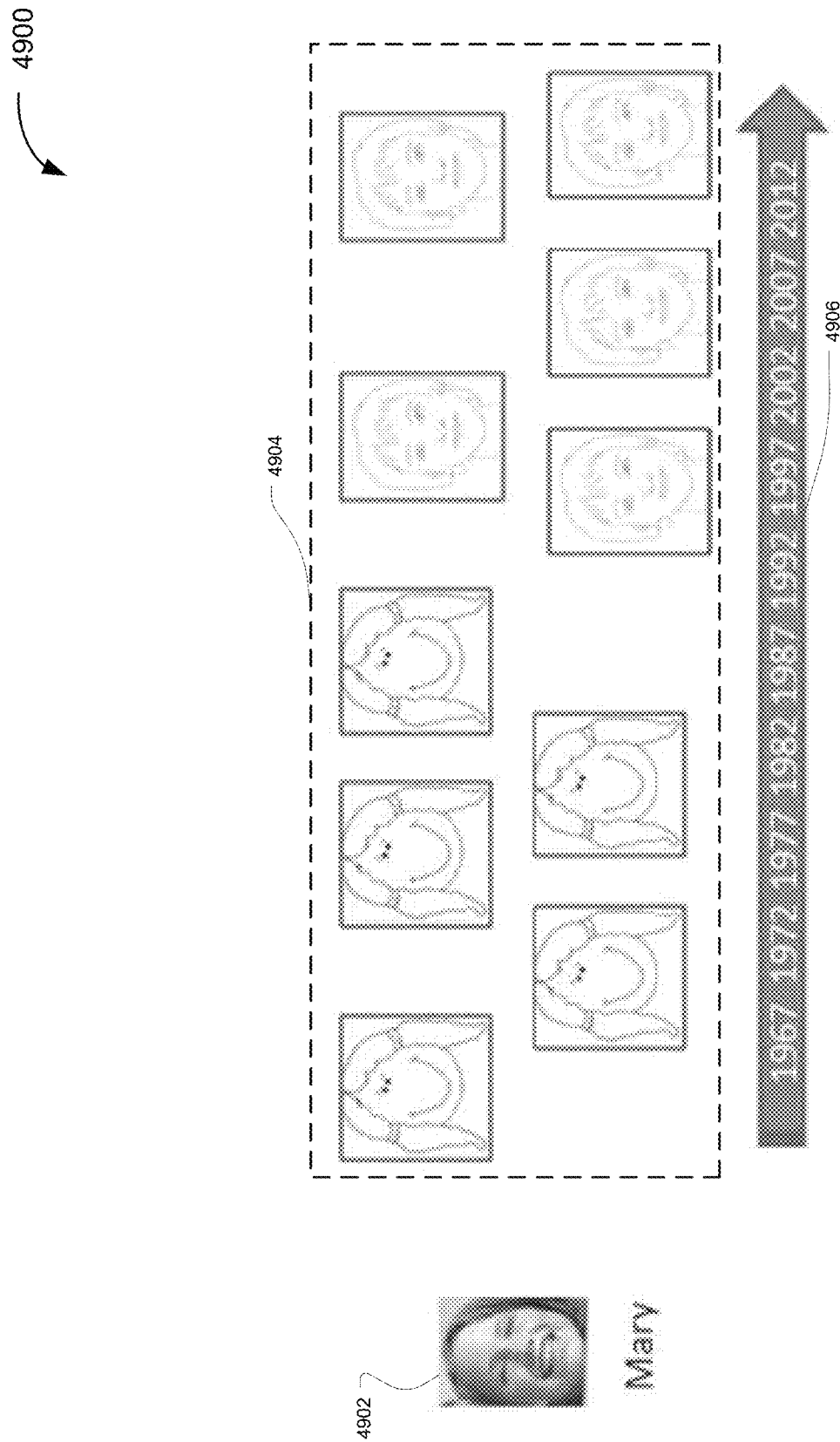
FIG. 49 illustrates displaying a timeline of face portraits for an identified person, in accordance with an aspect of the present invention.

Another non-limiting exemplary implementation of the present invention for showing the data available from the name tags in photos is to extract the face of a person from photos and display those faces on a timeline. FIG. 49 provides an example. Starting with a selected person 4902 (selected by the at least one computer or in accordance with user input), all faces of that person 4904 may be extracted from each photo in which they are tagged and displayed along some form of date or time axis 4906. If more than one photo of the selected person is available, this may show the evolution of a person over time.

In accordance with a non-limiting aspect of the present invention, at least one computer may include or interface with a database of portraits, each portrait associated with an identified person shown in the respective portrait. The at least one computer may select one of the identified persons from the database, ordering a plurality of the portraits associated with the selected identified person based at least partly on date metadata associated with each respective portrait, and displaying a visual representation. The visual representation may include a timeline; and an arrangement of the plurality of the portraits along the timeline in accordance with the respective ordering.

More details regarding use of face detection and recognition for tagging purposes will now be described. Face detection algorithms operate in many different ways, but the net result of scanning a digital image and applying one or more of these algorithms is the presentation of a list of possible face regions. These regions are usually identified by a bounding box defined by four coordinates (e.g. top/left, top/right, bottom/left, bottom/right).

If a set of new photos is offered to a face detection system of the present invention, then the system may return a list of faces to the user and ask the user to tag the faces—in other words—attach a name to the faces. This name could be input via the keyboard or via drag and drop from an existing contact list or address book. The user may also typically provide input to delete any false positive faces where the system has falsely identified a region of a photo as a face.

A face recognition system of the present invention may take the face detection results (e.g. a list of bounding box coordinates and a pointer to the original digital image) and generate digital signatures for each face. These signatures are mathematical representations of the pixels that constitute the face as defined by the bounding box or other mask area applied to the bounding box or a subset of the bounding box. For example, it may be possible to use the eye coordinates of the face to center an oval mask over the face region to attempt to eliminate non-specific features like hair, hats, and other non-facial objects. Then only the pixels within this mask area are used to generate the face signature.

These mathematical signatures could be a sequence of numbers (real or complex) or a single digital string or a multi-dimensional array depending on the algorithm. Other functions performed by a face recognition system of the present invention may be to:

1. Compare two face signatures together to determine a "likeness" score.

If that score passes a dynamic or pre-defined threshold then it becomes a "suggested" match between the two.

2. Combine "like" face signatures together into clusters of faces that are similar. This also uses a dynamic or pre-defined threshold to determine whether face signatures belong together in the same cluster.

An optional function is to find a representative signature for a single person that has a list of face signatures based on tagging activity by the user. In essence, this person is "known" to the system because faces have been tagged with the same name.

In accordance with aspects of the present invention, the present invention may enable the visualization of data relationships extracted from photo metadata—specifically name tags and dates that are attached to digital photos. This data could be attached to photos directly via common metadata formats (e.g. EXIF, Adobe XMP, etc.) or could exist separate from the photos in a database that links the photo name to the metadata contained in database tables.

Based on people identified via the tags (or in the database) and the frequency of appearance and who they appear with in the photos, data relationships are determined that can be graphed in different ways. These graphs provide ways to visualize the relationships.

The graphs may automatically be created by the invention or the user of the invention may request a graph be created starting with a specific person selected by the user. The specific person would become the center of the graph in a network representation, or left starting point in a "left to right" representation.

To collect the data required to display a graphic representation like FIG. 46, multiple queries may have to be run against a database containing metadata—specifically the name of people appearing in photos. If the data only existed in the metadata directly attached to the digital photos then this metadata would have to be collected via an image scanning process. The resulting collection could be placed in computer memory (such as an array of text fields) or it could be placed into a permanent or temporary SQL database for subsequent query purposes. For purposes of this part of the description, assume that the data resides in a SQL database.

The initial query would find a count for all images containing people that appear with the selected "starting" person in one or more photos. People identified in such images may be designated as "acquaintances". The resulting list could be sorted in descending order based on number of appearances for each acquaintance. The graph would display the starting person as a node in the graph. The size of the node may or may not vary based on the number of photos. The number of photos in this case would be the total number of photos in which the "starting person" appears.

The next node displayed would be the first or largest acquaintance in the list. The size of the node may or may not vary with the number of times they appear in photos with the "starting person". This node would be attached via a connector to the original starting node. This process would continue until all the acquaintances are depicted in the list. One non-limiting implementation would limit the size of the list to a minimum number of appearances together. The graph could represent people that appear in at least 3 photos with the starting person.

Once the list is exhausted, then for each acquaintance another query would be run to determine all of the people that appear together with that acquaintance but NOT with the starting person. Based on this list then nodes would be added to the graph with connectors back to the acquaintance.

This process would continue until all acquaintance nodes in the graph are exhausted. In order to limit the size of the graph—especially in the case of a person with tens of thousands of photos—it is possible that the user could specify a limit of X tiers away from the starting person.

The other types of graphs identified that show this "tier relationship" would be generated in a similar fashion to the above, but the method of display differs. For FIG. 47, the photos may be shown as thumbnails or scrollable images on a "Tier by Tier" basis. This could be a tabbed interface that offered a "tab per tier". For FIG. 48, the photos are shown in a collage format for each tier away from the central starting person. Each collage could be a separate graph or page, or they could be combined into one large graph.

To generate FIG. 49, the dates for the images may be used to define the ordering of faces along the timeline. The face images themselves may be extracted from the original photos using coordinates for a pre-determined bounding box around the face. The bounding box may be determined based on a face detection method that identifies the coordinates containing a face automatically, or the user may manually define a bounding box by physically drawing a box around the face with the aid of a mouse, touchpad or touch screen user interface.

In accordance with a non-limiting aspect of the present invention, at least one computer may include or interface with a database of digital images and respective metadata identifying a name of at least one identified person shown in the respective digital image. Each person may have been previously identified using face detection and recognition techniques described herein. The at least one computer may select one of the identified persons from the database, determine at least one first identified person shown in at least one of the digital images together with the selected identified person, and display a visual representation. The visual representation may include, for each first identified person, a first tier node representing the selected identified person and the respective first identified person being shown in at least one of the digital images together. The visual representation may also include, for each first identified person, a second tier node representing the respective first identified person being shown in at least one of the digital images without the selected identified person.

Optionally, the visual representation may include, for each first identified person, a second tier node representing the respective first identified person being shown in at least one of the digital images without the selected identified person, but with a second identified person, wherein the second identifier person is determined not to be shown in any of the digital images showing the selected identified person.

Optionally, the visual representation may include, for each second identified person, a third tier node representing the respective second identified person being shown in at least one of the digital images without the respective first identified person.

Optionally, each first tier node may include a collage of the digital images that show both the selected identified person and the respective first identified person.

Optionally, each first tier node may include a collage of digital images that show both the selected identified person and the respective first identified person; each second tier node may include a collage of the digital images that show the respective first identified person without the selected identified person; and each third tier node comprises a collage of the digital images that show the second identified person without the respective first identified person. Images obtained for this purpose may be used to further populate a repository for access by a security platform.

Clustering Description

An optional function of embodiments described herein may be to find a representative signature for a single person that has a list of face signatures based on tagging activity by the user. In essence, this person may be "known" to the system because faces have been tagged with the same name. For purposes of determining a likeness score and suggesting a match between two photos, the representative signature is used to compare with each unidentified face to determine if there is a match. The representative face signature could also be a set of face signatures such that each item in the set may represent a single cluster of face signatures for that specific person.

Finding a representative face for a group of faces assigned to a person may be useful in order to reduce the time required to compare a large number of known faces (e.g. potentially hundreds of known faces, or more) with each new unidentified face. Furthermore, people age over time and change their appearance for a variety of reasons so using a set of face signatures representing clusters of similar faces for a particular person can provide better results while at the same time reduce the number of comparisons necessary versus comparing every specific known face.

A further use of clustering may be to present "like" faces to the user in batches for tagging purposes. This may save time in providing the ability to tag many faces with one name, instead of tagging each individual face.

One challenge with clustering is that for performance reasons it is not desirable to have to re-cluster the entire set of unidentified faces as new faces are introduced to the set. It may be more efficient to employ various techniques that allow for the creation and management of incremental clusters.

Details will now be described regarding clustering for the purposes of finding the representative faces for an individual during the recognition step. The plurality of faces associated with a known person may be grouped using a form of hierarchical clustering, where face signatures are compared as described above, to create groups of faces having similar appearance. To compare an unknown face to the known person, all of the individual, one to one, face comparisons may be made, and then the results may be combined by arithmetic mean to form one or more aggregate results, one for each group of similar faces.

To enable effective comparison of the aggregate results a linear correction which depends on the number of individual results used to compute the aggregate result may be applied. This linear correction may be determined by first comparing a group of known faces having a particular number, "N", with a large number of individual faces known to belong to different people to determine the distribution of results.

Then the linear correction may be determined to be that which best aligns this distribution to a standard normal distribution. Finally, the correction may be further adjusted so as to give larger groups of faces an advantage in the comparison with unknown faces by either increasing the standard deviation or shifting the mean. This final step ensures that people who appear frequently in a user's collection of photos have an appropriate increase in their likelihood of being suggested as a match for a new unknown face.

The plurality of corrected aggregate results obtained by comparison of a single unknown face to all of the known persons may be compared against either a fixed threshold or a dynamically chosen threshold. If a dynamically chosen threshold is to be used, it may be selected to be the threshold that yields the maximum number of unknown faces for which only a single person has results exceeding the threshold. The advantage of such a dynamically chosen threshold is that it maximizes the number of true person suggestions while simultaneously minimizing false positive suggestions.

Embodiments implement a clustering process that may involve hierarchical clustering. The initial clustering may be agglomerative using a bottom up approach where each observation starts with its own cluster. Pairs of clusters may be merged as one moves up the hierarchy while the selection of representative faces may be divisive based on a top down approach where all observations start in one cluster, and splits are performed recursively as the process moves down the hierarchy. Initially every face is considered to be its own separate cluster. Each face is compared to every other face and the score (or likeness) values are calculated, recorded and sorted. Scores below a certain pre-determined threshold are discarded. Then, starting with the highest score (the two faces that are most alike) and working towards the lowest score, each pair of faces are joined by an edge if they are not already joined using a graph structure with a path of edges. That is, two separate clusters can be merged but faces within a cluster are not further joined by additional edges. The result is a graph structure with several distinct dendrograms (trees), each one representing a cluster. Note that within each dendrogram there are no loops and the number of edges is one less than the number of faces. For each cluster where the number of faces is larger than some specific integer threshold (e.g. 20), we select a subset of the faces to represent the cluster.

Selection of the subset could be implemented as follows. First find the edge with the lowest score and remove it to split the tree into two smaller subtrees. Then decide how many faces will be selected from each subtree so that the counts are in equal proportion to the size of the subtree. For example, if we are looking for 15 faces and subtree A is twice as big as subtree B, then we will want to select 10 faces from subtree A and 5 faces from subtree B. If the number of faces in the subtree is equal to the number we want, then those faces are simply output as the result and processing of that subtree terminates. If the number of faces is greater than the number we want, this process is applied again recursively. That is, within the subtree, the next edge with the lowest score is found and removed to further divide the tree. The result is the reduction of a tree of any size to some fixed size such that the remaining faces are a statistically representative sample of the original set of faces.

Details will now be described regarding the use of clustering for unidentified faces to improve the time involved for face recognition. For practical and performance reasons, embodiments described herein can implement a fully incremental constant time clustering process. The clustering process may have a constant processing time, which does not vary depending on total number of photos in the set. The following steps may be involved in adding a new face to the existing clustering. First, the process may assume that each of the existing faces has been assigned some sort of clustering token (e.g. an integer). Two faces are considered to be in the same cluster if they have the same token. Second, the process may assume that each face is associated with some photo and that each photo has a date and time associated with it. This is usually but not always the date and time that the photo was taken. It may also be the time the photo was received or uploaded by system. Finally, the photos are kept in a sorted order by this date and time metadata.

Given a new photo with at least one face in it, the process can first use the date/time of the new photo to find its location within the sorted list of existing photos. The process may start performing one-to-one face comparisons between the new face and existing faces by moving outward in both directions from this location. That is, the new face is first compared to existing faces that were photographed at a similar date/time before moving to progressively more distant (past and future) dates.

If a one-to-one face comparison yields a likeness that exceeds a define or fixed threshold value, then embodiments assign the new face to the same cluster token as the existing face and the clustering of the new face is complete.

Rules may be applied to ensure that the time spent adding each new face to the clustering is constant. The following is an example of such a rule set according to embodiments of the present invention. First, new faces are never compared to other new faces in the same photo. Second, if the new face fails in its comparison to one face of a particular cluster, then the new face is not compared against any other faces from that same cluster. Third, we now have a fixed maximum number of comparisons that will be made. If this number is reached without finding a match, then the new face will be assigned a new cluster token and will, therefore, be the first face in a new cluster.

Finally, when processing a batch of photos, the photos are processed in a random order to improve "long range" clustering.

Figure 50:
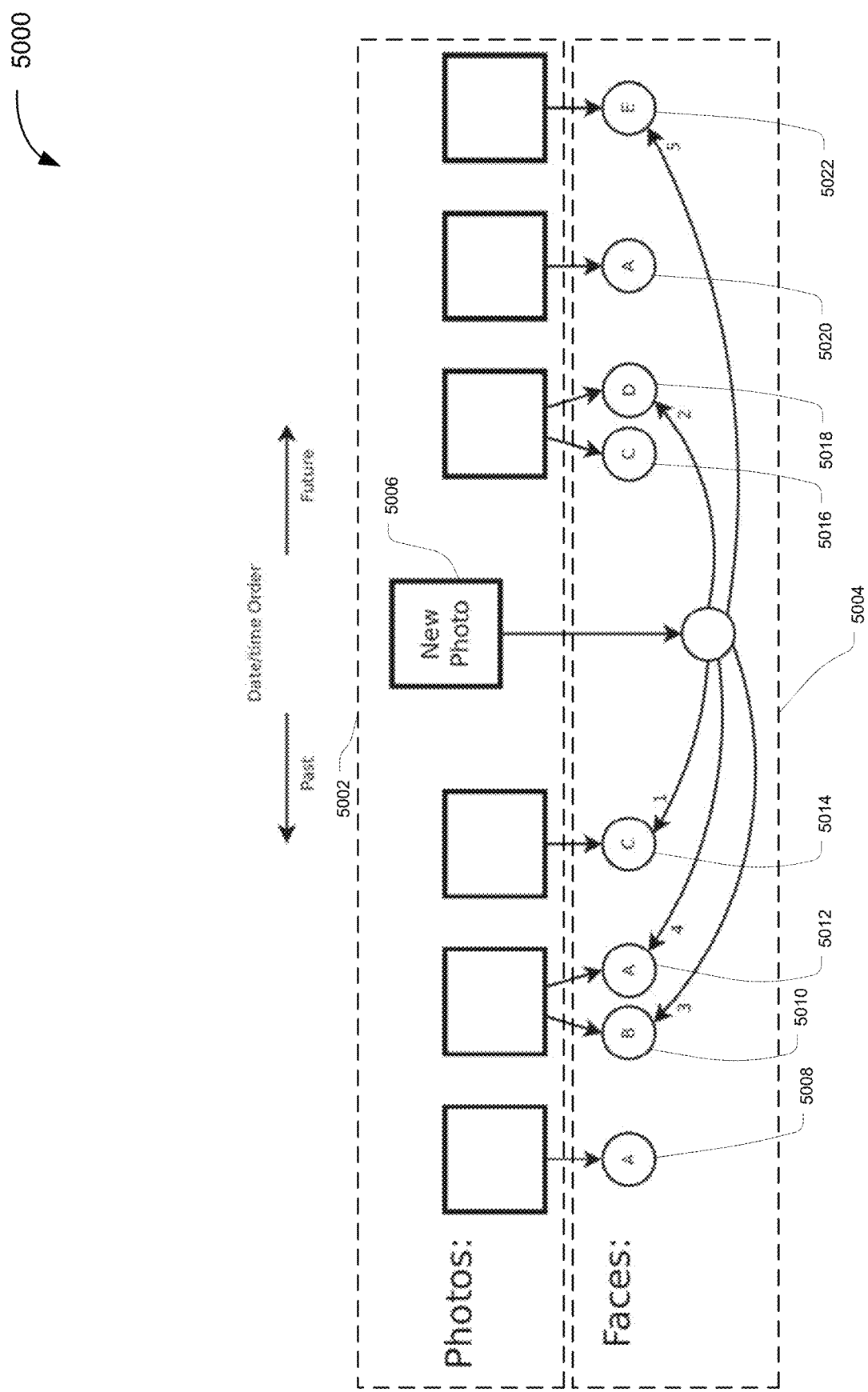
FIG. 50 illustrates identifying a face in a photo by using clustering in accordance with an aspect of the present invention.

FIG. 50 shows photos 5002 and faces 5004 with associated dates and times, arranged chronologically. The "New Photo" 5006 is being analyzed in accordance with the present invention. The letters on each face 5008-5022 represent the cluster id/token for the respective face. The curved lines with arrows shown below the cluster tokens 5008-5022 in FIG. 50 represent the face-to-face comparisons that are to be performed from faces in the New Photo to faces in other photos. The numerical value shown on the curved lines representing the face-to-face comparisons indicates the order in which the respective face-to-face comparisons are performed. For example, photos 5002 with the closest date/time to the New Photo 5006 may be compared first, and the remaining faces 5004 may be compared in chronological order of the associated dates and times of the photos or faces. Assuming no matches were found in earlier face-to-face comparisons, the three existing faces (5008, 5016, 5020) with no curved lines linking the respective faces to the face from the New Photo 5006, indicate that comparisons with those respective faces were skipped, as the respective faces belonged to a cluster already considered.

In order to show a match, the comparisons cease when a match is found and the new face takes on the same cluster id letter as the matching face (e.g. "E"), shown in FIG. 50.

In order to show no-match, then the new face may get assigned a new cluster id (e.g. "F"), not shown in FIG. 50.

In accordance with a non-limiting aspect of the present invention, at least one computer may include or interface with a database of digital images and respective metadata identifying a date of the respective digital image, a plurality of the digital images showing at least one respective unidentified person ("unidentified digital images"). The at least one computer may sort the unidentified digital images by the respective date metadata, and assign a respective clustering token to each of the unidentified digital images. The assigning may include, in accordance with a determination that a subset of the unidentified digital images each show a common unidentified person, assigning a common respective clustering token to each of the unidentified digital images of the subset.

In the example embodiment of the previous paragraph, the at least one computer may group the unidentified digital images by respective clustering token. At some point, the at least one computer may receive a new digital image from another computer, database, user, or from anywhere else. The new digital image and respective metadata may identify a date of the respective new digital image, and the new digital image may include a new unidentified person. The at least one computer may then attempt to identify the new unidentified person in the received image by using or leveraging any of the clustering techniques described herein. In particular, the at least one computer may perform at least one comparison of the new unidentified person to the at least one respective unidentified person of the plurality of the digital images in an order, wherein for each group of unidentified digital images.

In the example embodiment of the previous paragraph, the at least one computer may perform only a single comparison of the new unidentified person to the respective common unidentified person. The at least one computer may assign a clustering token to the new digital image in accordance with the comparison performing resulting in a determination of the new unidentified person common to a respective one of the groups of unidentified digital images. Optionally, the comparison performing order comprises an order by date metadata closest in date to the date metadata of the new digital image. Optionally, wherein upon having performed a predetermined maximum number of comparisons of the new unidentified person to the at least one respective unidentified person of the plurality of the digital images, the at least one computer may halt the comparison performing and assigning a new clustering token to the new digital image.

Figure 51:
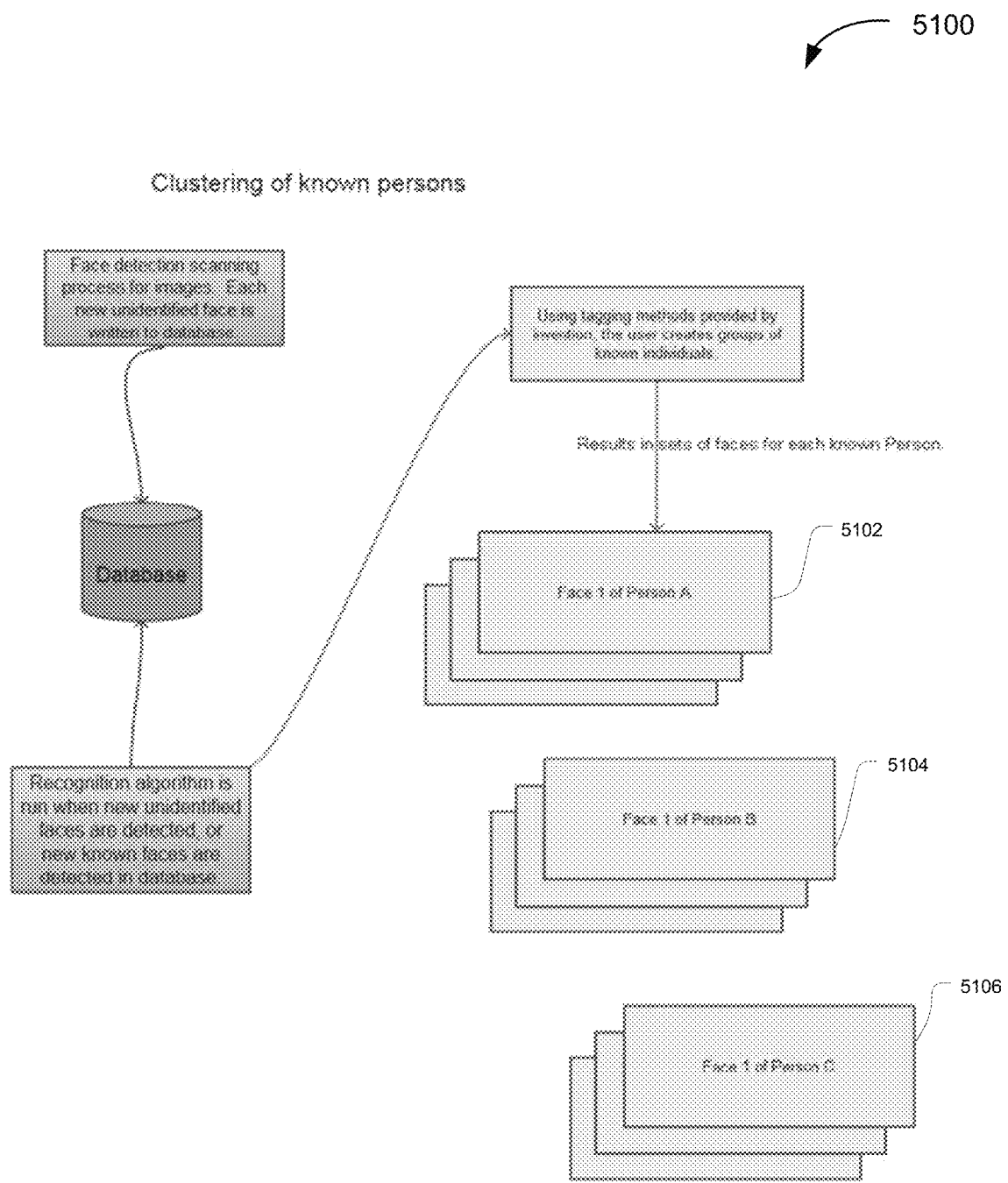
FIGS. 51-53 illustrate face grouping and clustering in accordance with an aspect of the present invention.
Figure 52:
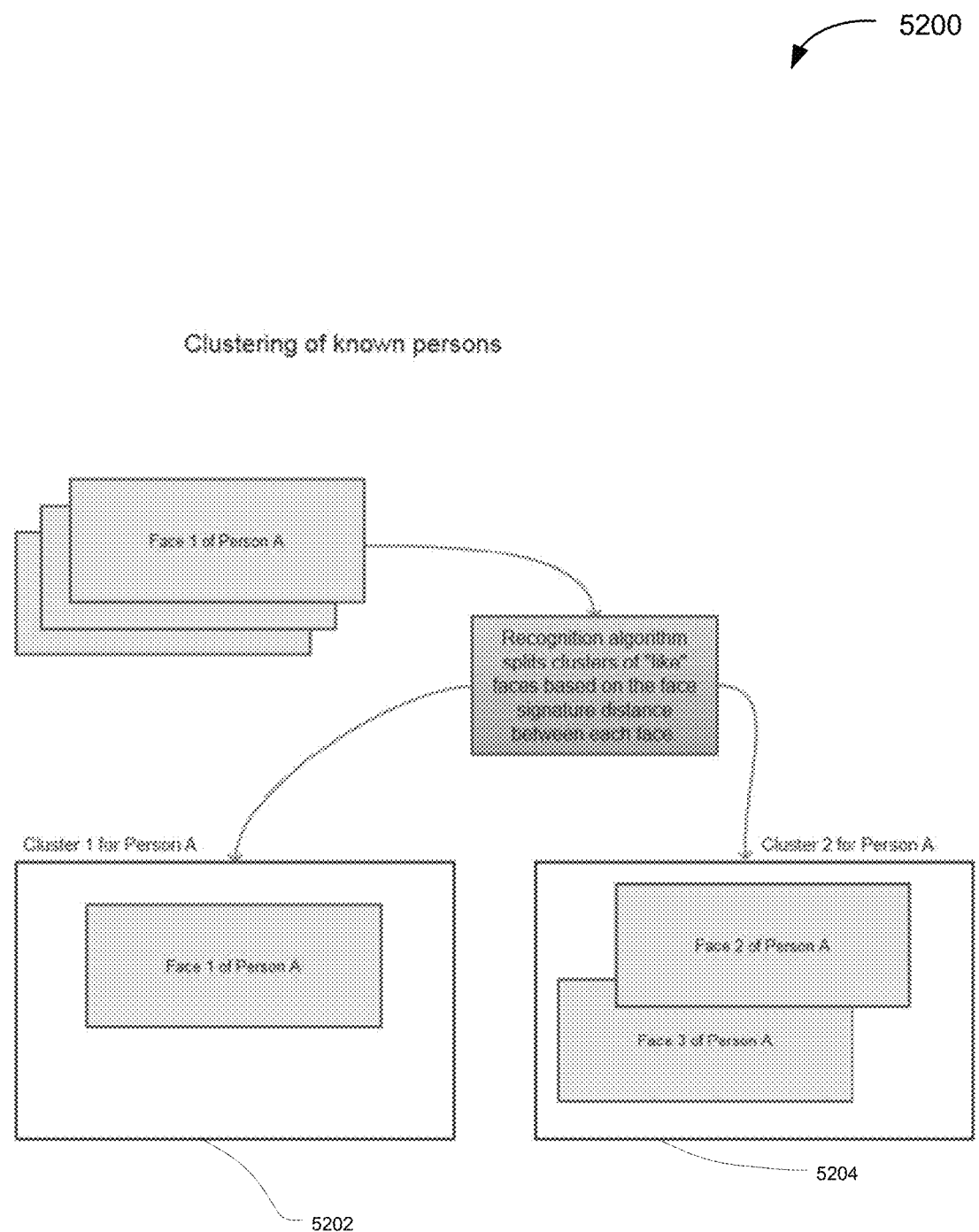
Figure 53:
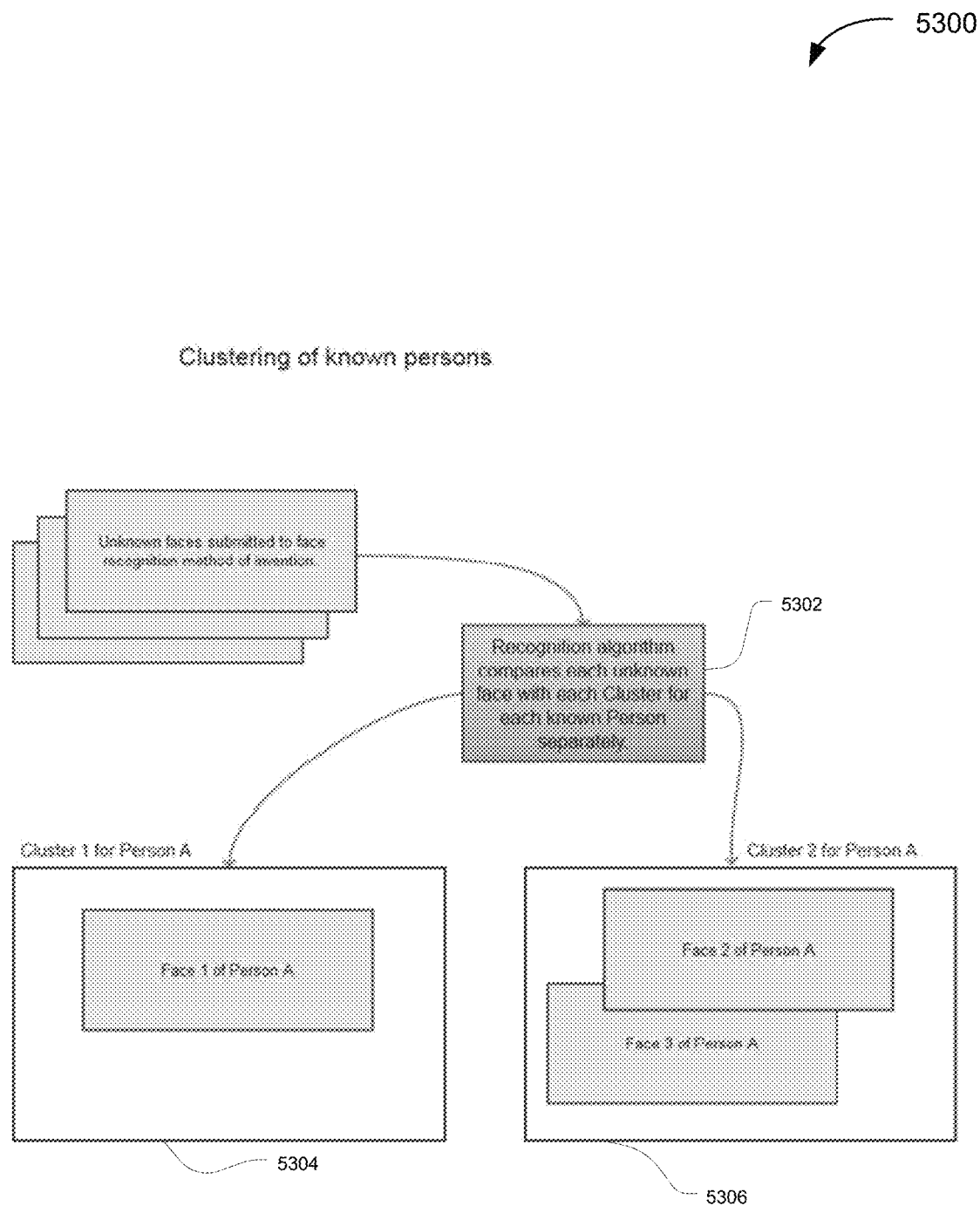

FIGS. 51-53 illustrate aspects of the faces clustering of the present invention. FIG. 51 shows faces of a respective known person may be grouped through tagging methods provided by the present invention. In FIG. 51, groups of faces of known persons A, B, and C, are respectively grouped (5102, 5104, 5106). In FIG. 52, a recognition algorithm in accordance with the present invention may the groups of faces of a known person into one or more clusters of faces of the known person (5202, 5204). The splitting into clusters of like faces may be based at least partly on the face signature distance between each face in the group of faces of the known person. In FIG. 53, when an unknown face is submitted to the face recognition method of the present invention, the recognition algorithm of the present invention may compare the unknown face 5302 with each cluster for each known person (5304, 5306) separately.

Using Image Metadata to Improve Face Recognition Results

A challenge in face recognition may be that due to the unconstrained nature of consumer photos taken with a wide range of camera devices—including smart phones, cell phones, and disposable cameras—the ability to accurately identify people in photos (or video) will likely never reach 100% accuracy. There may just be too many variables, similar to the challenges associated with accurate weather forecasting.

It is possible to enhance the accuracy of recognition results beyond the pure mathematics of analyzing and comparing pixels contained in the image. By taking advantage of image related metadata including date taken, camera type, location coordinates, and event information it is possible to reduce false positive data generated from the face recognition algorithms. In a further extension of this concept it is also possible to recognize other objects in the image (non-human) that could relate to a specific place, event or time.

These concepts also apply to video images in addition to static images. They can be applied in real-time as the user is taking the photo or video; or they can be applied post-image taking.

Figure 40:
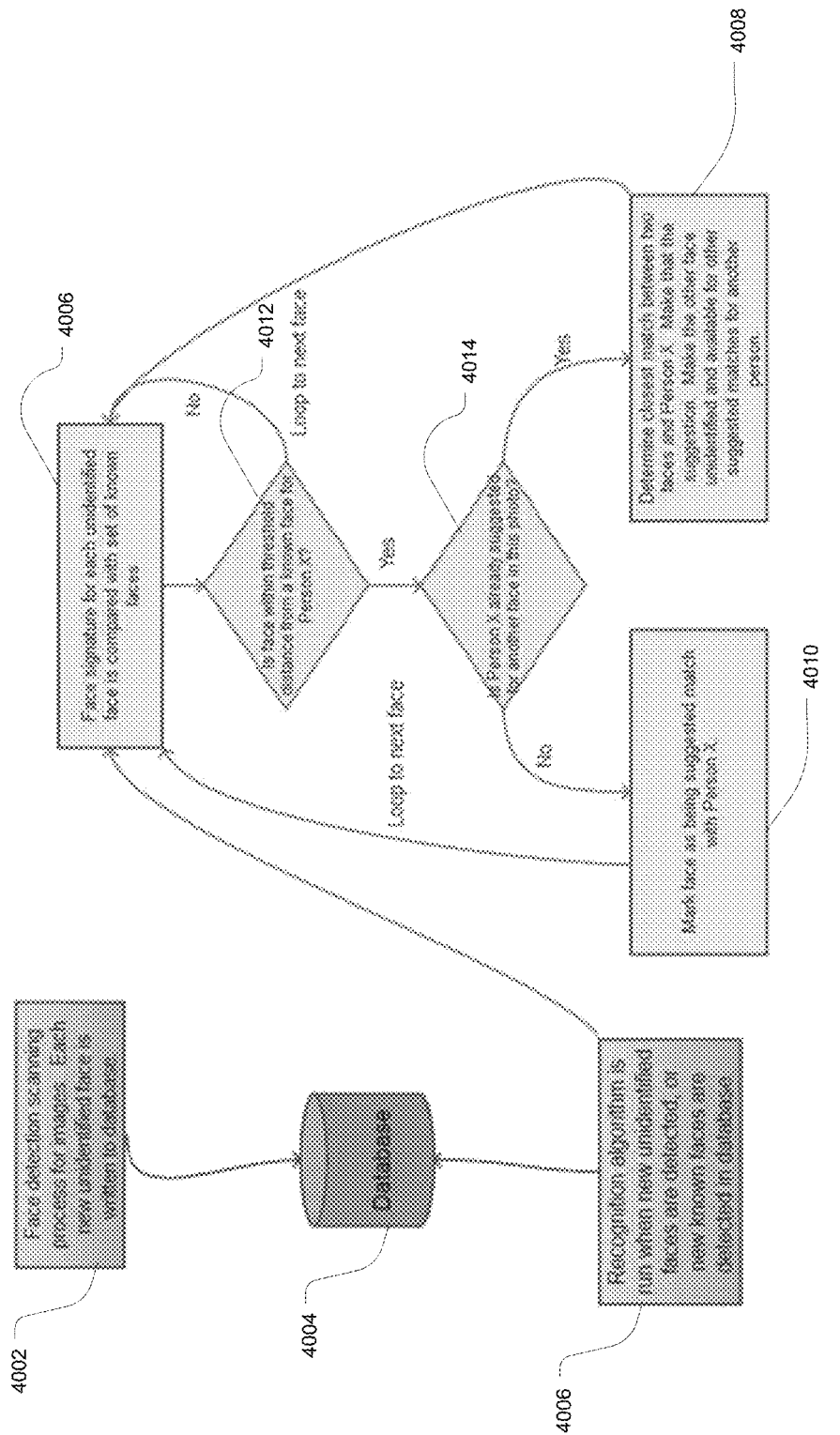
FIGS. 40-45 illustrate workflows in accordance with aspects of the invention to use metadata to enhance face recognition results.

A non-limiting implementation of this concept in accordance with an aspect of the present invention in shown in FIG. 40. Face recognition algorithms operate on a list of unidentified faces 4002 and compare the digital signatures for those faces against digital signatures for known faces 4006 to determine 4012 if a face is within a threshold distance. Any faces from the unidentified set that come within a pre-defined (or algorithmic) threshold with a known face will become "suggested matches" for the person linked to the known face 4010. It can be determined 4014 if the person is already suggested for another face in the photo. If a single photo generated five face regions from the face detection scan, then it may be inefficient to have the same person offered as a suggestion for more than one face in the same photo. Note that there could be special circumstances (e.g. photos involving a mirror and photos modified with an editor) where the same person could appear more than once in a single photo, however it is not practical to design a system that satisfies these rare corner cases. Thus, if the face recognition algorithm came up with two (or more) faces from the same image as a suggestion for the unidentified person, then further logic would consider the fact that the two (or more) faces are in the same image and request the "most closest match" to be the suggestion used 4008. Should the most closest match that is suggested to the user be rejected by the user, in order to improve efficiency, it may be desirable to, with respect to any faces not the most closest match for that image, and thus not suggested, prevent those faces from being suggested in any other digital images as well. Any such rejected face(s) suggestions may then be compared against the set of known people excluding the unidentified person to find the next best match (if any).

In accordance with a non-limiting aspect of the present invention, at least one computer may include or interface with a database 4004 of portraits and associated digital images, each portrait associated with an identified person shown in the respective portrait. The at least one computer may determine that respective portraits of at least two identified persons shown in one of the digital images satisfy a comparison threshold with a portrait of the unidentified person determined from the received digital image. The at least one computer may then suggest an identification of the unidentified person as the respective one of the at least two identified persons having a respectively associated portrait that is determined to be a closest match to the portrait of the unidentified person from amongst the at least two identified persons. The at least one computer may then exclude a remainder of the at least two identified persons from being subsequently suggested from any other one of the digital images as an identification of the unidentified person.

Figure 41:
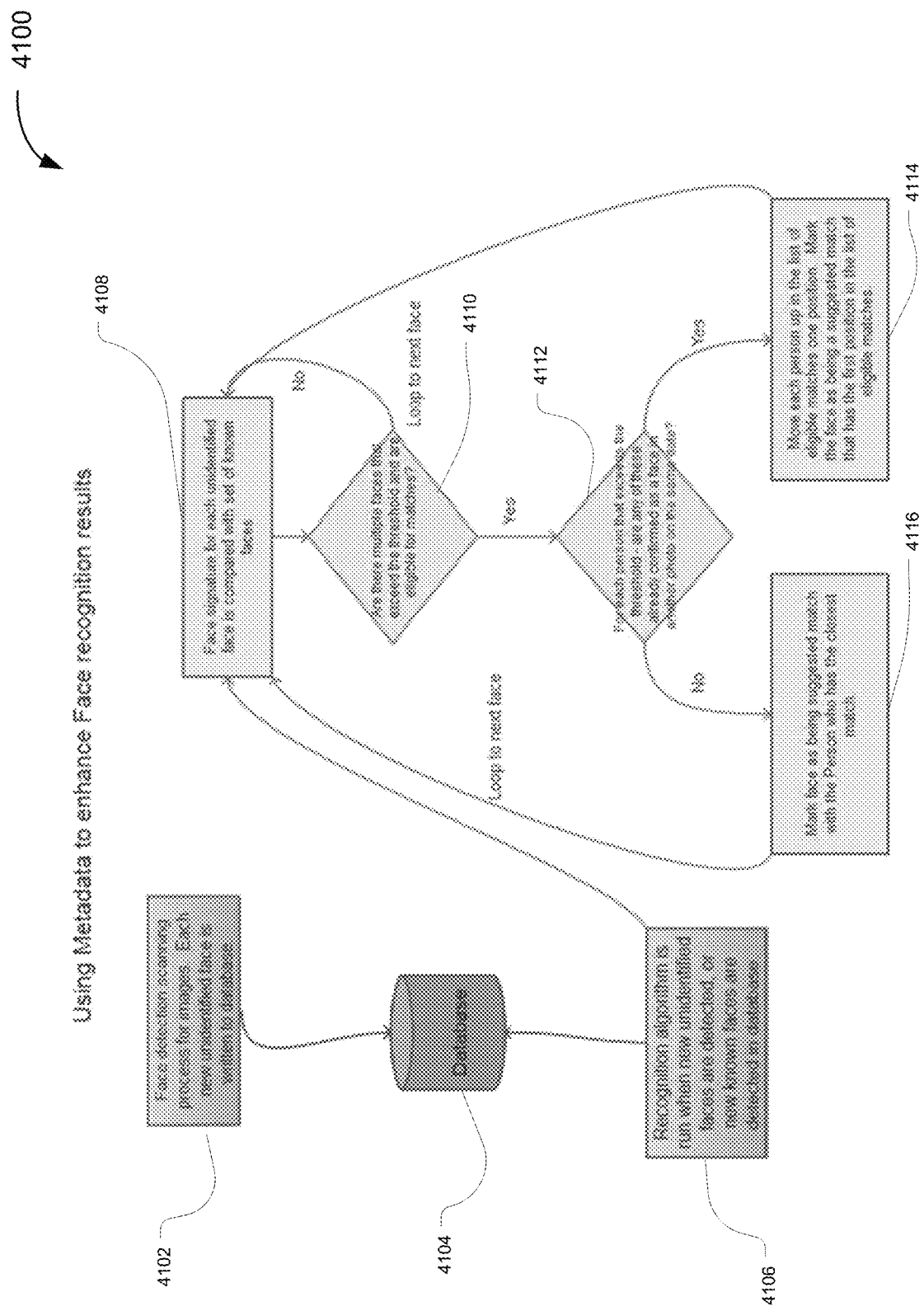

Dates or times may also be considered when suggesting faces, as shown in FIG. 41. It should be assumed that the metadata (e.g. dates, coordinates, camera type, etc.) related to the images being used for the present invention is accurate, otherwise basing face suggestions based on the metadata would not be expected to increase accuracy. Consider a person, referred to as P, tagged in a photo that shares the same date as another photo. In the other photo, assume there exists an unidentified face where two (or more) people meet the recognition threshold for calling that face a suggested match for those people. Then, if one of those people that meet the threshold happens to be confirmed by the user to be person P, the present invention may increase the ranking of person P in a list of suggested identifications based on the probability that person P will show up again in photos from the same date after already having been tagged and confirmed to be present on that date in another photo.

In accordance with a non-limiting aspect of the present invention, at least one computer may include or interface with a database of portraits 4104 and associated digital images, each portrait associated with an identified person shown in the respective portrait. The at least one computer may determine 4106 that a respective portrait of at least one identified person shown in at least one of the digital images satisfies a comparison threshold with a portrait of the unidentified person determined from the received digital image 4108. In accordance with the determined at least one of the digital images associated with metadata comprising a date corresponding to date metadata associated with the received digital image, the at least one computer may suggest an identification of the unidentified person as the at least one identified person.

Figure 42:
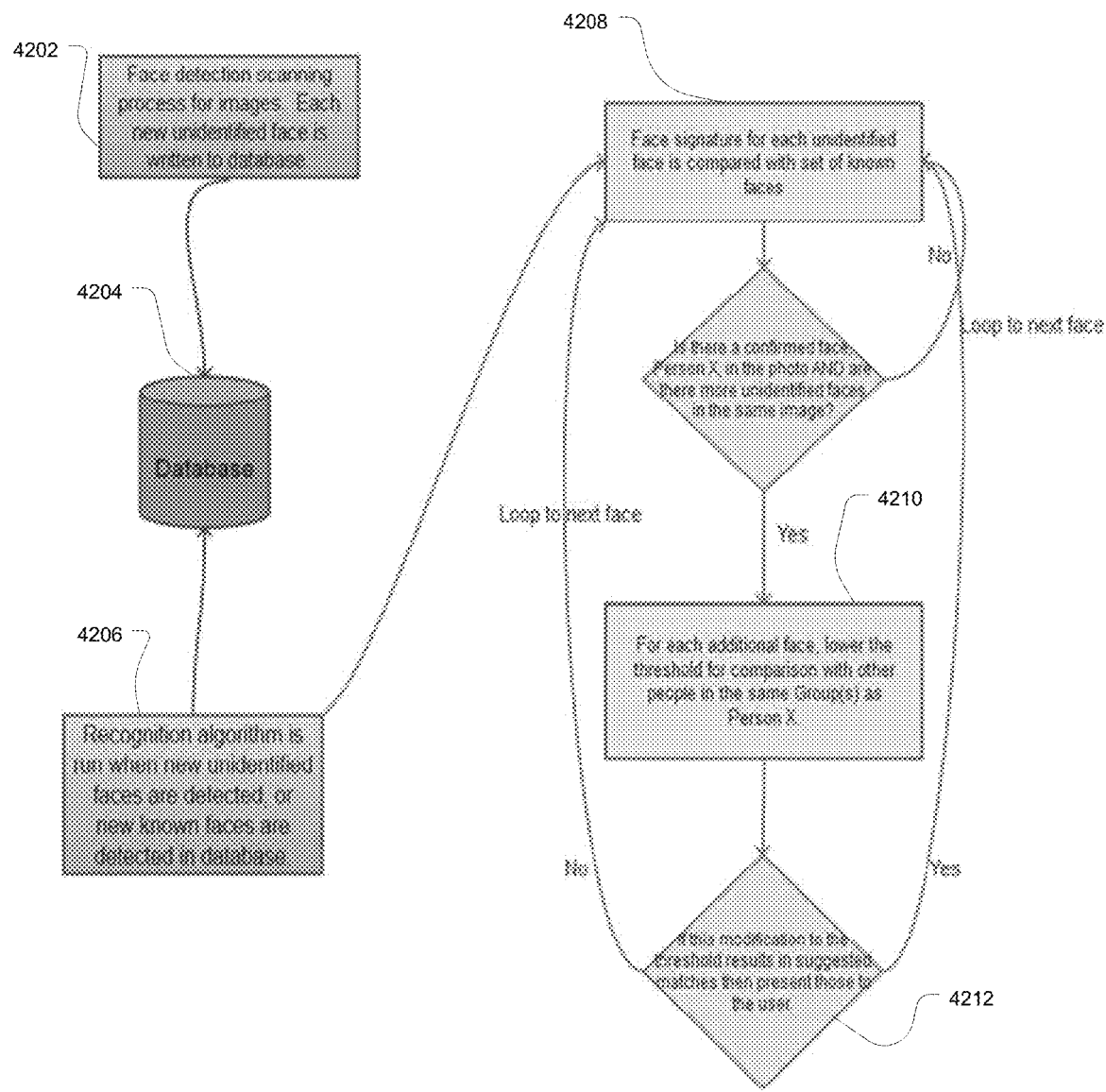

Relationships with people may also be considered, as shown in FIG. 42. Assume a person, referred to as P, is tagged in a photo and other unidentified faces are found in that photo. Further assume that person P also belongs to a group, referred to as C, and this group is known to the system. Then, as part of the recognition suggestion algorithm, the fact that the probability of other faces in the photo also being members of group C is higher could be incorporated into the method by reducing the threshold for each person that is a member of group C 4210, or moving a person from group C higher in the list of potential matches if there is more than one person meeting the suggestion threshold for a given unidentified face.

In accordance with a non-limiting aspect of the present invention, at least one computer may include or interface with a database of portraits 4204 and associated digital images, each portrait associated with an identified person shown in the respective portrait. The at least one computer may, in accordance with a determination 4206 that the received photo comprises at least one identified person associated with a defined group, suggest an identification of the unidentified person based at least partly on a determination that a respective portrait of at least one identified person associated with the defined group satisfies a comparison threshold with a portrait of the unidentified person determined from the received digital image.

Figure 43:
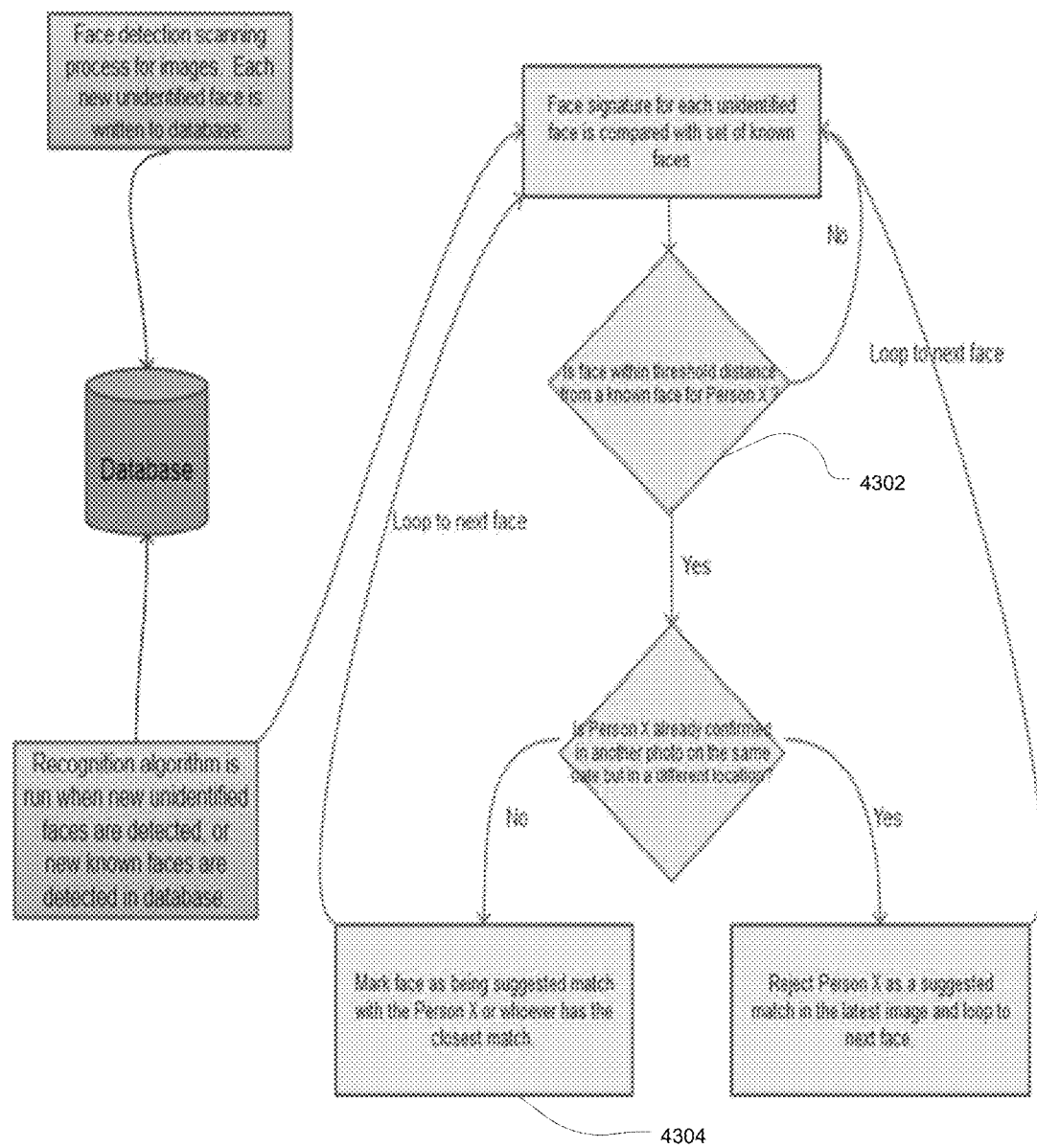

Locations or location coordinates may also be considered, as shown in FIG. 43. For example, assume a person P is tagged and confirmed to be in a photo in location X on date A, and, per the recognition algorithm, person P would normally be a suggested match for unidentified faces in other photos also taken on date A, but in location Y, where Y is more than N hours away from X. In this case, the suggested match for person P may be discarded on the basis that person P could not have been, or was unlikely to have been, in both locations X and Y within the date timeframe established by the metadata of the respective photos. This may take into account the probability that person P cannot be in two places at the same time.

In accordance with a non-limiting aspect of the present invention, at least one computer may include or interface with a database of portraits and associated digital images, each portrait associated with an identified person shown in the respective portrait. The at least one computer may determine that a respective portrait of at least one identified person shown in at least one of the digital images satisfies a comparison threshold with a portrait of the unidentified person determined from the received digital image. In accordance with the determined at least one of the digital images associated with metadata comprising both (i) a date corresponding to date metadata associated with the received digital image; and (ii) a location within a predetermined distance threshold of location metadata associated with the received digital image 4302; the at least one computer may suggest an identification of the unidentified person as the at least one identified person 4304.

Figure 44:
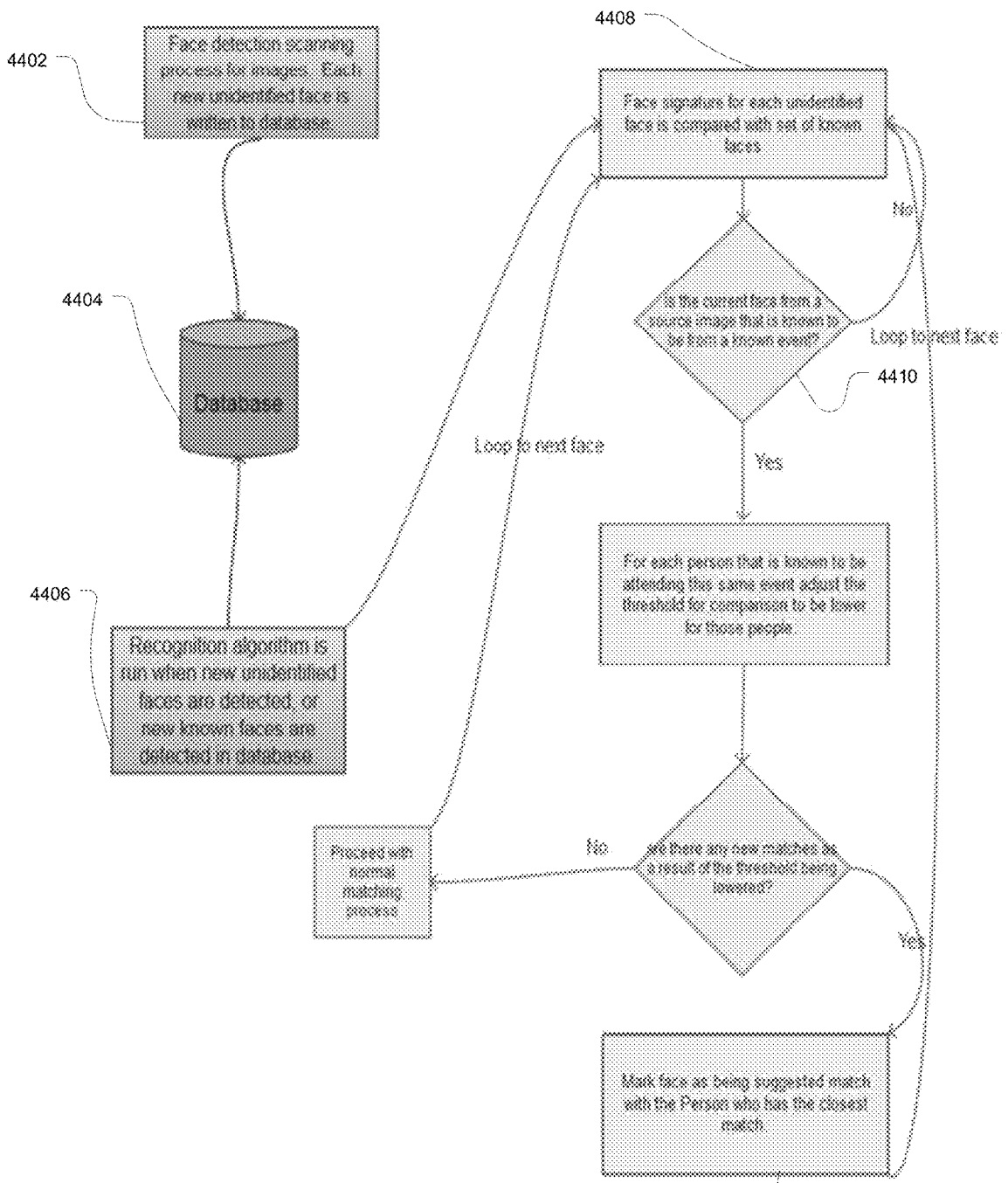

Event information, or other information available on a social network, may also be considered, as shown in FIG. 44. For example, assume the system knows the person P is attending an event X based on social network information captured for that user or other data source, then the probability that person P will appear in photos taken at event X is higher. It is also reasonable to assume that the probability that person P will show up in photos taken at event Y, taking place on the same date, is lower. The recognition method could utilize this further information to assign person P a higher ranking (via one or more specific adjustments) for faces found in photos taken at event X where P would otherwise meet a threshold for being suggested as any of the unidentified faces. The recognition method could also assign person P a lower ranking (via one or more specific adjustments) for faces found in photos taken at event Y.

In accordance with a non-limiting aspect of the present invention, at least one computer may include or interface with a database of portraits 4404 and associated digital images, each portrait associated with an identified person shown in the respective portrait. The at least one computer may determine 4402 that a respective portrait of at least one identified person shown in at least one of the digital images satisfies a comparison threshold with a portrait of the unidentified person determined from the received digital image 4408. The at least one computer may also determine that the received digital image is associated with an event 4410, based at least partly on metadata associated with the received digital image. In accordance with the determined at least one of the digital images being associated with the event, the at least one computer may suggest an identification of the unidentified person as the at least one identified person 4412.

Figure 45:
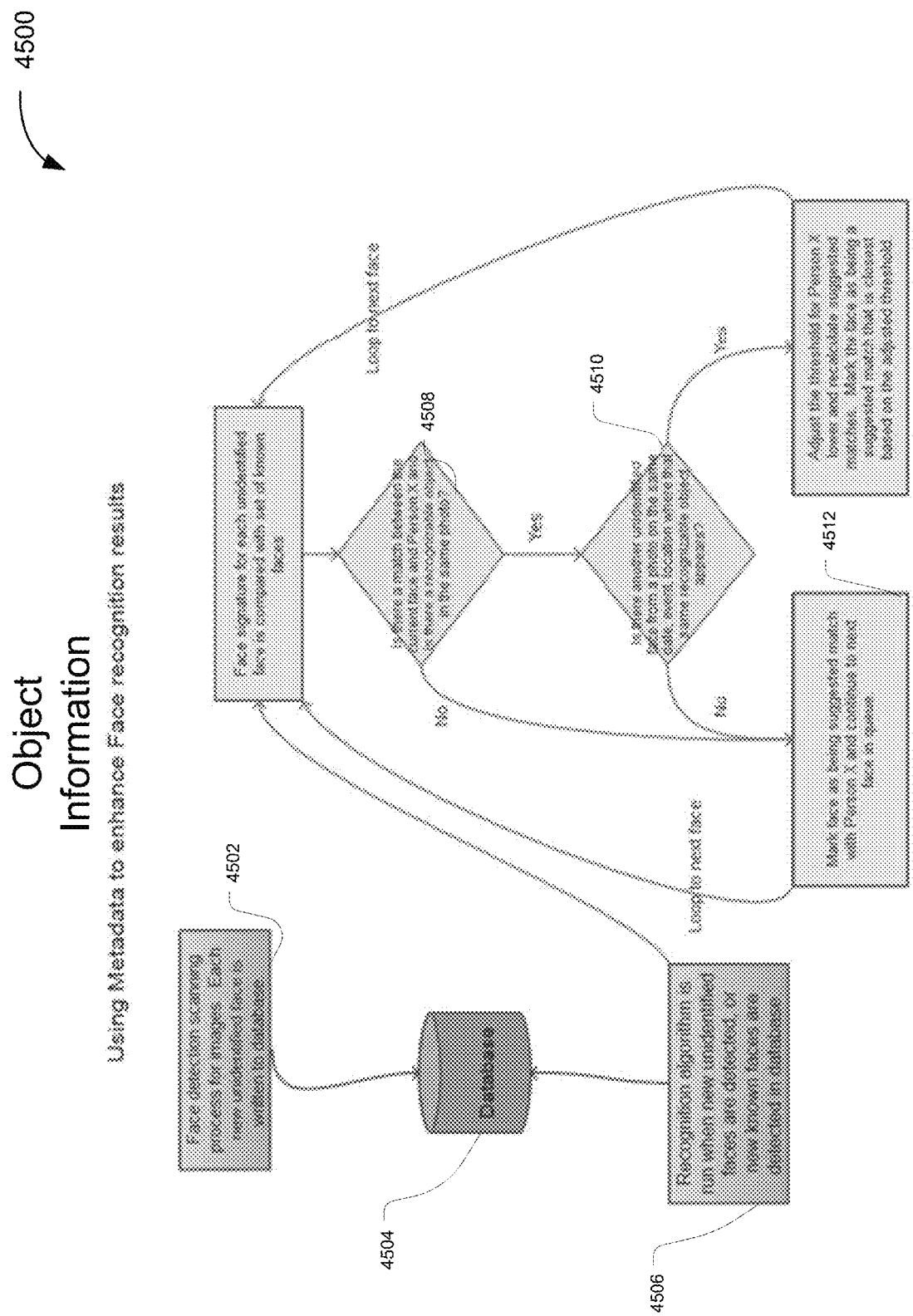

Non-human object or environmental information may also be considered, as shown in FIG. 45. For example, assume that a person P was confirmed and tagged in a photo, and that photo was deemed to be part of a set X of similar photos based on date, event, or location information. Then if person P was further found in the confirmed photo using an object recognition method to be wearing a green sweater, then that information could be used to apply a higher priority or ranking to person P if a face in another photo from set X was found also to be attached to a green sweater. In addition to clothing, other objects shown in the photo, such as furniture, trees, cars, animals, clouds, vistas, or any other environmental arrangements of photographic details may be analyzed and considered. The color, texture, orientation, or arrangement of any such details may be analyzed and considered. Particularly, if person P is tagged in a photo of a set based on date, event, or location, then non-face details of person P may be compared to suggest that person P is an unidentified person in other photos of the set (non-face details may include clothing shape or color, hair color, glasses, skin tone, etc.)

In accordance with a non-limiting aspect of the present invention, at least one computer may include or interface with a database of portraits 4504 and associated digital images, each portrait associated with an identified person shown in the respective portrait. The at least one computer may determine 4502 that a respective portrait of at least one identified person shown in at least one of the digital images satisfies a comparison threshold with a portrait of the unidentified person determined from the received digital image 4508. The at least one computer may then extract non-portrait visual information from the determined at least one of the digital images 4510. In accordance with a determination of the extracted non-portrait visual information satisfying a comparison threshold with non-portrait visual information from the received digital image, the at least one computer may suggest an identification of the unidentified person as the at least one identified person 4512.

Voice-assisted Face Tagging

Optionally, voice or speech recognition may be used to assist or support face tagging as provided in aspects of the present invention. The at least one computer may prompt the user to tag photos. The user may respond by providing user input using any available means, such as by clicking with a mouse, touchpad, key entry, or by responding with voice input. The user may be interfacing with a local computing device, upon which the face tagging method is operating, or the user may be interfacing with a computer in communication with one or more other computers or computer servers, that alone or together provide for the tagging of photos or faces. In either case, the local computing device with which the user is interfacing, which may be a mobile phone, personal computer, or any other type of computing device, may include or be connected to, either through a wired or wireless connection, a microphone or other audio input peripheral. The local computing device or one of the other computers in communication therewith, may process the user's audio input to determine one or more voice commands.

Once the tagging process has begun, and voice recognition is supported and enabled, the user may be presented with one or more photos to tag. Optionally, the user may be asked whether the user recognizes a particular photo. One of the computers may have attempted to determine a date or time of the photo. The user may be prompted to either confirm or modify this date or time. A voice command may be provided from the user in response to be processed by one of the computers. Through the face recognition methods described in accordance with aspects of the present invention, where at least one person is determined to be found in the photo, the user may be prompted to identify the at least one person. A voice command may be provided from the user in response identifying the person by name. Where the voice command does not provide a full name for the person, the face recognition method may suggest a full name to be used to tag the person based on the voice command received. For example, if the user identifies the person as "Bob", the method may suggest at least one full name for "Bob" based on other persons named "Bob" tagged in other photos by the user, or based on other persons named "Bob" who are connected to the user through a social network or contact list. This process may repeat for all of the persons in the photo, and for any other photos not yet tagged by the user. Optionally, existing photos already tagged may also be re-presented to the user for tagging or re-tagging, preferably after all untagged photos have been processed and tagged in accordance with the method of the present invention. The method may also prompt the user to record a caption for any photos being tagged. Any recorded caption may be played back for the user to confirm prior to applying to the respective photo. The caption may also be processed through voice recognition techniques and saved as a text caption associated with the respective photo. The caption text may also be presented to the user for review or confirmation prior to saving.

Authentication and Anti-Spoofing

Embodiments described herein can use different face detection methods. Example methods are based on rigid-templates that include variations of boosting, with a representative including the Viola-Jones face detection process and its variations. These variations include Haar, HOG (Histogram of Oriented Gradients), and LBP (Local Binary Patterns). Other example methods are based on processes that are based on Convolutional Neural Networks (CNNs) and Deep CNNs (DCNNs). Further example methods are based on processes that apply strategies inspired by image-retrieval and Generalized Hough Transform.

There are further processes that implement machine learning and apply a Deformable Parts-based Model (DPM) to model a potential deformation between facial parts. These methods can also combine face detection and facial part localization. This family of methods mainly revolves around extensions and variations of the general object detection methodology.

For face recognition, different method categories include: feature-based and holistic methods. Feature-based approaches first process the input image to identify and extract (and measure) distinctive facial features such as the eyes, mouth, nose, as well as other fiducial marks, and then compute the geometric relationships among those facial points, thus reducing the input facial image to a vector of geometric features. Holistic approaches attempt to identify faces using global representations, i.e., descriptions based on the entire image rather than on local features of the face. These processes can be subdivided into two groups: statistical and AI approaches.

Facial authentication is a desirable solution for verifying that a face presented to a camera is similar to a face that has previously been registered. However, one may be able to circumvent the authentication process by "spoofing" (i.e., presenting a likeness of a known face to a camera, presenting a static image of a known face to a camera and not an actual human, or presenting another face to the camera passing of as a known face). Accordingly, face authentication may be vulnerable to spoofing attacks when a person masquerades as another by falsifying data to present a facsimile or likeness of a known face in attempt to obtain an illegitimate authentication. Such a likeness may be presented in the form of a printed photo, digital image, High-Definition video image, mask, and so on. Embodiments described herein may be applicable to facial authentication via a variety of computer devices, such as for example, mobile device, desktop/laptop, kiosk, security gate, and so on. The face authentication technique may be implemented anywhere a camera is employed to verify that a face presented to a camera is similar to a face that has previously been registered with the system as a face signature, for example. A system component for face authentication may be local or remote from the camera capture device and connected thereto via a communication link.

Another variation on the problem is to simply prove that there is a live person (e.g. an actual human) in front of the camera. The person may or may not have been authenticated via other means, but the system may want to know whether there is a live person in front of the camera.

Embodiments described herein may apply where it is desirable to confirm that an actual person, rather than a likeness of a person (e.g. static image or mask of a person), is being presented in front of a camera to prevent "spoofing". In such situations, there may or may not be a need to verify that a face presented to a camera is similar to a face that has previously been registered. However, it may be necessary to confirm that an actual person is being presented to a camera.

A random selection from a series of challenges or activities may be presented to the user via a user interface in order to confirm that a face being presented to a camera is that of an actual person and not a falsified "likeness". Such challenges may include, but are not limited to, smiling, blinking, eye tracking, nose tracking, mouth opening, lip movement during speech, rotating, turning, or otherwise moving one's head. The challenges request an action that may be detected by the system and may be verified as not being a static image or a pre-recorded video.

In some embodiments, there is provided a method to authenticate a user that involves capturing at least one face in a series of digital images as part of an authentication session. During the authentication session, the system requests that the user in front of a camera to perform a movement of their face such that they have to rotate their head around the pitch and the yaw. That is, the movement is defined by a rotation of the pitch and the yaw. The system generates face signatures at different points of rotation—such as up, down, left and right or combinations of these movements. The system authenticates the user using stored face signatures that were generated at corresponding points of rotation.

The system may involve presenting the user with a screen showing their face image and asking the user to come to a resting place in front of the camera where their eyes are on a horizontal plane, measuring key landmarks on the face and the overall bounding box for the face and record those values, and asking the user to turn their head to match a position denoted on the screen. The position is based on the pitch and a yaw of the movement. The requested position could be denoted by an icon or other indicator on the screen, measuring the key landmarks again.

In some embodiments, the system may verify that the user has moved to the requested location by comparing the landmark values and if they don't match within a threshold then reject the session. The system may involve comparing one or more of the previously captured values to determine whether the face has undergone movements that, once analyzed by the systems and methods described herein, produce values falling outside a threshold range that would denote the movement of a 3D object. If the face has moved outside the threshold range that would denote the movement of a 3D object, thus suggesting that a 2D object been presented to the camera or other recording device of the present invention, then the session is rejected.

The system may involve collecting key landmark data, using a statistical method to discard outlier images from the face samples.

Figure 65:
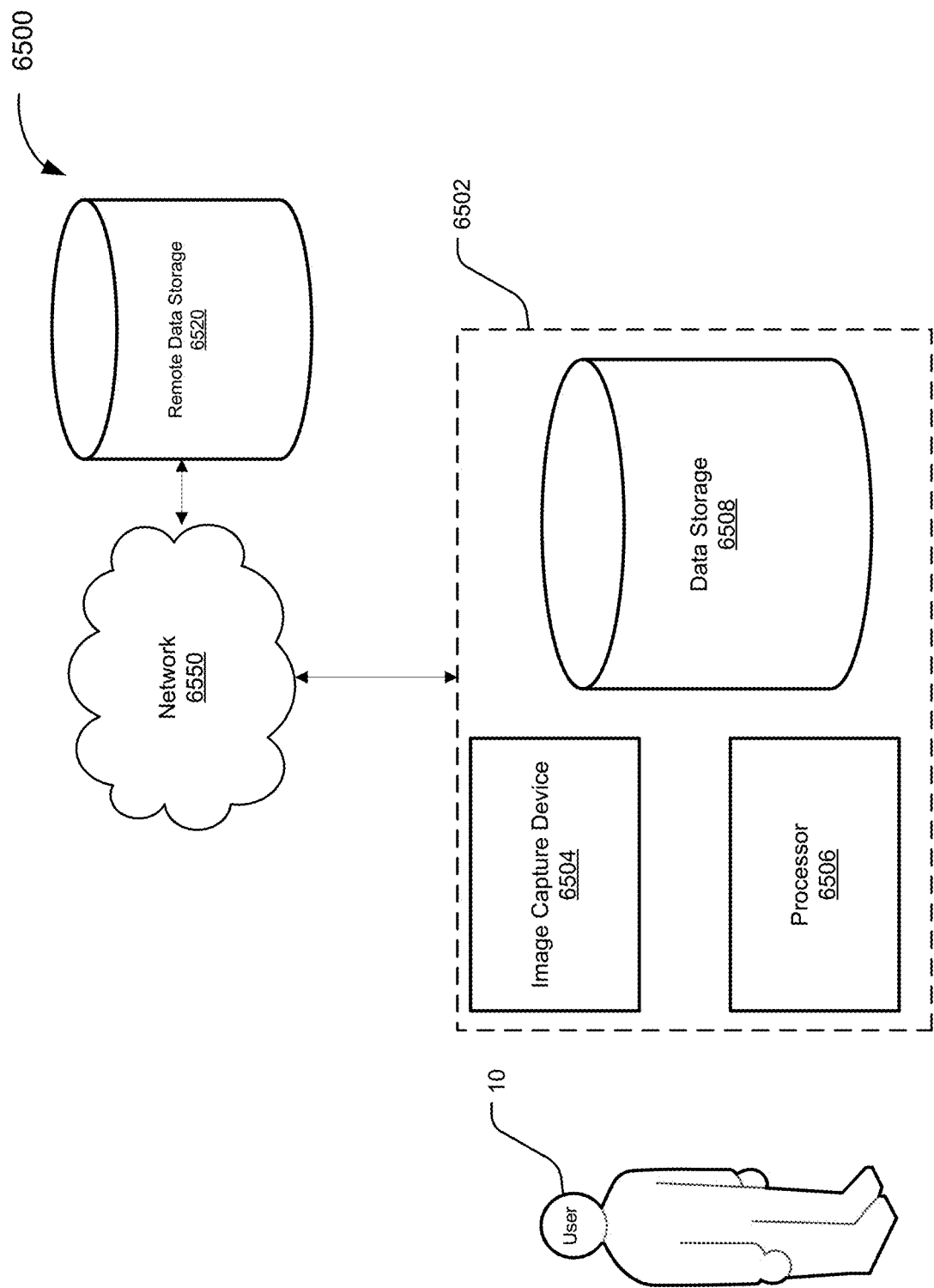
FIG. 65 illustrates the components of a security platform for implementing systems and methods in accordance with an aspect of the present invention.

In some embodiments, there is provided a method to authenticate a user 10 using a security platform 6502, depicted in FIG. 65, with an image capture device 6504, a processor 6506 and data storage 6508. The security platform 6502 may provide one or more an electronic prompts to the user 10 positioned in front of an image capture device 6504 (e.g. camera), the prompts may direct user 10 to satisfy a sequence of one or more random position requests based on pitch and yaw changes or movements to generate a series of face signatures. The method involves comparing the face signatures generated by processing of images of the user 10 captured by the image capture device 6504 at each requested position (that includes the pitch and yaw movement) to stored face signatures (e.g., in data storage 6508 or remote data storage 6520) also corresponding to the requested positions.

In some embodiments, the stored face signatures may be generated by images stored in a repository that is accessible to the security platform (e.g., in data storage 6508 or remote data storage 6520). The stored face signatures may each contain an array of values that may indicate one or more specific pitch and/or yaw values or changes thereof associated with one or more captured images of a user's 10 head. The change in pitch and yaw may be referred to as a specified movement of the user's 10 head. This may mitigate the ability of someone to present a video in order to mimic the request and act as an impostor. The security platform 6502 may be referred to generally as the system in some embodiments. The security platform 6502 may be implemented as part of a mobile device storing digital assets or a dedicated terminal at an access point to physical assets, for example.

In some embodiments, the system may request a movement of the head in a certain direction (up, down, left, right or combination thereof) to change the pitch and yaw. Indicators may be presented to the user on a display to guide the pitch and yaw movement. If the movement as detected by measured pitch and yaw changes does not match the requested movement based on previously stored vales corresponding to pitch and yaw changes then the system may reject the authentication session.

In some embodiments, the system may present an indicator on the screen of the display (of security platform) that is visible by the eyes, and the system tracks the eye movement to ensure that it follows the direction of the indicator. The system captures the movement of the individual eyes to determine whether the indicator is properly being followed and thus prove it is a real person in front of the camera.

In some embodiments, a user identifier is linked to the face signature in various positions during a registration process, and if during a subsequent authentication session the face signature from various corresponding positions matches the pre-registered face signature for the position within a specified threshold the user would pass this authentication test. Accordingly, images captured during authentication session can be used to generate face signatures for subsequent authentication sessions.

In some embodiments, during the initial registration, the systems and methods of the present invention may prompt the user to pose at one or more random locations on the screen as per instructions provided, recording the face in the various poses, and face recognition signatures generated corresponding to the different poses, during registration, prompting the user would to match one or more poses, wherein the face would be captured, face recognition signatures rendered, and those would be compared to the original poses to determine whether the person is a true match.

In some embodiments, the systems and methods of the present invention may request that the user register their face during an initial registration session, then asking the user to move their head to various poses during an authentication session.

In some embodiments, the systems and methods of the present invention may apply morphing techniques to re-orient the face to a frontal face from the profile or tilted pose, generating a face signature from that re-oriented face and comparing that to the original registered face signature(s).

In some embodiments, during registration process, systems and methods of the present invention may request that the user perform poses in at least two different face orientations in order to capture pitch and yaw movement and generate one or more face signatures from same.

In some embodiments, the systems and methods of the present invention may, for each pose, optionally capture more than one frame (and thus facial image) and determine, based on a quality threshold setting, whether to discard that frame and facial image. If more than one face is captured for a specific pose, the systems and methods of the present invention may optionally use statistical methods to discard outlier image based on, for example, average facial characteristics represented in facial images depicted in all frames.

In some embodiments, the systems and methods of the present invention may include, for each pose, storing the face signature (or a blended face signature based on multiple faces) locally or remotely.

In some embodiments, the systems and methods of the present invention may include, during an authentication session, asking the user to pose in one or more of the poses requested during the registration process.

In some embodiments, the systems and methods of the present invention may include, for each pose, capturing one or more images of the user's face from the image capture device and generating a face signature.

In some embodiments, the systems and methods of the present invention may include comparing one or more face signature generated using images captured during the authentication session to the to one or more face signatures generated during the registration session using a difference formula. If the difference, according to the difference formula, is less than a specified threshold (variable parameter) then the comparison step may be successfully completed. If the user passes all such steps then the authentication session may be successful.

In some embodiments, the systems and methods of the present invention may include validating one or more pitch/yaw values associated with captured images of the user performing one or more poses during the authentication session to ensure that the user is not randomly moving their face around in a video or presenting a 2D image.

In some embodiments, the systems and methods of the present invention may include, during authentication steps, rejecting any session where a captured face does not match the requested pose.

In some embodiments, the systems and methods of the present invention may include comparing face images captured in consecutive frames of the input camera. If the captured face images change in a fashion suggesting two or more different faces have been presented during an authentication session, rejecting the authentication session.

Further elements applied to mitigate spoofing may include, for example, detecting a common background color, pattern, or image (e.g. in a controlled environment such as a security gate), and/or detecting the reflection of a color flashing on a screen off of elements of the presented face (e.g. cheeks or glasses). Such a process may include detecting a pulse by noting slight changes in skin color or texture from the camera input.

In some embodiments, the systems and methods of the present invention may identify static and/or video images to mitigate spoofing. In order to protect against spoofing by the use of static images it may be essential to use the geometry of the face to determine whether a face presented to a camera exhibits characteristics of a three-dimensional person rather than a two-dimensional image or video. In order to protect against spoofing by the use of video images it may be essential to present the user to be authenticated with one or more challenges (e.g. a random selection from a series of requests that would be very difficult to pre-record in a video image).

Further methods of identifying spoofing attempts may include detection of pixilation of the image when zoomed in with digital methods. Pixilation is an artifact associated with manipulation of digital images; its detection may cause the systems and methods of the present invention to reject authentication sessions.

Another method of identifying spoofing attempts may include identifying various patterns in the image through techniques such as Fourier analysis. This could potentially identify whether a digital screen was placed in front of the camera as opposed to a real person.

While mitigating spoofing, the systems and methods of the present invention may also need to authenticate a face or set of faces presented to a camera (and captured as digital image data) as matching a previously registered "known" face or set of faces (e.g. face signature). Since multiple techniques may be used to determine that the face presented to the camera is not a spoofing attempt, it may also be necessary for the system to authenticate the face against a "known" face (such as the stored face signatures).

Figure 54:
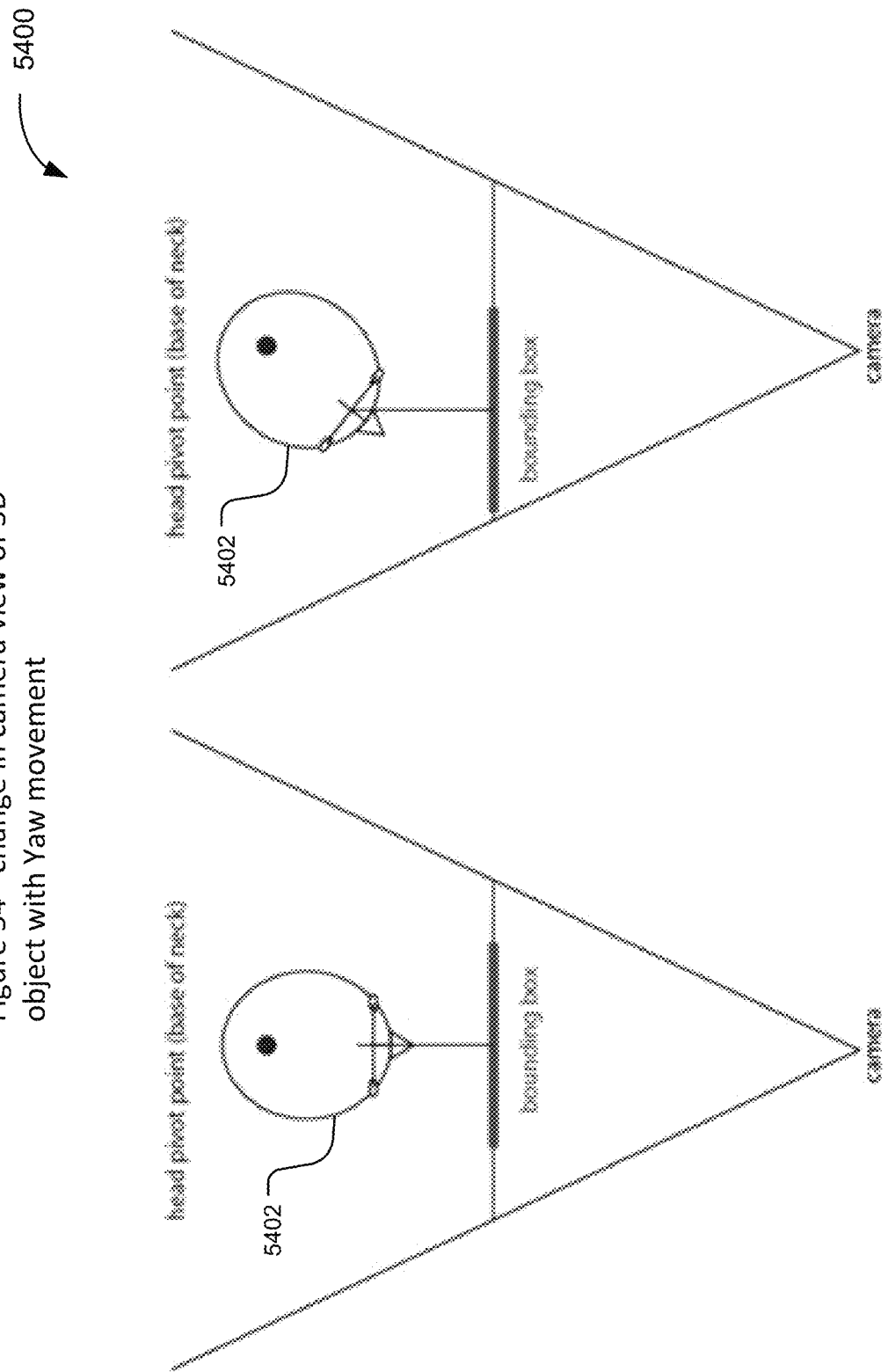
FIG. 54 illustrates changes in a camera's view of a 3D object as that object exhibits yaw rotation in accordance with an aspect of the present invention.
Figure 55:
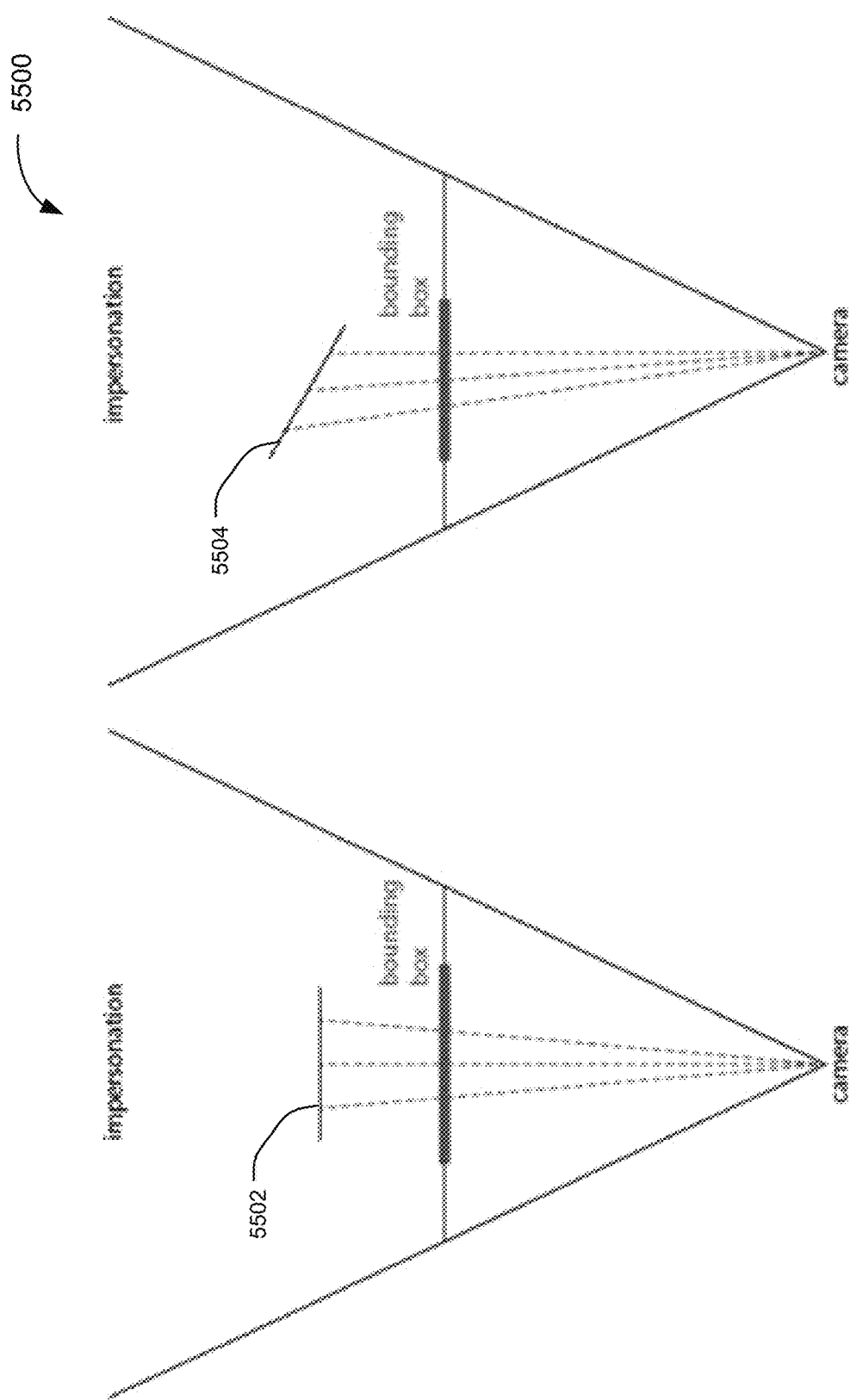
FIG. 55 illustrates changes in a camera's view of a 2D object as that object exhibits yaw rotation in accordance with an aspect of the present invention.

In some embodiments, the movement used to capture a series of images used for calculating the face signature is based on a yaw movement and a pitch movement. FIG. 54 shows a change in camera view of a 3D object 5402 undergoing yaw movement. FIG. 55 shows a 2D image 5502 as it undergoes yaw movement. The series of images captured by a camera sensor during the movement of a 3D object 5402 such as a 3D face exhibiting yaw movement may generate a different face signature than the series of images captured by a camera sensor during the movement of a 2D 5502 image exhibiting yaw movement. The different face signatures may be useful for flagging spoofing activity (e.g. an individual presenting a 2D photograph of a face rather than an actual 3D face).

Figure 56:
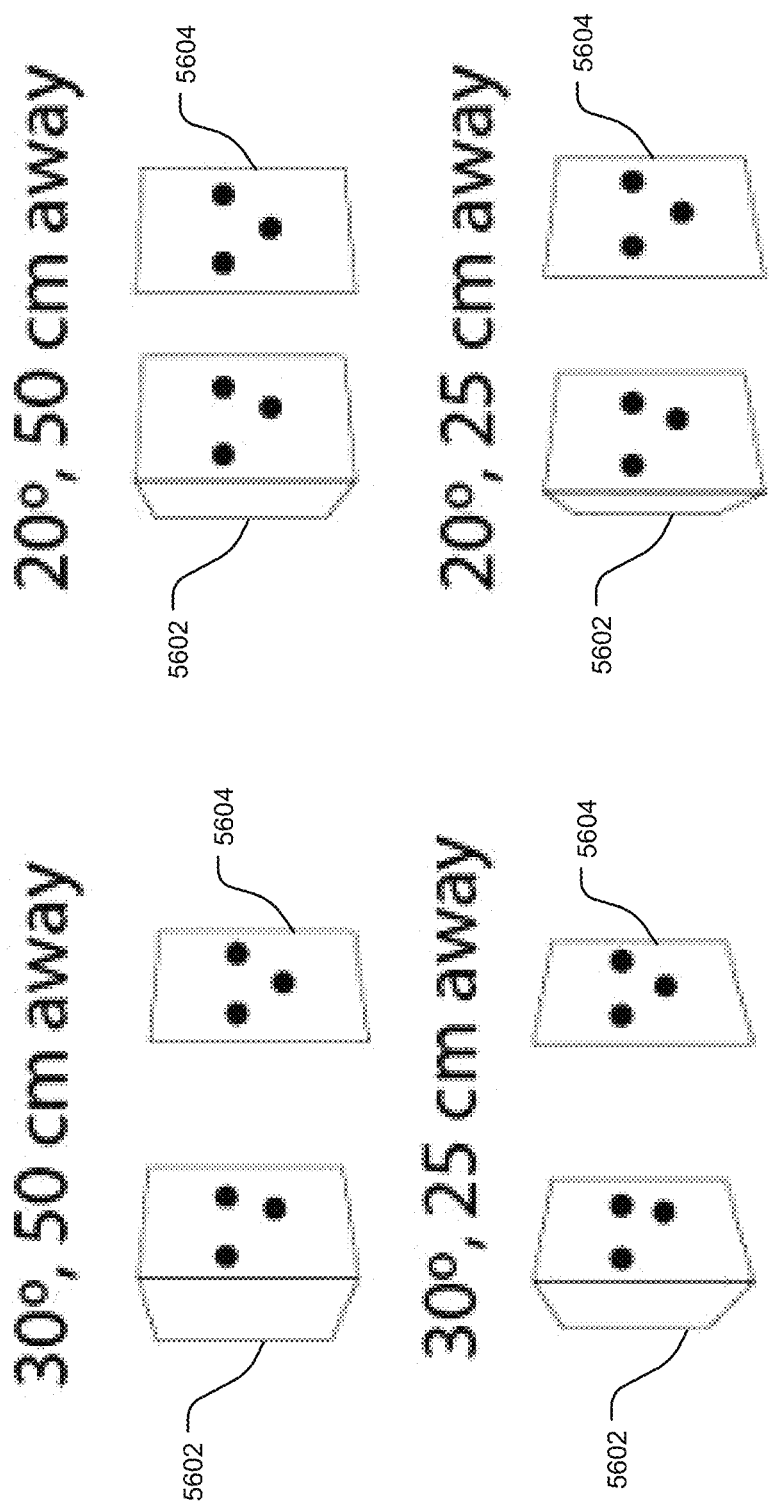
FIG. 56 illustrates changes in a camera's view of 2D and 3D objects at various distances and viewing angles in accordance with an aspect of the present invention.

FIG. 56 illustrates a camera perspective view of a 2D object 5604 and a 3D object 5602 from vantage points of varying angles and distances.

Figure 57:
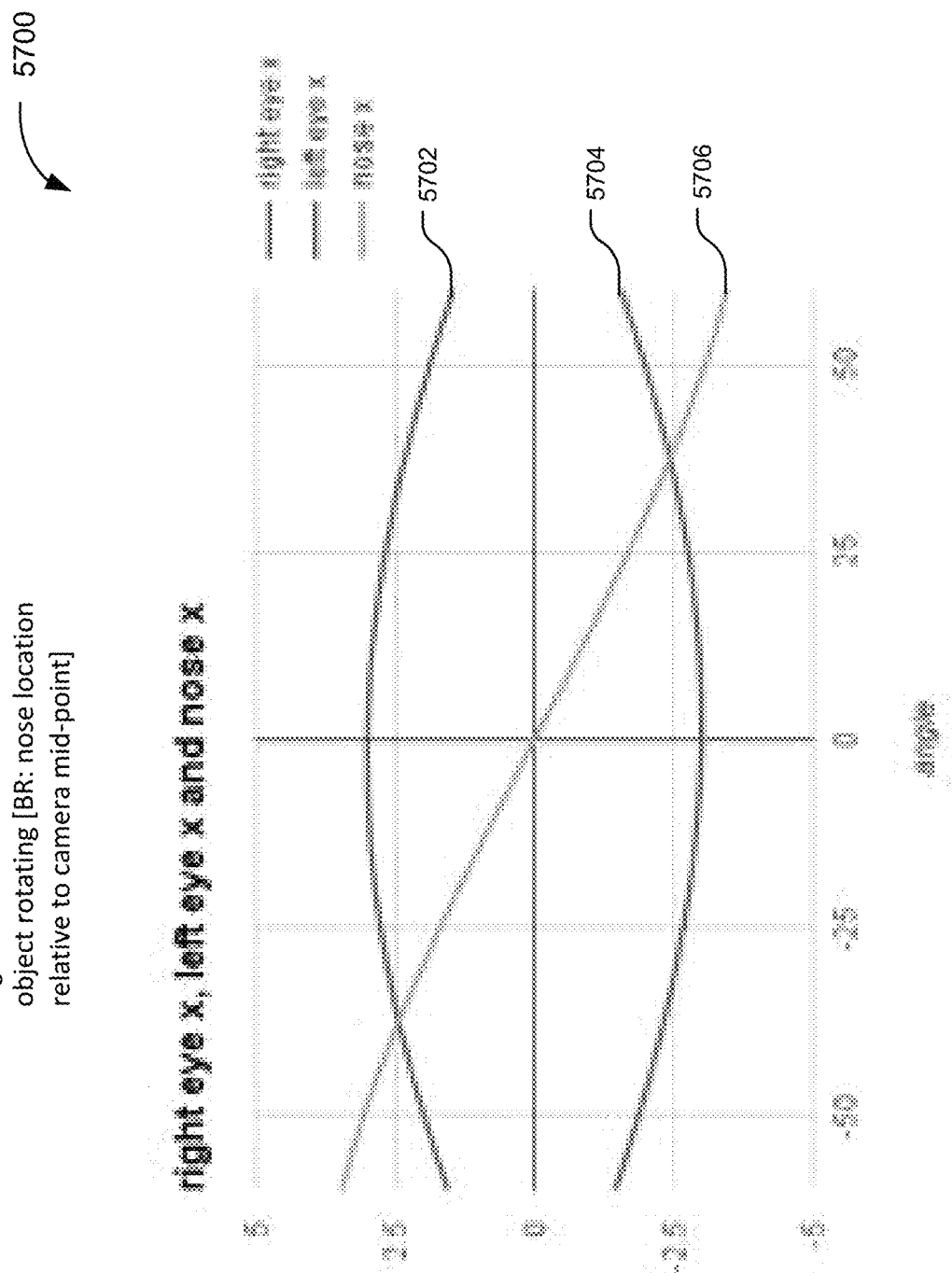
FIG. 57 is a graph depicting changes in x-axis location of features of a 3D object at various degrees of yaw rotation in accordance with an aspect of the present invention.
Figure 58:
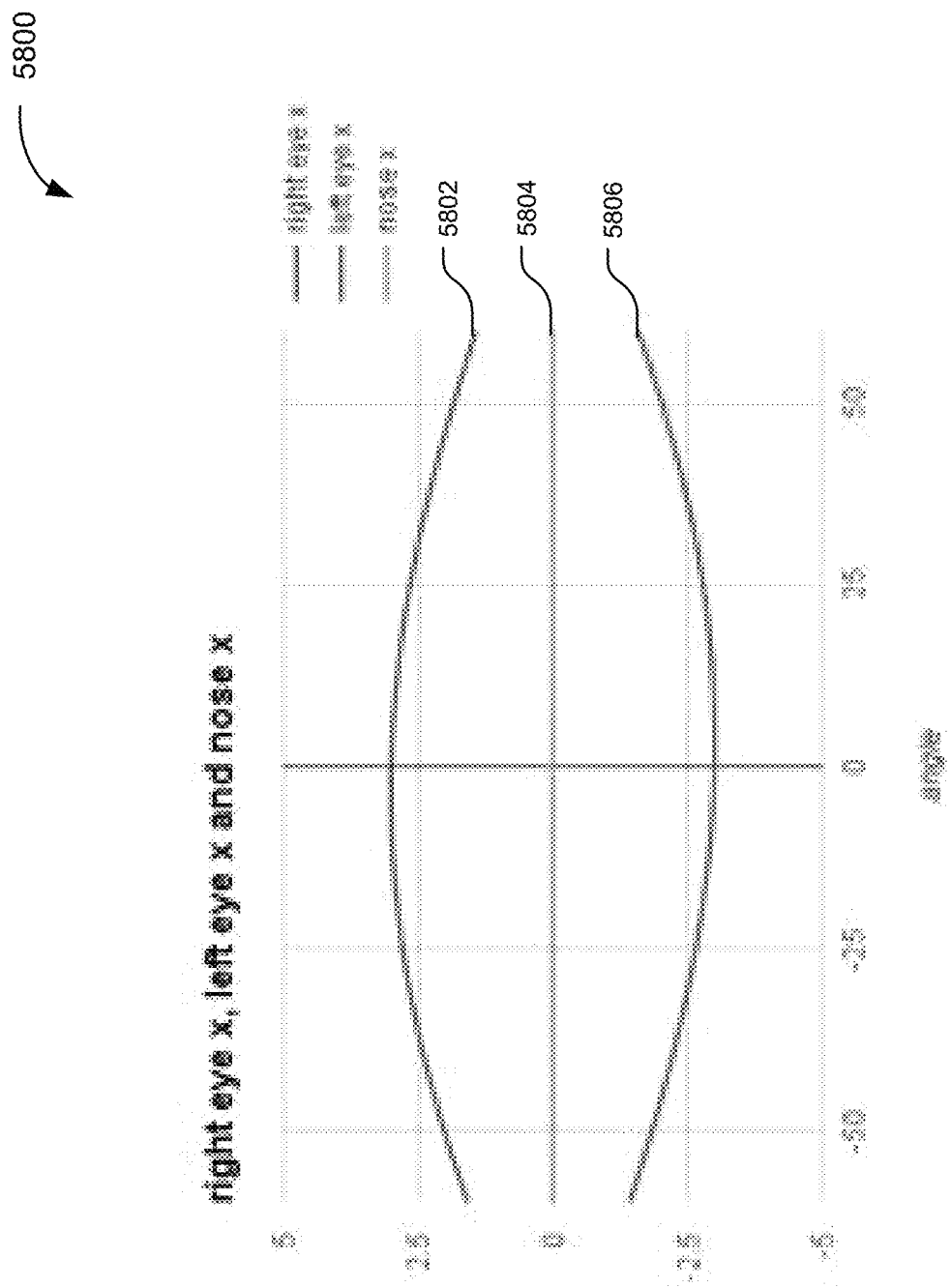
FIG. 58 is a graph depicting changes in x-axis location of features of a 2D object at various degrees of yaw rotation in accordance with an aspect of the present invention.
Figure 59:
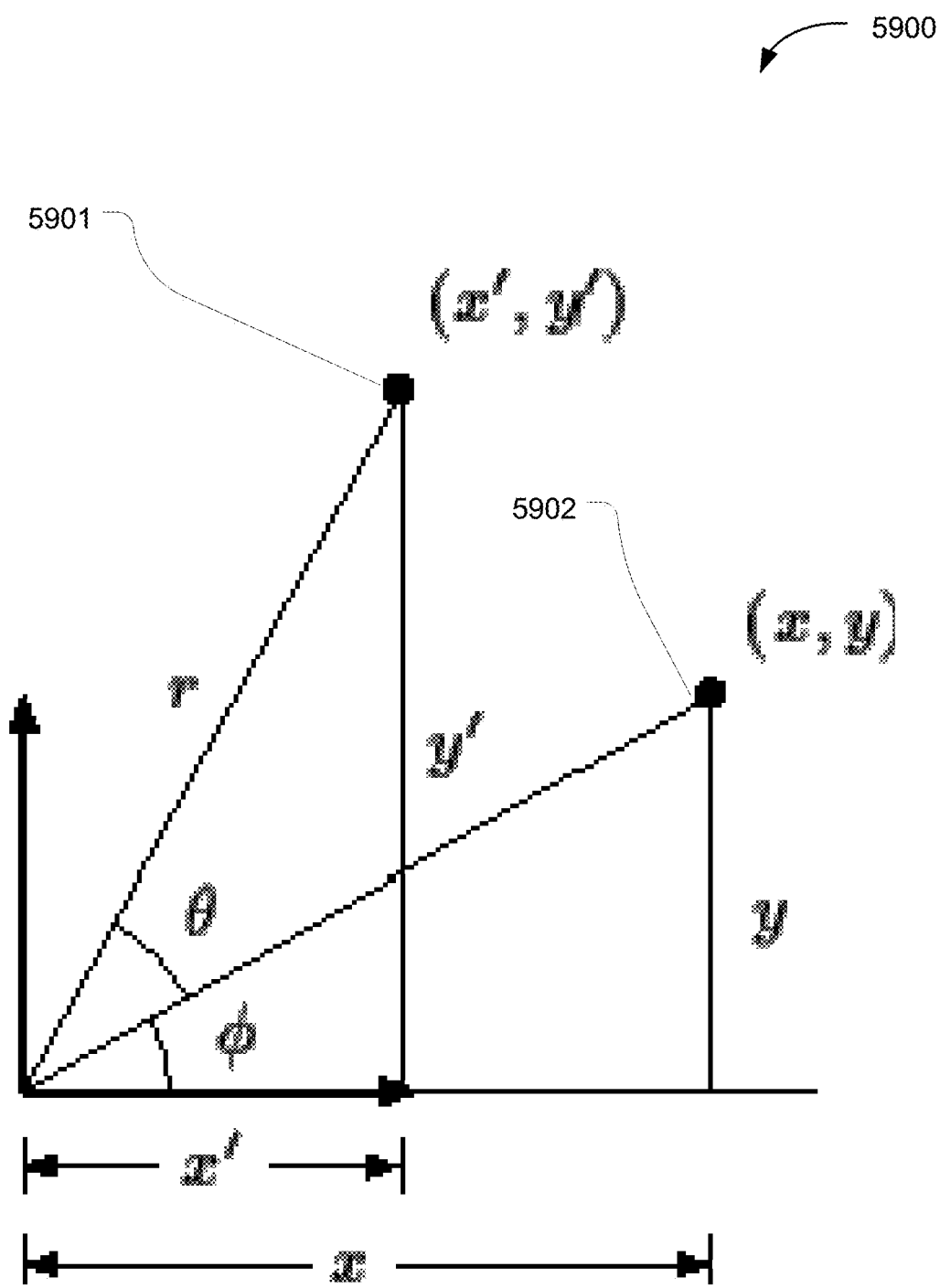
FIG. 59 illustrates calculation of the transformation between two points on a 2D plane in accordance with an aspect of the present invention.

FIG. 57 depicts the variation of values (as observed from a camera at fixed distance and angle) corresponding to the x coordinates (on a Cartesian plane) of points on a left eye 5702, a right eye 5704 and the tip of a nose 5706 as a subject's head (a 3D object) undergoes yaw rotation around a vertical axis FIG. 58 depicts the variation of values (as observed from a camera at fixed distance and angle) corresponding to the x coordinates (on a Cartesian plane) of points on a left eye 5802, a right eye 5804, and the tip of a nose 5806 as a photograph of a subject's head (a 2D object) undergoes yaw rotation around a vertical axis FIG. 59 shows a calculation of transformation between two points (5901, 5902) in a 2D plane.

Figure 60:
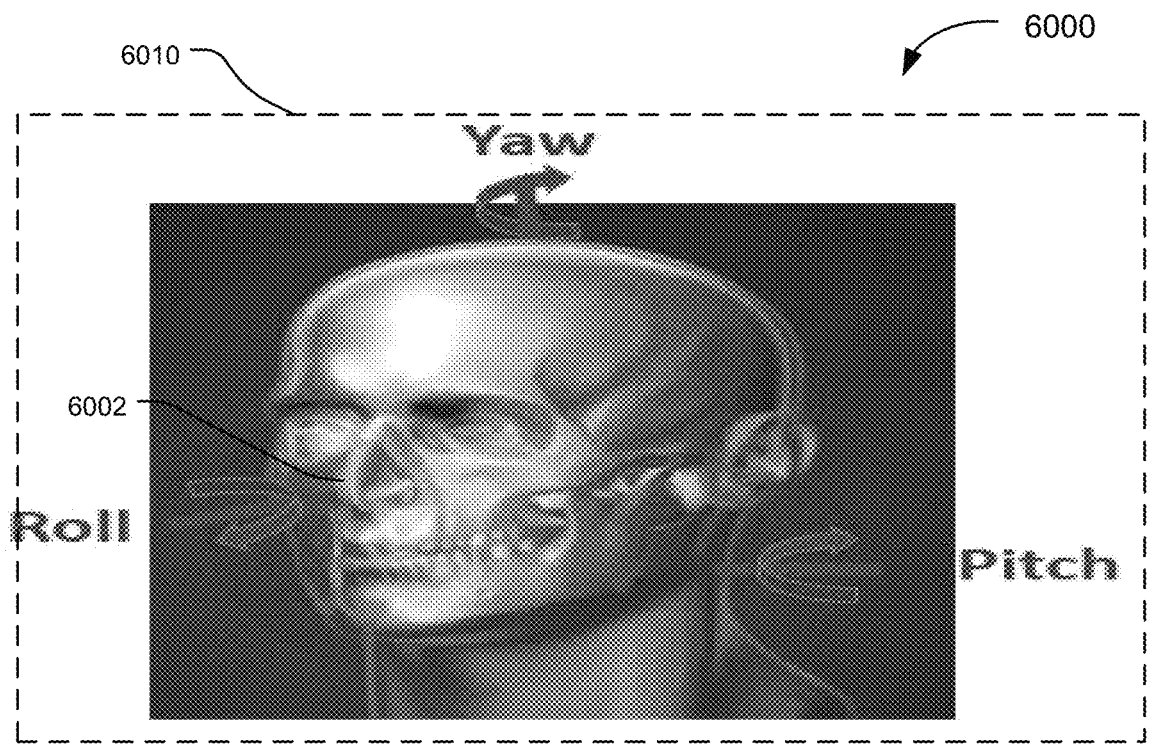
FIG. 60 illustrates the points of yaw, pitch, and roll rotation for a human head
Figure 60:
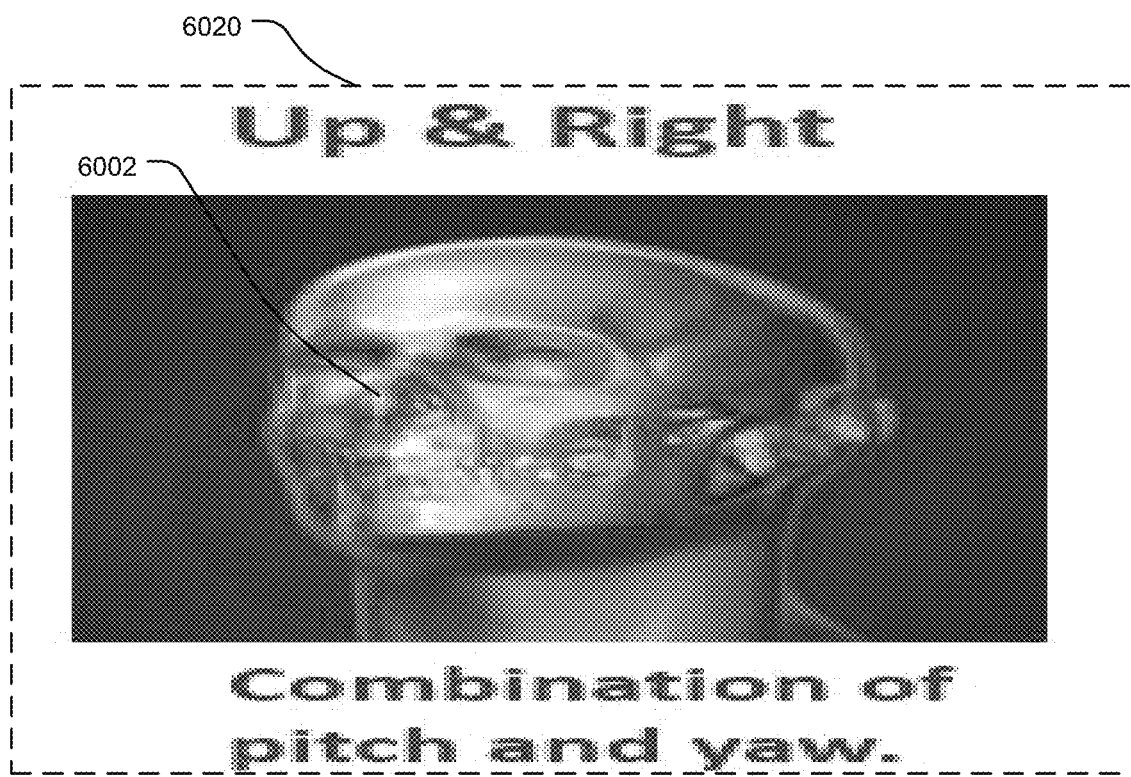

FIG. 60 shows 3D transformations in space for the nose coordinate 6002 (an example landmark). The movement of the nose may involve a yaw and pitch movement for example. Tracking values corresponding to the location of the nose coordinate 6002 during observed movement of the nose may be used to calculate a face signature for authentication. The system may implement the following calculation:

projected $x = d/(d+x*\sin(a))*x*\cos(a)$ projected x of nose $= d/(d+n*\cos(a))*n*\sin(a)$ where d is the distance from camera, x is the distance between eye and nose, a is the yaw, n is the 'depth' of nose.

The first image 6010 in FIG. 60 depicts a view of a user's head from the perspective of an observer directly in front as the user's head undergoes yaw rotation. Yaw rotation may refer to an object's rotation around a vertical axis through said object's centre. For example, the fixed point of rotation for yaw movement of a human skill is the spinal cord. Values corresponding to a fixed point on the nose of a 3-dimensional user (e.g. nose coordinate 6002) while undergoing solely yaw rotation may shift only in their X (horizontal position) values.

The second image 6020 in FIG. 60 depicts a view of a user's head from the perspective of a user directly in front as the user's head undergoes both yaw rotation and pitch rotation. Pitch rotation may refer to an object's rotation around a horizontal axis extending through said object's centre along an X (horizontal) plane. An illustrative example of the pitch axis is a horizontal line extending into the ear of a head and out of the opposite ear. Values corresponding to a fixed point on the nose of a 3-dimensional user (e.g. nose coordinate 6002) while undergoing solely pitch rotation (e.g. a head nodding "yes") may shift only in their Y (vertical position) values. As the second image 6020 in FIG. 60 depicts a user's head undergoing both pitch and yaw rotation movement, tracking a fixed point on the nose of a 3-dimensional user (e.g., nose coordinate 6002) may yield shifts in both X (horizontal position) and Y (vertical position) values.

In order to authenticate a face presented to a camera or mitigate spoofing attempts, embodiments described herein may detect and track various facial landmarks (e.g. nose, mouth, and/or eye position) during movement of the user. Tracking facial landmarks may allow the system to determine the pitch, yaw and roll of the face using the facial landmarks. In some embodiments, the system may determine roll movement values by measuring a horizontal plane through the eyes. By analyzing the pitch and yaw angle of the face, the embodiments described herein may detect whether the movement of facial landmarks is consistent with a two dimensional spoofing image (as depicted in FIG. 55) or a three-dimensional face (as depicted in FIG. 54) represented as one or more stored face signatures.

A video reproduction of the movement of a face may mimic the movement of the facial landmarks of a real face. Therefore, a spoofing attempt using a video image might successfully spoof a system that tracked movement of facial landmarks as a face moved though a predictable pattern (e.g. turn head to the left). However, by requesting that a user perform a set of random requests or challenges for movements in various directions and levels of movement, embodiments described herein may mitigate the effectiveness of a pre-recorded spoofing video image. Prompting the user for different combinations of movements (e.g. different yaw and pitch movements) may make it more difficult to spoof the system. The system can, according to some embodiments, determine a combination of movements in real-time and present a request to the user directing them to perform said combination of movements.

Further, while mitigating the possibility of spoofing, embodiments described herein may also verify that the person in the camera is who they claim to be by authenticating the face presented to the camera against a previously registered face (e.g. face signature). This verification process may also apply to a group of known individuals rather than just one. Thus, embodiments described herein may, while performing verification, also perform identification of the person from the set of known people.

Figure 61:
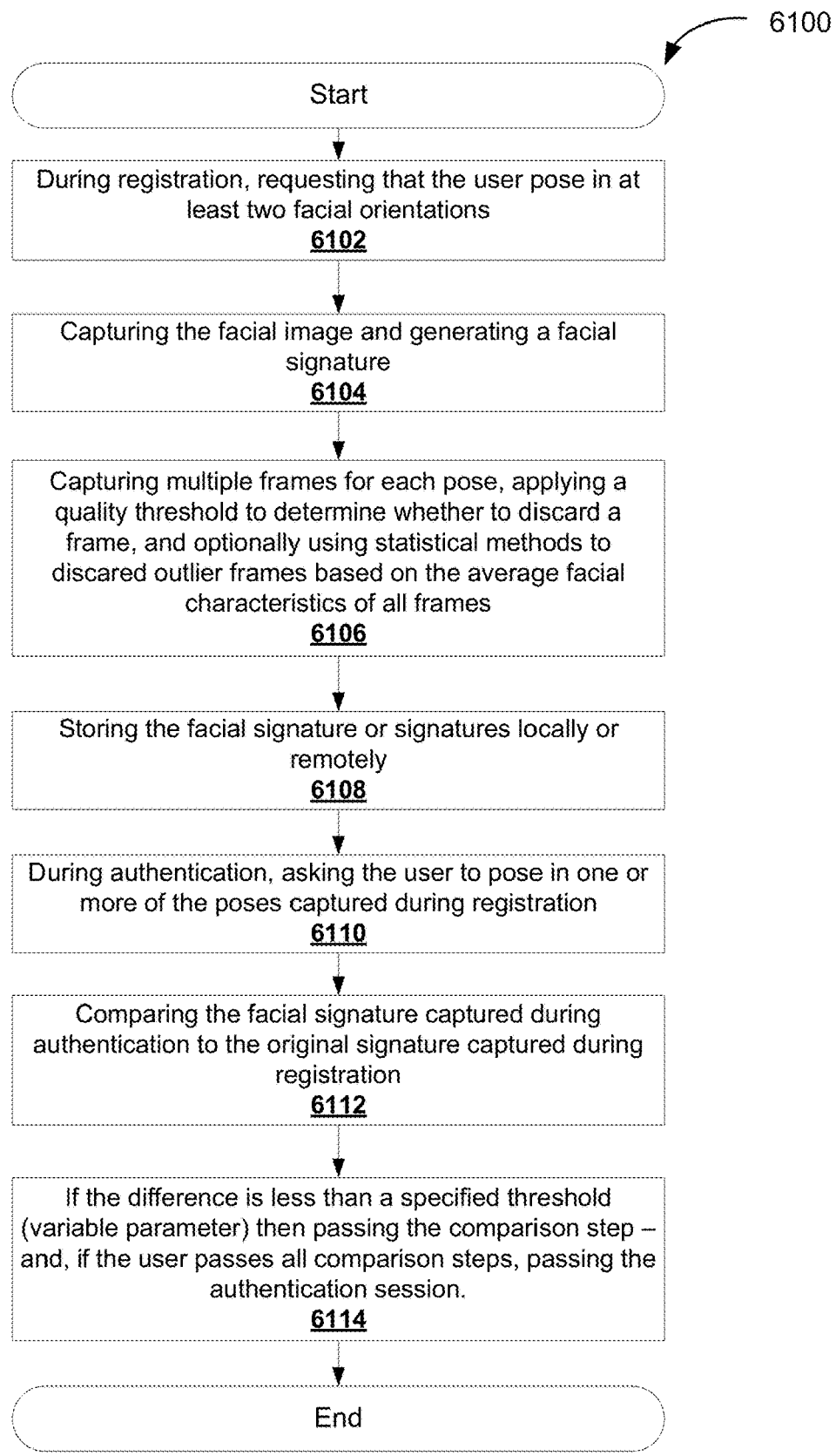
FIG. 61 is a flow chart showing an example method of registering and authenticating a user in accordance with an aspect of the present invention.

A method of performing facial authentication is depicted in FIG. 61. The method may involve at 6102, during registration, communicating an electronic request (e.g. presented on a user interface or over a speaker) that the user pose in at least two facial orientations (e.g. turn head based on pitch and yaw movement). At 6104, the method may involve capturing the facial image and generating a facial signature. At 6106, the method may involve capturing multiple frames for each pose, applying a quality threshold to determine whether to discard a frame, and optionally using statistical methods to discard outlier frames based on the average facial characteristics of all frames. At 6108, the method may involve storing the facial signature or signatures locally or remotely. The method may further involve, at 6110, during authentication asking the user to pose in one or more of the poses captured during registration. At 6112, the method may involve comparing the facial signature captured during authentication to the original face signature captured during registration. At 6114, the method may involve determining if the difference is less than a specified threshold (variable parameter) and if so, then passing the comparison step—and, if the user passes all comparison steps, passing the authentication session. The method may optionally, validate the pitch/yaw of the pose during the authentication session to ensure that the user is not presenting a video of a face undergoing pre-recorded movements or presenting a 2-dimensional image of a face.

Optionally, during authentication steps, the method may block any session where a captured face does not match the requested pose. For example, if the user is asked to pose face up/left and the face signature captured matches the registered signature for that user in the up/right or down/right pose, the session may be rejected as a possible spoofing attempts involving, for example, a pre-recorded video. Further, if the measured pitch and yaw values of the presented face do not match the values corresponding to the requested pose, then the authentication session may be rejected.

Figure 64:
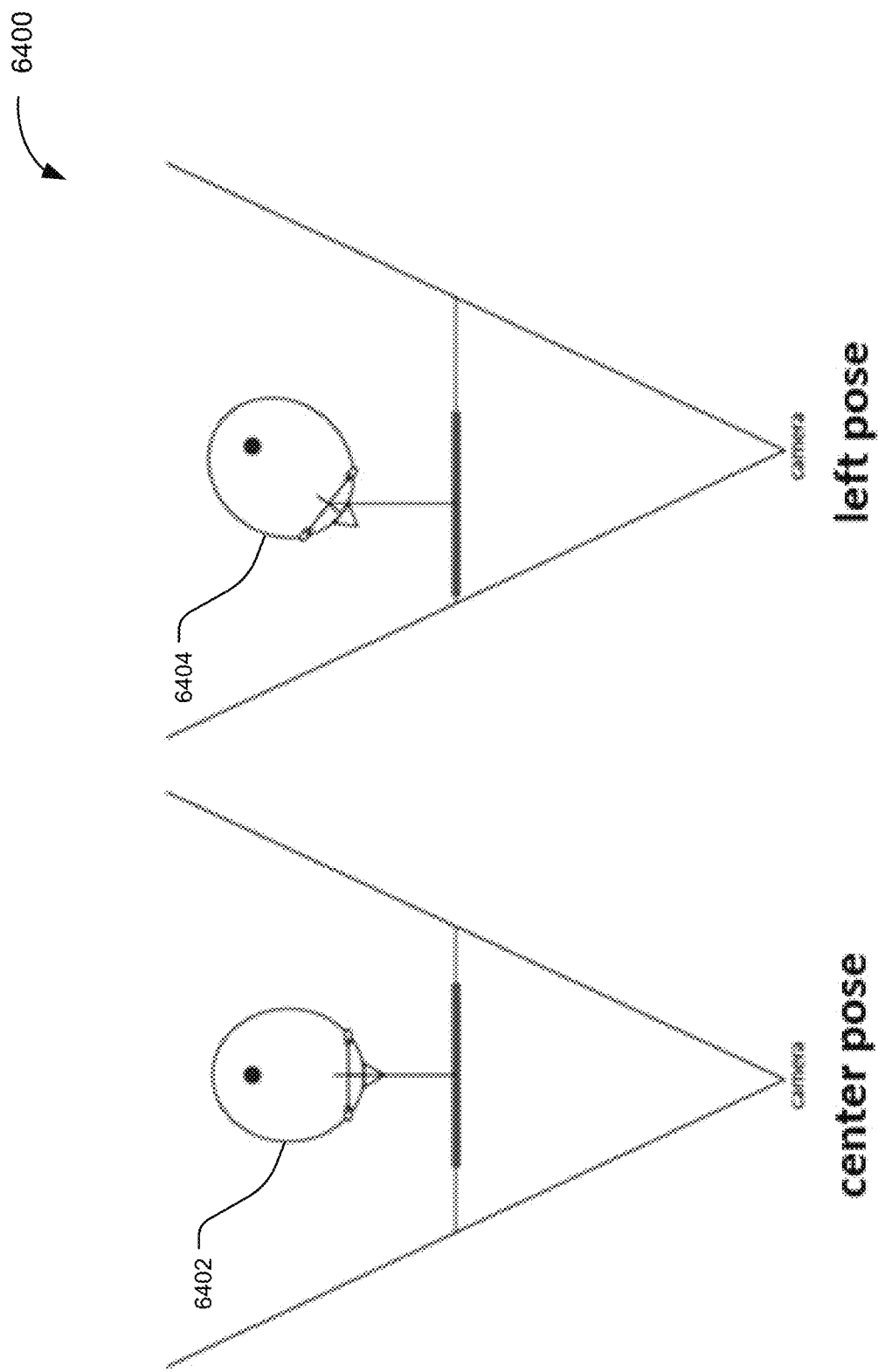
FIG. 64 illustrates changes in face signature values as a user's head exhibits yaw rotation in accordance with an aspect of the present invention.

As shown in FIG. 64, the face signature generated from a center pose and a left pose will not match. Further, the face signature generated from a two dimensional image in a left pose and a real face in a left pose are different enough that the present invention may differentiate between the two.

Another example method of performing facial authentication and spoofing detection according to an embodiment, may involve asking the user in front of a camera to move their face during an authentication session such that they have to turn their head to achieve the result. The embodiments described herein deny spoofing attempts wherein a user presents a two-dimensional image by: a) presenting the user with a screen showing the output of an image capture device recording the presented face image; b) asking the user to come to a resting place in front of the camera where their eyes are on a horizontal plane displayed on a display; c) measuring key landmarks on the face (eye, nose, mouth, etc.) and the overall bounding box for the face and recording those values; d) asking the user to turn their head to match a position depicted on the screen (the position could be depicted by an icon or other indicator on the screen); e) measuring the key landmarks throughout the process. The system may use this data to determine if the image is a two-dimensional impostor by: i) first ensuring that the user has moved to the requested location by comparing the landmark values and if they do not match within a threshold then rejecting the session; ii) second, comparing newly recorded values to one or more of the previously captured values to determine whether the face has undergone movement consistent with a two-dimensional and not a three-dimensional object, and if so rejecting the session; f) when collecting key landmark data, the method may use a statistical method to discard outlier images from the face samples. Further details are provided herein regarding outliers.

Embodiments described herein may also include requesting a movement of the head in a certain direction (up, down, left, right or combination thereof). If the movement does not match the request, then rejecting the session. The direction of the movement may be determined using PCA, LDA, or other holistic methods including deep learning to assess the "gaze" or "facial orientation".

Embodiments described herein may also include requesting that a user follow a dot or other indicator on the screen with their eyes, and tracking the eye movement to ensure that it follows the direction of the indicator. Otherwise the system may reject the session.

If the face does not match the pre-registered face, or a face does not pass the anti-spoofing tests, methods provided by embodiments of the present invention may involve saving the images of the user's face. These images may be used to produce an audit trail, which may serve as a deterrent to people trying to spoof the system. The images forming this audit trail, along with metadata relating to the authentication session may be stored locally, or they may be stored remotely on an enterprise, cloud-based, or other remote data store. The system may also store face signatures generated during failed authentication sessions, which may be include people trying to spoof the system.

Some embodiments of the present invention may involve capturing an entire authentication session in a sequence of still images, or on video and storing such images or video locally or remotely as part of an audit trail. This could be done for any authentication session, whether successful or not. The audit trail may be encrypted for security purposes. For example, the security platform may determine that the user in front of the image capture device is actually a human performing the requested movements and may still capture images for the audit trail. This may conserve resources.

For improved user experience, embodiments of the present invention may capture all authenticated images of a user's face and may automatically append those images to a set of registered images of that user. This may improve the accuracy of authentication methods disclosed by the present invention while operating under different conditions (e.g. varying lighting conditions, make-up applications, types and styles of eye-wear, etc.) as the accuracy of the systems and methods disclosed herein may improve with more known face images.

According to some embodiments of the present invention, each new authenticated face image may be added to a rolling buffer of face images of known users (for example, a buffer may include 100 face images), while older face images may be removed from the buffer. This may maintain the operating accuracy of the systems and methods disclosed herein by accounting for changes in the user's appearance over time.

According to some embodiments of the present invention, images of the faces of users who successfully login using traditional login methods (e.g. by entering a user name and password) may be captured. Once the quantity and quality of images captured in this fashion reaches a minimum threshold, systems and methods of the present invention may automatically activate facial authentication features as described herein. This approach may obviate the need for a user to complete a separate face image registration and calibration step.

According to some embodiments of the present invention, the systems and methods described herein may include storing images of the user's face captured during one or more previous successful and/or unsuccessful authentication attempts. This may allow the user to confirm whether previous authentication attempts were, in fact, legitimate.

According to some embodiments of the present invention, the user may be asked to register their face during an initial registration session. This initial registration session may involve capturing images of the user moving their head in order to perform various poses. Using morphing techniques, the present invention may then re-orient the captured image of the user's face to a frontal face-view from a profile or tilted face-view, generate one or more face signatures from the re-oriented face-views and compare those face signature(s) to the original registered face signature(s). Note that a re-orientation of a two-dimensional photo through morphing techniques would not produce equal face signatures as re-orientation of a three-dimensional face through morphing techniques.

Figure 62:
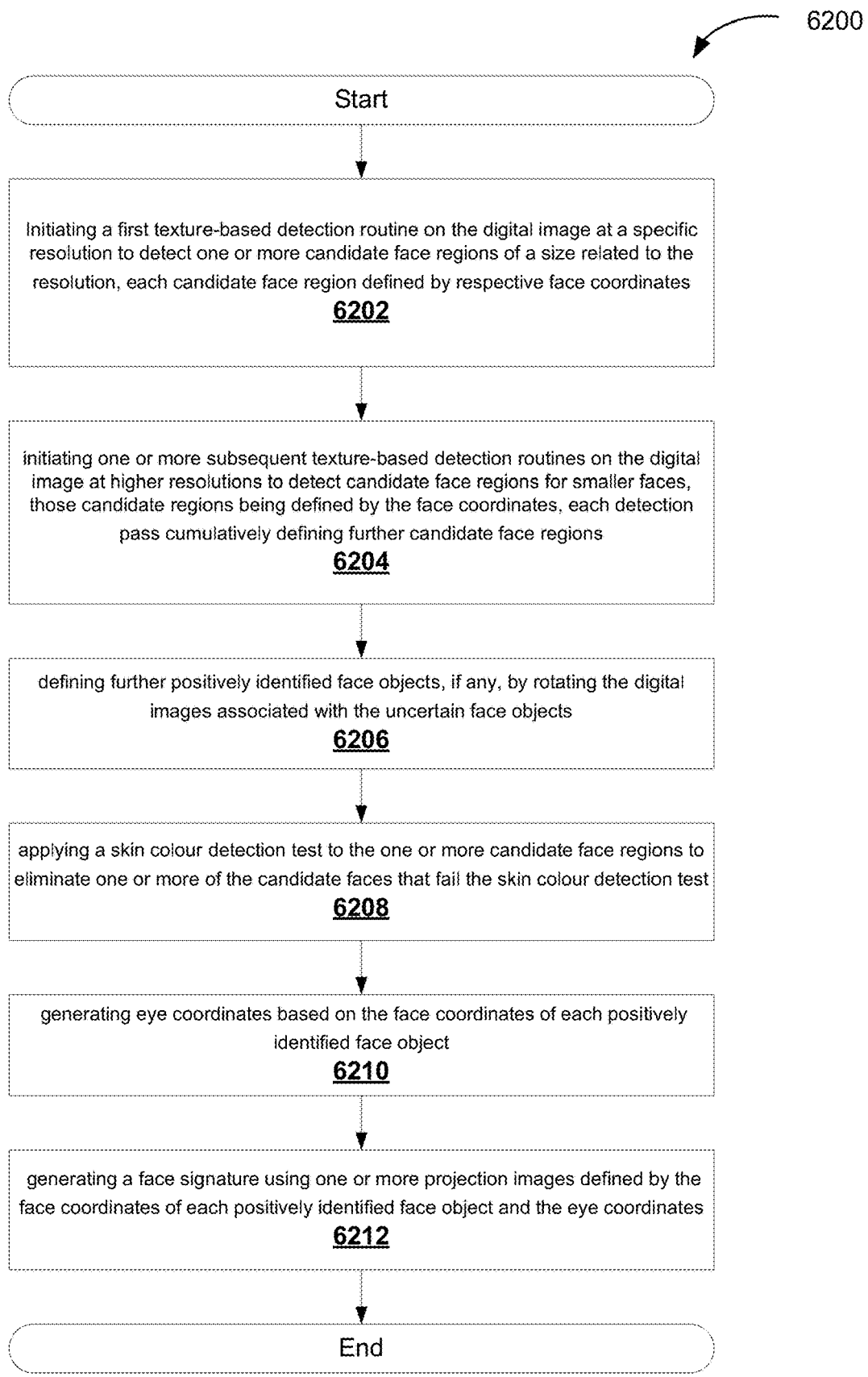
FIG. 62 is a flow chart showing an example method of recognizing one or more faces in a digital image in accordance with an aspect of the present invention.

Referring now to FIG. 62, there is shown a method of recognizing one or more faces in a digital image, according to an embodiment. The method may involve generating one or more face coordinates corresponding to one or more candidate regions for one or more candidate faces, the face coordinate generation process comprising. At 6202, the method may involve initiating a first texture-based detection routine on the digital image at a specific resolution to detect one or more candidate face regions of a size related to the resolution, each candidate face region defined by respective face coordinates. At 6204, the method may involve initiating one or more subsequent texture-based detection routines on the digital image at higher resolutions to detect candidate face regions for smaller faces, those candidate regions being defined by the face coordinates; each detection pass cumulatively defining further candidate face regions. At 6206, the method may involve defining further positively identified face objects, if any, by rotating the digital images associated with the uncertain face objects. At 6208, the method may involve applying a skin colour detection test to the one or more candidate face regions to eliminate one or more of the candidate faces that fail the skin colour detection test. At 6210, the method may involve generating eye coordinates based on the face coordinates of each positively identified face object. At 6212, the method may involve generating a face signature using one or more projection images defined by the face coordinates of each positively identified face object and the eye coordinates. The method may involve prompting the user to move their face according to one or more movements (e.g. pitch and yaw movements) and repeating the steps for the different movements to generate a face signature for the movements. The face signature may be stored and used for subsequent authentications, or the face signature may be generated and compared to previously stored face signatures as part of an authentication session.

Figure 63:
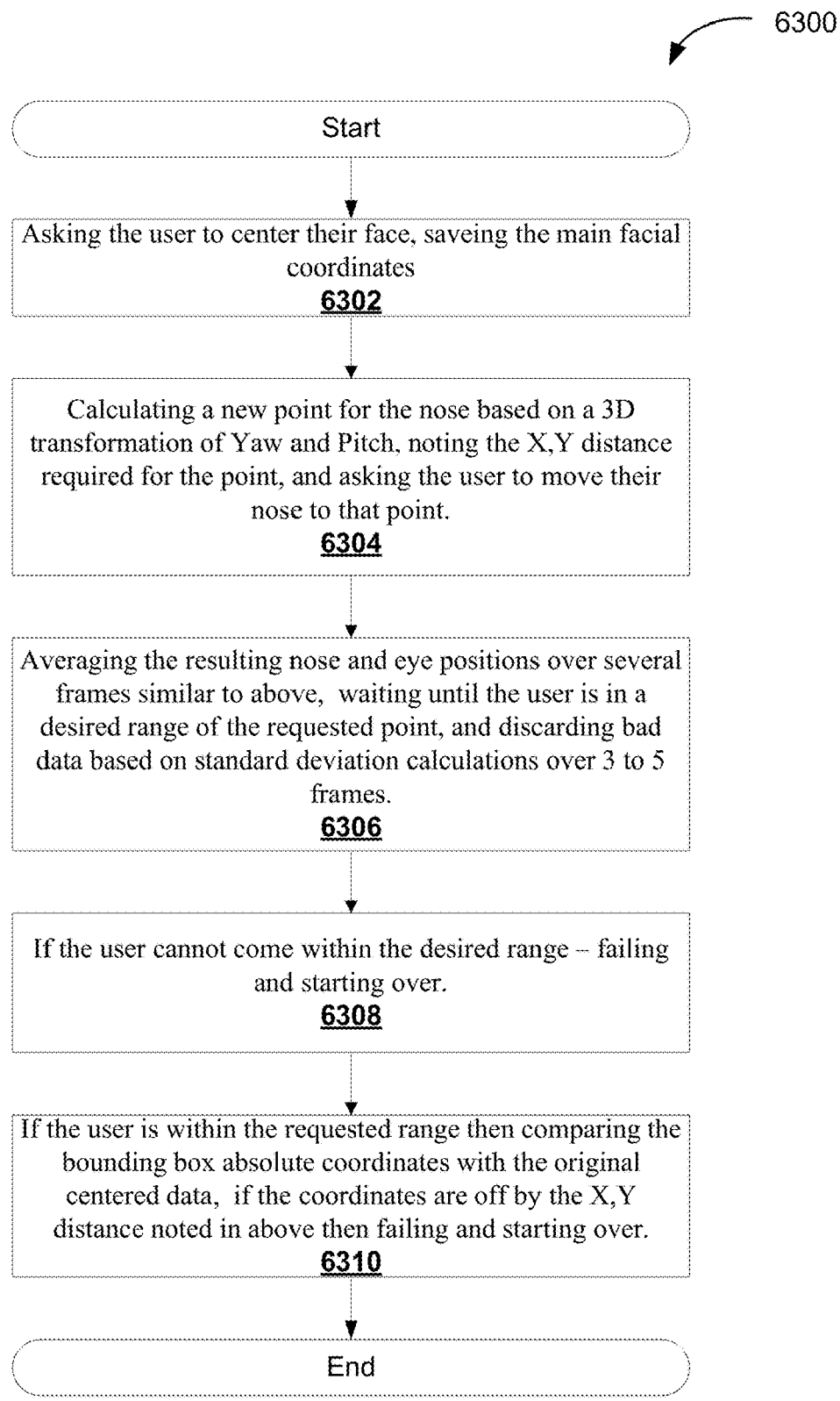
FIG. 63 is a flow chart showing another example method of recognizing one or more faces in a digital image in accordance with an aspect of the present invention.

Referring now to FIG. 63, there is shown a method of authenticating a user by facial characteristics which may involve at 6302, asking the user to center their face and save the main facial coordinates in data storage in a record linked to the user. At 6304, the method may involve calculating a new point for the nose based on a 3D transformation of Yaw (and Pitch optionally) and asking the user to move their nose to that point. At 6306, the method may involve averaging the resulting nose and eye positions over several frames similar to above, waiting until the user is in a desired range of the requested point; discarding bad data based on standard deviation over 3 to 5 frames. At 6308, the method may determine if the user cannot come within the desired range and if so, failing and start over. At 6310, if the user is within the requested range, comparing the bounding box absolute coordinates with the original centered data; if the coordinates are off by the X,Y distance noted above then failing and start over. This technique may only require one centering request for the user. Embodiments described herein may also check the angle of orientation of the nose as a secondary factor; or the area in the triangle between eyes and nose.

Embodiments described herein may implement statistical processes for discarding outliers from the generate data set. The face landmark data from which we estimate face geometry is somewhat noisy and imprecise. As such, pitch and yaw estimates of the facial landmarks (e.g. head) as well as vertical and horizontal locations of landmarks (e.g. nose, mouth, eyes) may have inherent variability and limited accuracy, given a single image frame. In order to improve accuracy and get a more stable reading, embodiments described herein employ averaging techniques over a collection of image frames taken from the camera feed. The averaging techniques may involve calculating mean, weighted mean, and/or median of the sample points. As some points suffer from distortion, it may be advantageous to reject them from the final average. Embodiments described herein may employ outlier detection techniques that employ statistical processes, either treating each dimension independently using standard deviation, or utilizing correlation of all dimensions using Mahalanobis distance, for example.

If all dimensions of interest, such as pitch and yaw, for a collection of sample points are treated independently, then the following method outlines rejection of outliers that may be implemented by embodiments described herein. First, an arithmetic mean and standard deviation may be calculated for each dimension independently over all sample points. Embodiments described herein may use the uncorrected sample standard deviation calculation. Treating each dimension separately, Embodiments described herein may then reject all points from the sample set that lie above or below the mean in terms of a fraction of the corresponding standard deviation. The fraction is a parameter determined experimentally, and corresponds to rejecting a percentage of points based on Gaussian statistics. The set of all points rejected is the union of points rejected based on each dimension independently.

To account for dimensional correlation, where all dimensions, such as pitch and yaw, are analyzed in relation to one another, embodiments described herein may reject outliers based on Mahalanobis distance ($D_M(x)$). First an arithmetic mean vector ($\mu$) for all N dimensions is calculated over the sample space. Then, the covariance matrix ($\Sigma$) of size N×N is calculated using standard methods. The inverse of the covariance matrix is $\Sigma^{-1}$. Then for each sample point (x), the square of the Mahalanobis distance is:

$$D_M^2(x)=(x-\mu)^T\Sigma^{-1}(x-\mu)$$

The Mahalanobis distance follows a chi-squared ($X^2$) cumulative distribution function, which is dependent on the number of dimensions or degrees-of-freedom. So using the chi-squared distribution, Embodiments described herein may reject a percentage of points based on statistics of all dimensions taken together. Any point with Mahalanobis distance exceeding the chi-squared distribution for a given percentile (optimal value determined experimentally) will be rejected.

In order to derive the final average, only sample points which have not been rejected are taken into account. For the mean calculation, an arithmetic mean is determined for all dimensions separately. Because each sample point has an associated confidence of quality measure, based on the fit of face landmark points, we can use this to bias each sample accordingly in determining the average. In order to calculate the weighted mean, embodiments described herein may take each point and multiply by its corresponding quality measure (weight), and then divide the sum by the sum of all weights.

One additional point of difference (in addition to the data correction) may be the way we calculate yaw and pitch—we create a proxy metric for yaw and pitch and do that with PCA vectors as opposed to landmark points on the face. This may help compensate for some of the data errors; even though there may still need to filter the outlier data samples.

General

It will be appreciated that any module or component exemplified herein that executes instructions may include or otherwise have access to computer readable media such as storage media, computer storage media, or data storage devices (removable and/or non-removable) such as, for example, magnetic disks, optical disks, tape, and other forms of computer readable media. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD), blue-ray disks, or other optical storage, magnetic cassettes, magnetic tape, magnetic disk storage or other magnetic storage devices, or any other medium which can be used to store the desired information and which can be accessed by an application, module, or both. Any such computer storage media may be part of the mobile device, tracking module, object tracking application, etc., or accessible or connectable thereto. Any application or module herein described may be implemented using computer readable/executable instructions that may be stored or otherwise held by such computer readable media.

Thus, alterations, modifications and variations can be effected to the particular embodiments by those of skill in the art without departing from the scope of this disclosure, which is defined solely by the claims appended hereto.

In further aspects, the disclosure provides systems, devices, methods, and computer programming products, including non-transitory computer readable memory, or non-transient machine-readable instruction sets, for use in implementing such methods and enabling the functionality described previously.

Although the disclosure has been described and illustrated in exemplary forms with a certain degree of particularity, it is noted that the description and illustrations have been made by way of example only. Numerous changes in the details of construction and combination and arrangement of parts and steps may be made. Accordingly, such changes are intended to be included in the invention, the scope of which is defined by the claims.

Except to the extent explicitly stated or inherent within the processes described, including any optional steps or components thereof, no required order, sequence, or combination is intended or implied. As will be will be understood by those skilled in the relevant arts, with respect to both processes and any systems, devices, etc., described herein, a wide range of variations is possible, and even advantageous, in various circumstances, without departing from the scope of the invention, which is to be limited only by the claims.

What is claimed is:

1. A security platform comprising:
an image capture device configured to detect a user within a field of view of a camera;
a processor configured to:
provide an electronic prompt to request the user to perform a sequence of random poses, each pose defined by a change in pitch, yaw, or roll;
trigger the image capture device to capture frames of the user performing the sequence of poses;
determine if any frame is missing a face of the user;
verify that the user has performed the sequence of poses by comparing landmark values within a threshold;
for each frame, generate a face signature of the user performing a pose of the sequence of poses;
compare the generated face signatures to stored face signatures corresponding to the poses;
verify the identity of the user as being an authorized user; and
store the captured frames and generated face signatures in a data storage as an audit trail in an encrypted format.

2. The security platform of claim 1 comprising:
a display screen configured to display the frames of the user to the user;
the processor further configured to:
provide a calibration prompt directing the user to come to a resting place in front of the camera with the user's eyes on a horizontal plane;
measure at least one key landmark on the face and an overall bounding box of the face and record values corresponding thereto;
display a head position prompt on the display screen, the head position prompt directing the user to turn their head to match a position denoted by a head position image forming part of the head position prompt;
measure the at least one key landmark on the face and the overall bounding box of the face and recording values corresponding thereto again.

3. The security platform of claim 2 comprising:
the processor further configured to:
compare the landmark values to determine whether the user has moved to the requested location and, if the landmark values do not match within a pre-programmed threshold, rejecting the session;
compare the landmark values one or more previously captured landmark values to determine whether the user has undergone movements within a 2-dimensional image movement threshold; the 2-dimensional image movement threshold representing one or more values corresponding to movement patterns of 2-dimensional images
reject the session if the user has undergone movements within a the 2-dimensional image movement threshold.

4. The security platform of claim 2 comprising:
the processor further configured to:
discard outlier frames, according to a statistical method, from the frames of the user captured while collecting the key landmark data.

5. The security platform of claim 1 wherein the processor is further configured to determine that the user is not the authorized user and store the generated series of face signatures as part of an audit trail file.

6. A method to authenticate a user comprising:
starting an authentication session;
providing an electronic prompt to request the user to perform a sequence of random poses, each pose defined by a change in pitch, yaw, or roll;
capturing frames of the user performing the sequence of poses;
determining if any frame is missing a face of the user;
verifying that the user has performed the sequence of poses by comparing landmark values within a threshold;
generating, for each frame, a signature of the user performing a pose of the sequence of poses;
comparing the generated face signatures to stored face signatures corresponding to the poses;
verifying the identity of the user as being an authorized user; and
storing the captured frames and generated face signatures in a data storage as an audit trail in an encrypted format.

7. The method of claim 6 comprising presenting the user with a screen displaying an image of the user's face; presenting the user with a calibration prompt, the calibration prompt directing the user to come to a resting place in front of the camera where one or more features of the image of the user's face is on a horizontal plane displayed on the screen displaying the image of the user's face; measuring a first set of face signature values from the frames of the user performing the sequence of poses, the first set of face signature values corresponding to the horizontal plane with respect to the user's face and generated from the pixels inside a bounding box for the face, and recording those values; providing at least one re-positioning prompt directing the user to turn their head to match a new position denoted on the screen; measuring the key landmarks on the user's face and producing a second set of face signature values generated from the face bounding box.

8. The method of claim 7 comprising ensuring that the user has performed the sequence of poses by: comparing the first set of face signature values and the second set of face signature values, and rejecting the session if the first and second set of face signature values do not match within pre-defined threshold; comparing one or more of the captured values corresponding to at least one key landmark on the face with values within at least one stored face signature to determine whether the user has undergone movements within a 2-dimensional image movement threshold, the 2-dimensional image movement threshold representing one or more values corresponding to movement patterns of 2-dimensional images; rejecting the session if the user has undergone movements within the 2-dimensional image movement threshold.

9. The method of claim 6 comprising, when generating the face signatures of the user performing a pose of the sequence of poses: discarding outlier frames, according to a statistical method, from the frames of the user performing the sequence of poses.

10. A method to authenticate a user comprising:
providing an electronic prompt to request the user to perform a sequence of random poses, the sequence to mitigate the ability of someone to hold up a video in order to mimic the request and act as an impostor;
capturing frames of the user performing the sequence of poses;
determining if any frame is missing a face of the user;
verifying that the user has performed the sequence of poses by comparing landmark values within a threshold;
generating, for each frame, a face signature of the user performing a pose of the sequence of poses;
comparing the generated face signatures to stored face signatures corresponding to the poses; and
storing the captured frames and generated face signatures in a data storage as an audit trail in an encrypted format.

11. The method of claim 10 wherein each pose is defined by a change in pitch, yaw, or roll of the user's head.

12. The method of claim 10 wherein the request is to follow an electronic indicator on the screen with their eyes, and track the eye movement to ensure that it follows the direction of the indicator to impact a change in pitch, yaw, or roll of the user's head.

13. A method to authenticate a user comprising:
periodically providing an electronic prompt to request the user to perform a sequence of random poses, each pose defined by a change in pitch, yaw, or roll;
capturing frames of the user performing the sequence of poses;
determining if any frame is missing a face of the user;
verifying that the user has performed the sequence of poses by comparing landmark values within a threshold;
generating, for each frame, a face signature of the user performing a pose of the sequence of poses;
comparing the generated face signatures to stored face signatures corresponding to the poses;
upon verifying the identity of the user as being an authorized user, storing the generated face signatures as additional stored face signatures for subsequent authentication sessions.

14. The method of claim 13 wherein during an initial registration, prompting the user to pose at one or more random locations on the screen as per instructions provided, capturing images of the face in the various poses; generating the stored face signatures using the images of the face in the various poses, and generating face recognition signatures corresponding to the different poses, wherein the electronic prompt requests the user would to match one or more poses.

15. The method of claim 13 further comprising providing an electronic prompt to request the user to register their face during an initial registration session, then providing an electronic prompt to request the user to move their head to various poses during an authentication session.

16. The method of claim 13 further comprising using morphing techniques to re-orient the face to a frontal face from the profile or tilted pose, generating a face signature from that re-oriented face and comparing that to the stored face signature(s).

17. The method of claim 13 further comprising during a registration process, providing an electronic prompt to request the user to pose in at least two different face orientations, and for each pose, capturing an image of the face from the camera image and generating a face signature using the captured image.

18. The method of claim 17 further comprising, for each pose optionally capture more than one frame (and thus face) and determine based on a quality threshold setting whether to discard that frame and face from the step, wherein if more than one face is captured for a specific pose, optionally use statistical methods to discard outlier faces based on average facial characteristics of all frames and faces.

19. The method of claim 13 further comprising, comparing that face signature to the original signature from the registration pose using a difference formula, wherein if the difference is less than a specified threshold (variable parameter) then pass that step, wherein if the user passes all steps then they would pass the authentication session.

20. The method of claim 13 further comprising validating the pitch, yaw, or roll of the pose during the authentication session to ensure that the user is not randomly moving their face around in a video or moving a 2-dimensional image.

21. The method of claim 13 further comprising, during authentication steps, blocking any session where a captured face does not match the requested pose.

22. The method of claim 21 further comprising storing the calculated face signature and the captured face that does not match the requested pose as part of an audit trail file.

* * * * *